US012716768B1

(12) United States Patent
Siegel et al.

(10) Patent No.: US 12,716,768 B1
(45) Date of Patent: Aug. 25, 2026

(54) MOBILE ITEM IDENTIFYING APPARATUS

(71) Applicant: Amazon Technologies, Inc., Seattle, WA (US)

(72) Inventors: Jacob A. Siegel, Southborough, MA (US); Nicholas Franklin, Northborough, MA (US); Joseph Harkness, Westford, MA (US); Jonathan David Jones, Arlington, VA (US); Keru Xia, Malden, MA (US); Andrew Vincent Wolff, Norfolk, MA (US)

(73) Assignee: Amazon Technologies, Inc., Seattle, WA (US)

( * ) Notice: Subject to any disclaimer, the term of this patent is extended or adjusted under 35 U.S.C. 154(b) by 0 days.

(21) Appl. No.: 18/669,311

(22) Filed: May 20, 2024

(51) Int. Cl.

| | |
|---|---|
| ***G01G 19/414*** | (2006.01) |
| ***G01G 19/08*** | (2006.01) |
| ***G01G 21/22*** | (2006.01) |
| ***G01G 21/28*** | (2006.01) |
| ***G01M 1/12*** | (2006.01) |
| ***G06Q 20/20*** | (2012.01) |

(52) U.S. Cl.
CPC ......... *G01G 19/4144* (2013.01); *G01G 19/08* (2013.01); *G01G 21/22* (2013.01); *G01G 21/28* (2013.01); *G01M 1/122* (2013.01); *G06Q 20/208* (2013.01)

(58) Field of Classification Search
CPC .......... B62B 3/00; B62B 5/00; B62B 5/0096; B62B 2205/06; B62B 2206/06; B62B 3/027; B62B 3/1408; B62B 3/142; B62B 3/1424; B62B 3/1428; B62B 3/1468; B62B 5/0003; B62B 5/06; A47F 10/02; A47F 10/04; B25J 15/08; B25J 18/025; G06Q 10/087; G06Q 20/3224; G06Q 30/02; G06Q 30/0266; G06Q 30/06; G06Q 30/0635; G06Q 30/0641; G07G 1/00; G07G 1/0081; G07G 1/12; G07F 7/02
USPC ........................................................ 705/23
See application file for complete search history.

(56) References Cited

U.S. PATENT DOCUMENTS

2019/0073656 A1* 3/2019 Joseph ............. G06Q 20/40145
2020/0346679 A1* 11/2020 Kim ........................ B62B 5/004

* cited by examiner

*Primary Examiner* — Avia Salman
(74) *Attorney, Agent, or Firm* — Kilpatrick Townsend & Stockton LLP

(57) ABSTRACT

A smart shopping cart may include a frame with wheels for riding along a support surface that nests with one or more other smart shopping carts. The smart shopping cart includes a basket coupled to a frame through a scale module connected adjacent to a first end of the basket for determining a weight of items placed in the basket. The scale module includes three load cells oriented perpendicular to the length of the basket and position with two load cells adjacent a middle portion of the basket and a single load cell adjacent the first end of the basket. The load cells provide an analog signal converted by an embedded circuit board into a digital signal for determination of weight of items placed in the basket.

20 Claims, 29 Drawing Sheets

MOBILE ITEM IDENTIFYING APPARATUS

BACKGROUND

In a retail store or grocery store, users typically push a shopping cart through aisles while selecting items. When the users finish selecting and placing items in the shopping cart, they proceed to a checkout stand to make a payment. Traditionally, such tasks are resource intensive and they entail significant expenditures of time and money at each retail outlet. Smart shopping carts have been introduced at retail stores to address this problem and other problems as well as to improve a customer experience within a store.

A smart shopping cart, referred to herein as a mobile apparatus that may include a smart shopping cart or other mobile device having an on-board computing system and one or more power-consuming elements, has one or more electric devices integrated with the shopping cart. The one or more electric devices can be used for tracking the location of the cart, automated billing, etc. Such an electric device may include a barcode scanner, a weight sensor, a location sensor etc. The barcode scanner may scan barcodes of items placed in the shopping cart. The smart shopping cart may also include a display that shows the total price of items placed, thus making it easy for shoppers to budget their shopping. An integrated battery typically powers the one or more electric devices. The integrated battery may be charged through various charging systems while the smart shopping cart is not in use.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different figures indicates similar or identical items.

DETAILED DESCRIPTION

Figure 1:
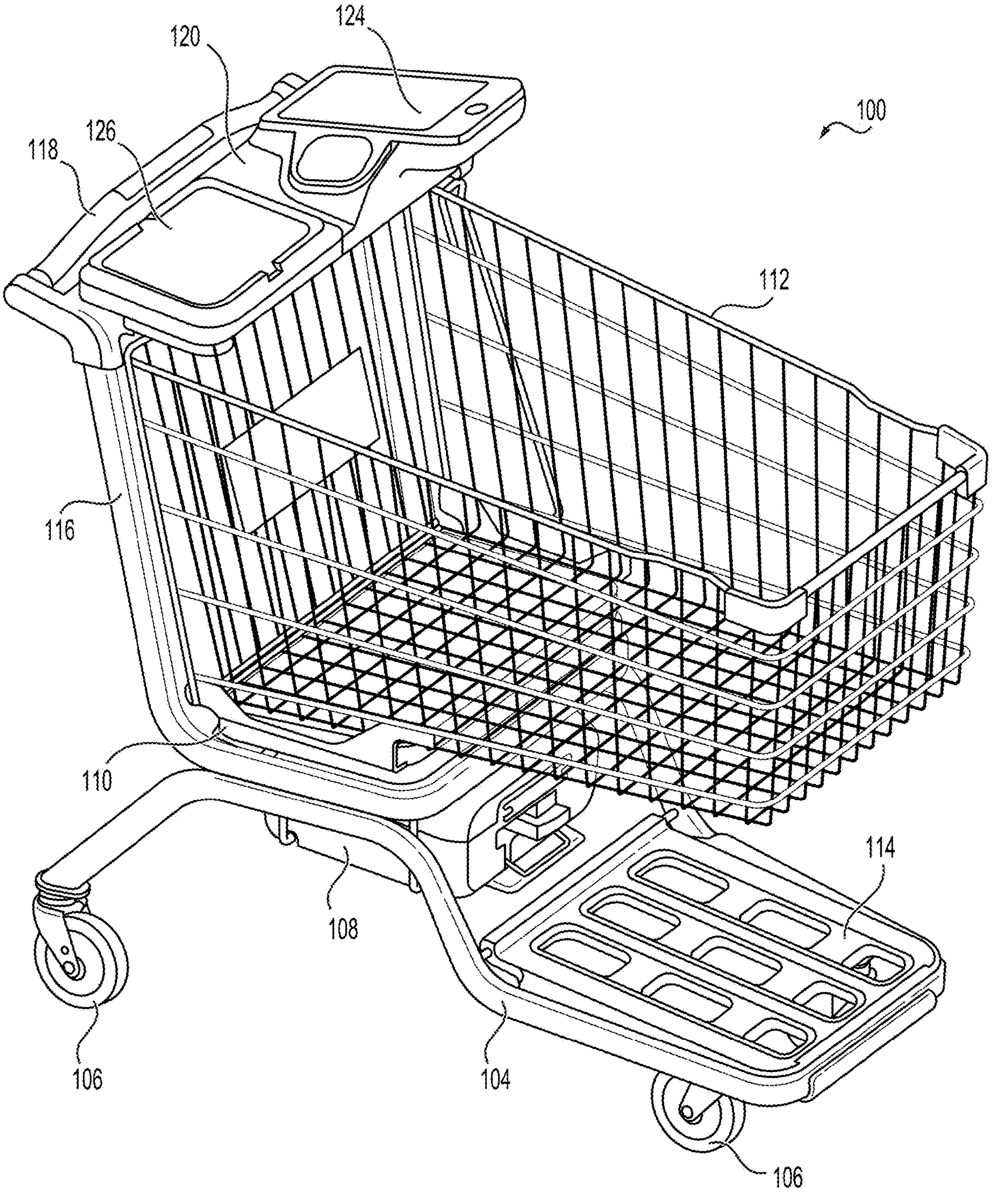
FIG. 1 illustrates a mobile apparatus for enabling customized retail environments, according to at least one example.
Figure 2:
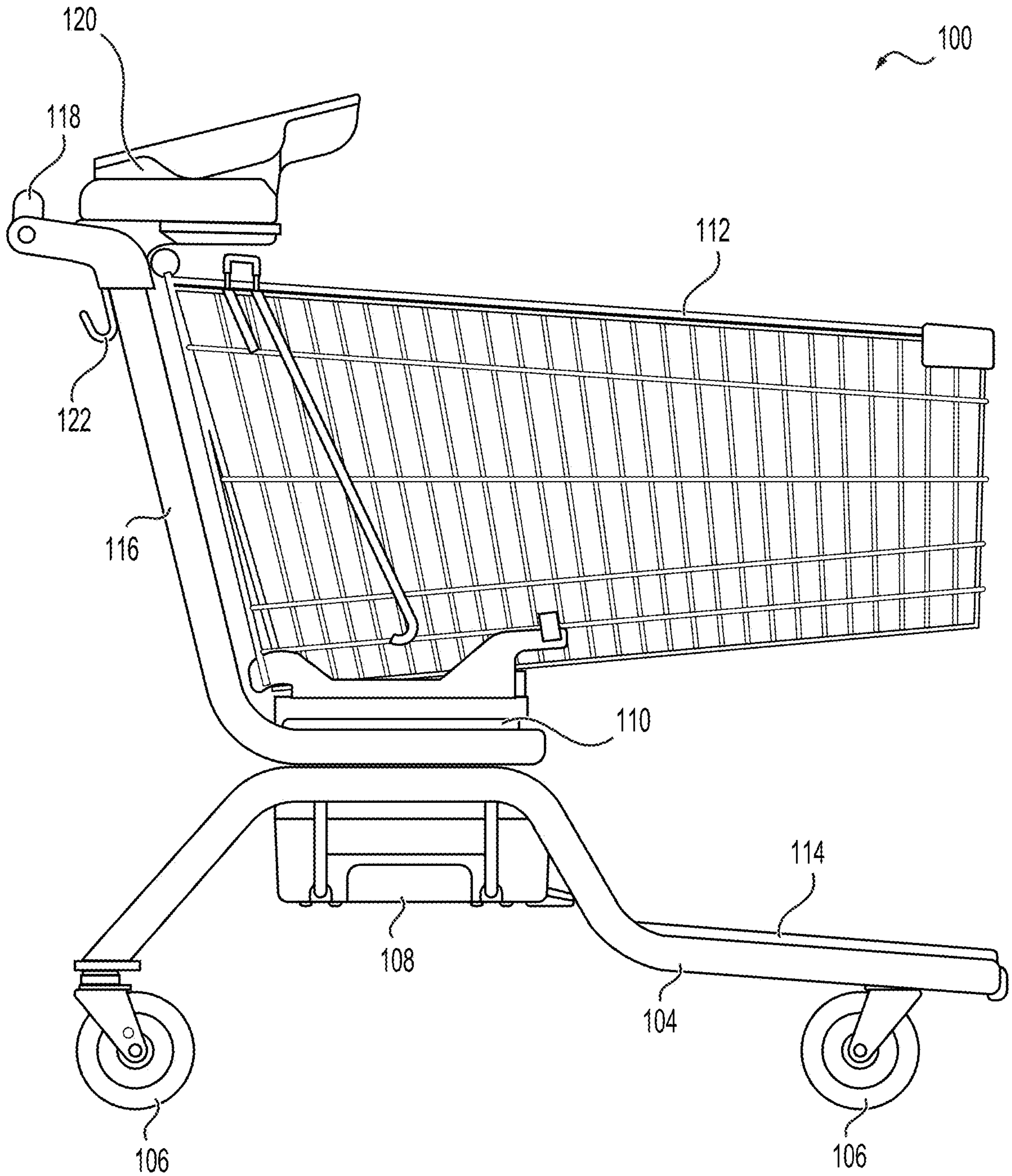
FIG. 2 illustrates a side view of the mobile apparatus of FIG. 1.

This disclosure is directed, in part, to a system and technique for weight determination systems of mobile apparatuses, such as smart shopping carts. The mobile apparatuses are configured for use in a materials handling facility such as a grocery store, warehouse, inventory location, or other such materials handling facility. The mobile apparatuses may use sensors to detect items. For instance, a mobile apparatus, such as a shopping cart, may include at least a frame, a chassis that attaches to the frame, a basket that attaches to the frame, a user-facing module attached at or adjacent a handlebar, vision sensors, item detection sensors, product identification sensors, and other such components as described herein. The user-facing module may include at least a display, imaging device(s), product identification module, weight sensor(s), and other components for a user to interact with during operation of the mobile apparatus. The mobile apparatus may be configured to use one or more weight sensors coupled between the basket and the frame and/or as part of the user-facing module to determine weights of items added to the user-facing module (e.g., for sell-by-weight items and/or to determine item identities), use the imaging device(s) to both identify the items added to the mobile apparatus and determine a location of the mobile apparatus within a facility, use the display to provide information about the identified item(s), and/or send data representing the items to one or more computing devices.

The frame may further include, and/or support, the basket. The basket may include a bottom having a given shape (e.g., a quadrilateral shape, a circular shape, a triangular shape, etc.), one or more sides (e.g., three sides, four sides, etc.) protruding from the bottom to define a receptacle, and a top having a perimeter that defines an opening of the receptacle to receive items that are placed within the basket. In some examples, the sides of the basket may include a pattern that is configured to reduce flexing of the basket. For example, the sides of the basket may include a ribbed pattern, where the ribbed pattern is configured to reduce the flexing of the sides the basket when pressure is applied to the sides.

In some examples, the basket, such as one of the sides of the basket, may include a gate that is configured to move between a first position (which may be referred to, in some examples, as a “closed position”) and a second position (which may be referred to, in some examples, as an “open position”). In such examples, the bottom of the basket may include feature(s), such as groove(s), notch(es), channel(s), trench(es), and/or the like, that are configured to receive an additional feature(s), such as fastener(s), clasp(s), snap(s), extension(s), and/or the like of the gate when the gate is in the first position. For example, and as described in more detail below, the additional feature(s) of the gate may be configured to insert into the feature(s) of the basket such that that the gate cannot move laterally (e.g., to the sides) while in the first position. However, even when the gate is laterally secured to the basket, the gate may still be able to move from the first position to the second position, such as when a force is applied to a back of the basket (which is described in more detail below).

The basket may be coupled to the frame of the mobile apparatus at or near a rear of the basket, accordingly, the basket is cantilevered from a first portion supported by the frame to an end portion that extends over a second portion of the frame. The basket and frame are therefore configured to nest together when stored in a corral or other storage configuration. Accordingly, the cantilevered basket extends forward from the frame such that the basket of a first cart may fit into a gate of a second cart to nest the first cart and second cart together.

The basket couples to the frame through a scale module that includes a plurality of load cells such that items placed within the basket can be weighed by the load cells such that the mobile apparatus can determine a weight of items that may be used for item identification. The scale module may be one of two weight scales of the mobile apparatus, with a second scale positioned at a user-facing module for weighing sell-by-weight items. The sell-by-weight scale may be a certified scale for selling produce by weight located near the handlebar of the mobile apparatus and additionally the entire basket may be weighed to aid with product verification and fraud and abuse mitigation.

The sell-by-weight scale may include a single load cell that combines a single point load cell architecture including aluminum body, potting, and no shielding, that provides a digital output. Typical commodity digital load cells may use a more expensive architecture that uses stainless steel, hermetic sealing, and shielding. In contrast, the components for the sell-by-weight scale may be contained within a housing of the user-facing module. In this manner, the user-facing module may be modular and removable from the mobile apparatus for replacement. Additionally, the modular architecture allows the user-facing module to be certified and used in other environments and use cases beyond mobile apparatuses.

The scale module that couples the basket to the frame includes a plurality of load cells within the scale module that provide for support of the basket and connection through the load cells to the frame. The scale module may, in an example include three load cells that may include analog load cells and/or load cells with embedded or combined circuit board to provide a digital output that may be consumed by a computing device of the user-facing module or other computing device of the mobile apparatus. The three load cells may be used to determine a center of gravity and/or two-dimensional location of items added to the basket of the mobile apparatus. By combining the signals from the load cells, a computing device of the mobile apparatus can determine a location of an item added to a basket based on a change in the center of gravity of the basket and a weight change of the basket.

In an example, the scale module includes three load cells that include analog load cells each rated to around two hundred kilograms or more. In this manner, the total limit of the load cells may be up to or in excess of six hundred kilograms. The operating range of the scale module may be in a range of zero to seventy kilograms. The load cells may include bridge load cells or single point load cells that are combined as a set of three load cells to provide for a moment reaction in response to loading of the cantilevered basket. The basket may have a length of eight hundred or more millimeters and therefore loading of the basket may result in a moment that may exceed the capacity of a typical load cell and may, as a single load cell, not be able to account for the cantilevered moment as a result of loading the basket at a distance from the scale module.

In some examples, the scale module may include three or four load cells. The use of three load cells may decrease cost and complexity as the three load cells may be used to define a plane and provide for determination of the weight of the item based on the readings from the three load cells within the scale module. The scale module as described herein may be configured to discriminate weight changes of fifteen grams or less and maintain accuracy requirements of +/−5% over the operational range of the scale module. Further, the scale module provides for a basket scale that can support a load of 175 kilograms centered in the basket and an additional 135 kilograms on the tip (or leading edge) of the basket without degradation in weighing performance (in an operating range of 0-70 kg). The scale module is designed as described herein to receive the loads of up to 175 kilograms with 130 kilograms at the leading edge of the basket and then, when the weight is removed, return to normal operation within the operating range of 0-70 kilograms.

The performance is achieved in part through the use of adjustable rear hard stops at the rear of the scale module and fixed hard stops above and below the front of the scale module. The scale module is built to have a modular interface with the ability to support both wire mesh and plastic baskets of mobile apparatuses.

In some examples, the load cells may include single point load cells, planar beam load cells, or other types of load cells. Further, the use of the digital load cell, or load cell with a circuit board embedded therein provides for minimizing analog leads to reduce susceptibility to electromagnetic interference, connector degradation susceptibility, and reduce the footprint of a related circuit board.

The scale module is built using two plates or interfaces that couple together through the plurality of load cells. In an example, the plates may include plastic, aluminum, steel, or other rigid materials. In a particular example, the plates may be formed of diecast aluminum coupled through three load cells. The plates are configured to connect to a frame of a support structure, for example of a mobile apparatus, and to a basket of the mobile apparatus, with each plate having an interface to securely and releasably connect.

The load cells are arranged between the top plate and the bottom plate such that the front of the scale module has two load cells and the rear of the scale module has a single load cell to form a plane using the three load cells. Due to the cantilevered nature of the basket, the front of the scale module may experience greater loads, and therefore has two load cells. The load cells at the front of the scale module are positioned at a distance or length along the length of the basket, with a first load cell on a first lateral side and a second load cell on a second lateral side of a center of the basket.

The scale module includes overload controls to prevent overloading and deforming the load cells. In some instances, there may be hard stops or overload controls at the front and back of the scale module. The front of the scale module may include hard stops to prevent overcompression of the load cells while the rear hard stops may be configured to prevent overcompression or overtension of the load cells based on a moment produce by loading the basket (e.g., a load at the front of the basket inducing compression at the front of the scale module and tension or compression at the rear of the scale module).

In a particular example, a bolt may be threaded into a top plate of the scale module and capped relative to the bottom plate such that the bolt bottoms out before the load cells are overcompressed. The bolt may be secured using a serrated flanged head locking nut to secure the overload setting and the gap may be set by adjusting the position of the bolt. An overload control at the front of the scale module may be built into the bottom plate and located below the live end of each front load cell (e.g., where the load cells are able to deflect). A gap is set using the slot window and locked down with the same manner as the rear overload controls. Front up-lift loads are minimal due to the scale-basket geometry. Both front and rear compression loads are controlled within the nominal capacity limits of the load cells.

In a particular example, the smart shopping cart includes a frame having one or more wheels for riding along a support surface and configured to enable the smart shopping cart to nest with a first nested shopping cart at a first end and with a second nested shopping cart at a second end opposite the first end. The smart shopping cart may also include a user-facing module including at least a user interface coupled to the frame at a handlebar. The cart may also include a basket configured for receiving items selected by a user of the smart shopping cart, the basket cantilevered over a first portion of the frame. The cart may also include a scale module coupled between the frame and the basket at a second portion of the frame, the scale module may include: a first interface coupled to the frame at the second portion of the frame; a second interface coupled to a bottom of the basket; and a plurality of load cells positioned between and connecting the first interface and the second interface, the plurality of load cells configured to communicate with the user-facing module for determining a weight of items added to the basket.

In some examples, the plurality of load cells are arranged with a length of each of the plurality of load cells perpendicular to a length of the basket, due to the relatively short distance along the length of the cart that the scale module traverses, the load cells may be stiffer when oriented perpendicular to the length of the smart shopping cart and/or basket. This arrangement is sideways and may allow for an increased reaction distance for the load cells. The plurality of load cells may include three load cells arranged in a triangular arrangement with a first load cell positioned within the scale module adjacent a rear of the basket and with a second load cell and a third load cell positioned within the scale module positioned at a first position along the length of the basket. The three load cells may be used to determine a center of gravity and/or two-dimensional location of items added to the basket of the mobile apparatus. By combining the signals from the load cells, a computing device of the mobile apparatus can determine a location of an item added to a basket based on a change in the center of gravity of the basket and a weight change of the basket. Each of the plurality of load cells may include a circuit board configured to receive an analog output from a respective load cell and output a digital signal to communicate to the user-facing module.

In a second particular example, a mobile apparatus may include a frame having one or more wheels for riding along a support surface. The mobile apparatus also includes a computing device coupled to the frame. The mobile apparatus also includes a basket configured for receiving items selected by a user of the mobile apparatus, with the basket cantilevered over a first portion of the frame. The mobile apparatus also includes a scale module coupled between the frame and the basket at a second portion of the frame, the scale module may include a plurality of load cells forming a connection between the frame and the basket and configured to communicate with the computing device for determining a weight of an item added to the basket.

In some examples, the plurality of load cells are arranged with a length of each of the plurality of load cells perpendicular to a length of the basket. The plurality of load cells may include three load cells arranged in a triangular arrangement with a first load cell positioned within the scale module adjacent a rear of the basket, and a second load cell and a third load cell positioned within the scale module positioned at a first position along the length of the basket. The computing device may be configured to receive signals from the plurality of load cells to determine a reaction distance and weight of the item in response to the item being added to the basket. The first load cell may be positioned along a center axis of the basket with the second load cell and the third load cell offset to a respective first side and a second side of the center axis. The scale module may include a first interface and a second interface defining a top plate and a bottom plate with the first interface positioned between the plurality of load cells and the frame and the second interface positioned between the plurality of load cells and the basket. Each of the plurality of load cells may include a body having a first end and a second end, a transducer affixed to a portion of the body between the first end and the second end, a first mounting interface at the first end configured to couple to the first interface, and a second mounting interface at the second end configured to couple to the second interface. The mobile apparatus may include a user-facing module that includes a user interface having a screen, a camera device for capturing image data in or around the mobile apparatus, a scale system for weighing items for a sell-by-weight product, and a product identification module configured to receive product identification information for an item scanned by a user of the mobile apparatus. The scale module is configured to detect changes in weight of the items in the basket in a range of fifteen grams to one hundred and seventy-five kilograms. The plurality of load cells are configured to communicate an analog signal to the computing device, the computing device may include a digitization component configured to digitize the analog signal and determine a weight signal for the item added to the basket.

In some examples, the mobile apparatus may include another compartment, separate from the basket, for holding items. For example, the mobile apparatus may include a shelf that is coupled to and extends substantially horizontally from the basket. In such an example, the shelf may extend from a side of the basket that is closest to a user when the user is operating the mobile apparatus (e.g., a back side of the basket). The shelf may include a bottom having a given shape (e.g., a quadrilateral shape, a circular shape, a triangular shape, etc.), one or more sides (e.g., four sides, etc.) protruding from the bottom to define a receptacle, and a top having a perimeter that defines an opening of the receptacle to receive items that are placed within the shelf. In some examples, one or more of the sides of the shelf may include a portion of one or more of the sides of the basket. For example, the basket and the shelf may share the same left and right sides. Additionally, the gate of the basket may separate the receptacle of the basket from the receptacle of the shelf.

In some examples, the mobile apparatus may include a lower shelf for receiving additional items, the lower shelf supported by the chassis and/or frame of the mobile apparatus. The lower shelf may be positioned underneath the basket and may receive items. The lower shelf may be equipped with sensors, such as capacitive and/or weight sensors to determine a presence of one or more items on the lower shelf.

The mobile apparatus may further include the user-facing module that is coupled to the main frame. The user-facing module may include one or more imaging devices (e.g., camera(s)), sensors (e.g., scanner(s), proximity sensor(s), motion sensor(s), etc.), one or more lights, a display, product identification module, weight-sensor (e.g., scale), and/or any other type of electronic device. The user-facing module may be configured to use the imaging device(s) to perform various functions. For a first example, the user-facing module may include imaging device(s) that are oriented towards the receptacle of the basket. In some examples, the user-facing module includes two imaging devices oriented towards the receptacle of the basket while, in other examples, the user-facing module may include any number of imaging devices oriented towards the receptacle of the basket. The mobile apparatus may thus use these imaging device(s) to identify items that are placed within the basket. For instance, the user-facing module may receive image data generated by these imaging device(s), where the image data represents at least an item that is being placed within the basket by a user and/or an item that has already been placed within the basket. The user-facing module may then analyze the image data, using one or more of the processes described herein, to identify the item.

For a second example, the user-facing module may include imaging device(s) that are oriented towards the receptacle of the shelf or lower shelf. In some examples, the user-facing module includes one imaging device oriented towards the receptacle of the shelf while, in other examples, the user-facing module may include any number of imaging devices oriented towards the receptacle of the shelf. The mobile apparatus may thus use these imaging device(s) to identify items that are placed within the shelf. For instance, the user-facing module may receive image data generated by these imaging device(s), where the image data represents at least an item that is being placed within the shelf by a user and/or an item that has already been placed within the shelf. The user-facing module may then analyze the image data, using one or more of the processes described herein, to identify the item.

For a third example, the user-facing module may include imaging device(s) oriented substantially perpendicular with respect to a ground plane (e.g., oriented towards a ceiling of the facility). In some examples, the user-facing module includes one imaging device oriented substantially perpendicular with respect to the ground plane while, in other examples, the user-facing module includes any number of imaging devices orientated substantially perpendicular with respect to the ground plane. The mobile apparatus may then use these imaging device(s) to determine a location of the mobile apparatus within the facility. For instance, the user-facing module may receive image data generated by these imaging device(s), where the image data represents a portion of the facility (e.g., the ceiling of the facility). The user-facing module may then analyze the image data, using one or more of the processes described herein, in order to determine the location of the mobile apparatus within the facility.

Additionally, the user-facing module may include a product identification module that may include one or more proximity and/or presence detection sensors as well as an illumination element and an imaging device configured to capture image data of a specific item when presented to the product identification module. The product identification module may use a range sensor such as a time of flight (ToF) sensor, capacitive sensor, proximity sensor, individual camera, or other such sensor to detect a presence and/or distance and/or location of an item in a read area of the camera. For example, the ToF sensor may be used to determine when an item is in a read zone (e.g., within a field of view as well as within a depth of field of focus) for the camera. In some examples, the ToF (or other such sensor) may be used to trigger or enable the camera. In some examples, the camera may serve as the sensor for detecting the presence of items as well as being used to capture images for item identification. The camera may then be used for performing a product identification and establishing a tracking system for a product that is identified. In this manner, items that are selected by the user may have a complete chain of custody from selection by the user to completion of the transaction (e.g., leaving the facility). The chain of custody may include an indication of individuals, locations, events, or item tracking of an object that a user interacts with and/or places within or near a mobile apparatus. The product identification module may include an opening for receiving the removable battery that provides power to the electrical components of the mobile apparatus. In some examples, the mobile apparatus may include a rail system that guides the battery into the opening when installing the battery into the mobile apparatus and/or guides the battery out of the opening when removing the battery from the mobile apparatus. For example, the opening may include a first rail feature that is configured to "slide into" a second rail feature of the battery when an associate is inserting the battery into the opening and/or removing the battery from the opening. In some examples, the rail system guides the battery using an angle such that the battery may be removed from and/or inserted into the mobile apparatus even when the mobile apparatus is "nested" with other mobile apparatus(es).

The main frame of the mobile apparatus may be connected to a wheel frame that includes components for providing mobility to the mobile apparatus. For instance, the wheel frame may support one or more wheel castors to enable movement of the mobile apparatus along a surface. The wheel casters may include one or more wheels, axles, forks, joints or other components which enable the mobile apparatus to travel on various surfaces. For instance, in some examples, each of the wheel casters may include a single wheel provided on an axle within a fork, or two or more wheels provided on such an axle. In some other examples, the wheel casters may include two or more axles. Alternatively, in still other examples, a single caster may be provided in lieu of the multiple wheel casters.

The wheel frame may include, and/or support, a tray. In some examples, the tray (e.g., the lower shelf) may be attached to the wheel apparatus using one or more plates. The tray may include a bottom having a given shape (e.g., a quadrilateral shape, a circular shape, a triangular shape, etc.). In some examples, the tray may further include a separator that separate a portion of the tray (e.g., a front portion of the tray) that is configured to receive items from a second portion of the tray (e.g., a back portion of the tray) that is configured to cover one or more components of the mobile apparatus. Additionally, one or more sensors may be disposed between a bottom of the tray and the plates that attach the tray to the wheel frame. In some examples, the sensor(s) may include a weight sensor and/or a capacitive sensor.

The mobile apparatus may then be configured to update a virtual shopping cart for a user, where the virtual shopping cart represents the item(s) that have been placed within the receptacle(s), item(s) that have been placed on the tray, weight(s) of the item(s), price(s) of the item(s), and/or any other information. Additionally, the mobile apparatus may be configured to use the display associated with the user-facing module to present the information to the user. This way, the user is provided with the most updated information associated with the shopping session while the user continues to place new items in the mobile apparatus.

The mobile apparatus, and specifically the user-facing module described herein, integrates an Infrared Time-of-Flight (IR-ToF) sensor with a global shutter camera and illumination to provide a reliable and efficient barcode scanning experience for items selected by users. This integrated system is intuitive for users and therefore takes improves accuracy and user experience, while reducing power consumption and computing load of the mobile apparatus for doing product identification and tracking. In particular, the system described herein uses the IR-ToF sensor to identify if an item is within the camera's field of view. When an object is detected by the IR-ToF sensor, it triggers the camera and synchronized illumination, the latter operating in a strobe mode. The synchronization between the strobe illumination and the global shutter camera's frame capture enables the camera to capture crisp, clear images devoid of motion blur. The clear images are important for product identification, particularly barcode scanning, and provide a seamless and hassle-free experience for the customer.

By activating the camera based on the IR-ToF sensor, the system can conserve power for illumination, and resource-intensive algorithms only when an object is present in the camera's field of view. In an example, the field of view of the IR-ToF sensor is divided into 16 (or more) sub-fields, with optimized thresholds for detecting an object in any of the sub-fields. This feature enables the system to avoid false detections, such as a user's hand when interacting with a screen of the mobile apparatus or holding the handlebar.

A first algorithm processes the IR-ToF sensor's signals to ensure reliability under various lighting conditions, including outdoor lighting under sunlight. This first algorithm allows for detection of objects with varying properties, such as dark or light coloration and opaque or transparent materials. It also intelligently ignores objects, people, or store fixtures that are in the vicinity of the mobile apparatus but are not intended for scanning by the product identification module. The product identification module includes the global shutter camera, illumination source, lens, cover glass, and IR-ToF sensor, all packaged into a compact, sealed module. This module is strategically positioned and directed on the user-facing module of the mobile apparatus to provide the best user experience when scanning items to add to the cart.

Additionally, the systems and techniques provided herein enable a system for monitoring fraud and abuse in mobile apparatuses. The system employs two cameras on the user-facing module, for example two 12-megapixel rolling shutter cameras, each having a field of view of 180 degrees, which continuously monitor the shopping cart's airspace to ensure accurate identification and tracking of items. A first camera is positioned on the user-facing module above the screen and facing upward. This strategic placement provides a viewpoint encompassing the user-facing module, sell by weight scale, and the product identification module. The first camera is tasked with identifying and tracking an item when it is scanned by the product identification module and moved into the shopping basket. In addition, the first camera opportunistically employs its view of store ceiling features to localize the mobile apparatus within the store, a critical functionality for navigation and tracking.

The second camera faces the cart's basket. Its position provides an overlapping field of view with the first camera to monitor all of the mobile apparatus' basket airspace. The second camera is responsible for gathering image data that may be used for identifying any item that is being added to the mobile apparatus. Collectively, the first and second cameras establish a "chain of custody" for each item added to the mobile apparatus. The chain of custody may be determined by a chain of custody algorithm that is used to track and record the movements, interactions, and control of an items through its lifecycle (e.g., while within a store or other facility) by documenting each person or apparatus that the item interacts with (and how) as well as the date/time for the interaction. In some examples, the chain of custody algorithm may record information related to user interactions with items and locations as viewed from image data (e.g., relying on image recognition techniques) and may append the chain of custody with sections or portions of the image data corresponding to the events. Maintaining the chain of custody increases transparency and enables accountability for actions taken on the item and may therefore be used to ensure that items are accurately tracked to be added to virtual carts for accuracy as well as reduction in fraud and abuse.

However, as a chain of custody algorithm may be resource-intensive, triggering mechanisms are used to optimize power and compute utilization. Specifically, the first camera and its chain of custody algorithm are activated only when an item is presented to the product identification module and detected by the IR-ToF sensor. Likewise, the second camera and its chain of custody algorithm are only triggered when a specially tuned radar facing the basket detects an object in the mobile apparatus' airspace.

Additionally, in some situations, the user may scan an item and places it on the lower shelf, and a capacitive sensor of the lower shelf may detect the presence of the item. This sensor, covering the entire surface of the lower shelf, detects the presence of items of different sizes and material properties. This sensor has is low in power consumption, enhancing the overall efficiency of the mobile apparatus and preventing unnecessary power drain during use.

Turning now to the figures, FIGS. 1-4 depict various views of a mobile apparatus 100 for enabling customized retail environments, according to at least one example. The mobile apparatus 100 has a frame including a lower frame 104 and an upper frame 116. The lower frame 104 extends from a front to a rear of the mobile apparatus 100 and includes wheels 106 for riding along a supporting surface. The lower frame 104 supports a power unit 108 and a scale module 110. The power unit 108 is described further in detail with respect to FIGS. 19 and 23-29. The upper frame 116 connects to handlebars 118 and a user-facing module 120. The user-facing module 120 is described further with respect to FIGS. 14-18.

The user-facing module 120 includes a sell-by-weight scale 126 for weighing items to add to the mobile apparatus 100 as well as the basket 112. The sell-by-weight scale 126 may be used to input items such as produce or other items sold according to their weight. The sell-by-weight scale 126 may include a single point load cell centered under a load surface of the sell-by-weight scale 126. The single point load cell of the sell-by-weight scale 126 may output an analog signal and/or include an embedded circuit board to digitize the analog signal and output a digital signal. The signal from the load sell of the sell-by-weight scale 126 may be conveyed to a computing device of the user-facing module 120, and information related to such sensor data may be presented on a user display 124 of the user-facing module 120.

In some examples, the signals from the load cell of the sell-by-weight scale 126 may be digitized to prevent and/or reduce electrical interference with the signals from the sell-by-weight scale 126. Similarly, output data from the scale module 110 may be digitized to reduce or prevent electromagnetic interference with analog signal outputs.

The lower frame 104 supports the scale module 110 as well as the basket 112 where items may be placed and stored when selected by a user. The basket 112 is shown as a wireframe basket, though other configurations of the basket 112 are envisioned including baskets having plastic and/or solid walls or other shapes and configurations.

The basket 112 may include a bottom having a given shape (e.g., a quadrilateral shape, a circular shape, a triangular shape, etc.), one or more sides (e.g., three sides, four sides, etc.) protruding from the bottom to define a receptacle, and a top having a perimeter that defines an opening of the receptacle to receive items that are placed within the basket 112. In some examples, the sides of the basket 112 may include a pattern that is configured to reduce flexing of the basket. For example, the sides of the basket 112 may include a ribbed pattern, where the ribbed pattern is configured to reduce the flexing of the sides the basket 112 when pressure is applied to the sides.

In some examples, the basket 112, such as one of the sides of the basket 112, may include a gate that is configured to move between a first position (which may be referred to, in some examples, as a "closed position") and a second position (which may be referred to, in some examples, as an "open position"). In such examples, the bottom of the basket 112 may include feature(s), such as groove(s), notch(es), channel(s), trench(es), and/or the like, that are configured to receive an additional feature(s), such as fastener(s), clasp(s), snap(s), extension(s), and/or the like of the gate when the gate is in the first position. For example, and as described in more detail below, the additional feature(s) of the gate may be configured to insert into the feature(s) of the basket such that that the gate cannot move laterally (e.g., to the sides) while in the first position. However, even when the gate is laterally secured to the basket, the gate may still be able to move from the first position to the second position, such as when a force is applied to a back of the basket (which is described in more detail below).

The basket 112 may be coupled to the lower frame 104 of the mobile apparatus 100 at or near a rear of the basket 112, accordingly, the basket 112 is cantilevered from a first portion of the basket 112 supported by the lower frame 104 to an end portion that extends over a second portion of the lower frame 104 such as a shelf 114. The basket 112 and lower frame 104 are therefore configured to nest together when stored in a corral or other storage configuration. Accordingly, the cantilevered basket 112 extends forward from the lower frame 104 such that the basket of a first mobile apparatus may fit into a gate of a second mobile apparatus to nest the first mobile apparatus and second mobile apparatus together.

The basket 112 couples to the lower frame 104 through a scale module 110 that includes a plurality of load cells such that items placed within the basket 112 can be weighed by the load cells such that the mobile apparatus 100 can determine a weight of items that may be used for item identification. The scale module 110 may be one of two weight scales of the mobile apparatus 100, with a second scale positioned at a user-facing module 120 for weighing sell-by-weight items. The sell-by-weight scale may be a certified scale for selling produce by weight located near the handlebar of the mobile apparatus 100 and additionally the basket 112 may be weighed to aid with product verification and fraud and abuse mitigation.

The scale module 110 that couples the basket 112 to the lower frame 104 includes a plurality of load cells within the scale module 110 that provide for support of the basket 112 and connection through the load cells to the lower frame 104. The scale module 110 may, in an example include three load cells that may include analog load cells and/or load cells with embedded or combined circuit board to provide a digital output that may be consumed by a computing device of the user-facing module or other computing device of the mobile apparatus 100.

In an example, the scale module 110 includes three load cells that include analog load cells each rated to around two hundred kilograms or more. In a particular example, the load cells may be capable of supporting a load of up to 175 kilograms or more. In this manner, the total limit of the load cells may be up to or in excess of six hundred kilograms. The load cells may include single point load cells that are combined as a set of three load cells to provide for a moment reaction in response to loading of the cantilevered basket 112. The basket 112 may have a length of eight hundred or more millimeters and therefore loading of the basket 112 may result in a moment that may exceed the capacity of a typical load cell and may, as a single load cell, not be able to account for the cantilevered moment as a result of loading the basket 112 at a distance from the scale module 110.

In some examples, the scale module 110 may include three or four load cells. The use of three load cells may decrease cost and complexity as the three load cells may be used to define a plane and provide for determination of the weight of the item based on the readings from the three load cells within the scale module 110. The scale module 110 as described herein may be configured to discriminate weight changes of fifteen grams or less and maintain accuracy requirements of +/−5% over the operational range of the scale module 110. Further, the scale module 110 provides for a basket scale that can support a load of 175 kilograms centered in the basket and an additional 135 kilograms on the tip (or leading edge) of the basket 112 without degradation in weighing performance (in an operating range of 0-70 kg). The performance is achieved in part through the use of adjustable rear hard stops at the rear of the scale module 110 and fixed hard stops above and below the front of the scale module 110. The scale module 110 is built to have a modular interface with the ability to support both wire mesh and plastic baskets of mobile apparatuses 100.

In some examples, the load cells may include single point load cells, planar beam load cells, or other types of load cells. Further, the use of the digital load cell, or load cell with a circuit board embedded therein provides for minimizing analog leads to reduce susceptibility to electromagnetic interference, connector degradation susceptibility, and reduce the footprint of a related circuit board.

The scale module 110 is constructed using two plates or interfaces that couple together through the plurality of load cells. In an example, the plates may include plastic, aluminum, steel, or other rigid materials. In a particular example, the plates may be formed of diecast aluminum coupled through three load cells. The plates are configured to connect to the lower frame 104 and to the basket 112 of the mobile apparatus 100, with each plate having an interface to securely and releasably connect.

The load cells are arranged between the top plate and the bottom plate such that the front of the scale module has two load cells and the rear of the scale module has a single load cell to form a plane using the three load cells. Due to the cantilevered nature of the basket 112, the front of the scale module 110 may experience greater loads, and therefore has two load cells. The load cells at the front of the scale module are positioned at a distance or length along the length of the basket, with a first load cell on a first lateral side and a second load cell on a second lateral side of a center of the basket 112.

The scale module 110 includes overload controls or hard stops internally to prevent overloading and deforming the load cells. In some instances, there may be hard stops or overload controls at the front and back of the scale module. The front of the scale module 110 may include hard stops to prevent overcompression of the load cells while the rear hard stops may be configured to prevent overcompression or overtension of the load cells based on a moment produce by loading the basket 112 (e.g., a load at the front of the basket 112 inducing compression at the front of the scale module and tension or compression at the rear of the scale module 110).

In a particular example, a bolt may be threaded into a top plate of the scale module 110 and capped relative to the bottom plate such that the bolt bottoms out before the load cells are overcompressed. The bolt may be secured using a serrated flanged head locking nut to secure the overload setting and the gap may be set by adjusting the position of the bolt. An overload control at the front of the scale module 110 may be built into the bottom plate and located below the live end of each front load cell (e.g., where the load cells are able to deflect). A gap is set using the slot window and locked down with the same manner as the rear overload controls. Front up-lift loads are minimal due to the scale-basket geometry. Both front and rear compression loads are controlled within the nominal capacity limits of the load cells.

Figure 3:
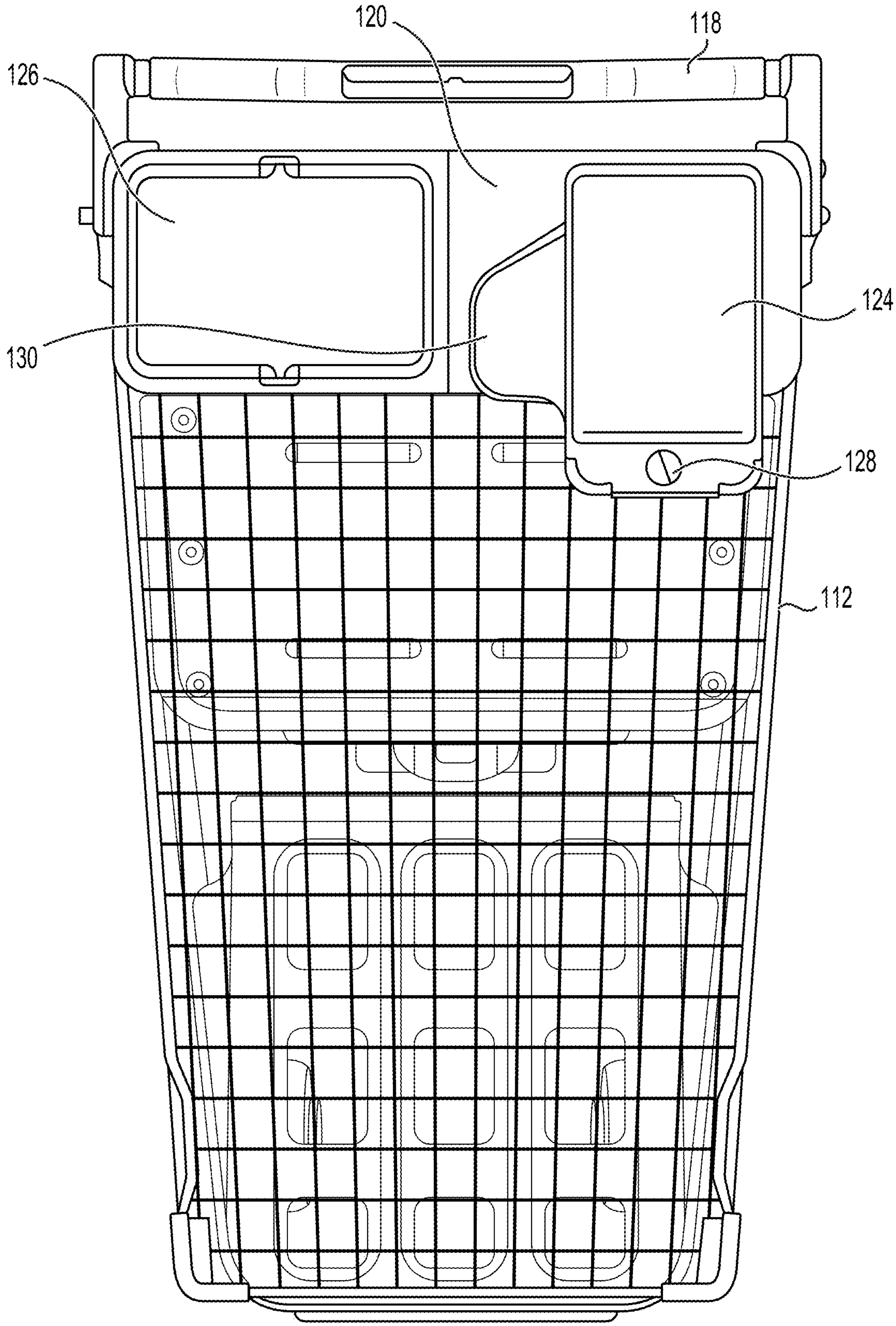
FIG. 3 illustrates a top view of the mobile apparatus of FIG. 1.
Figure 4:
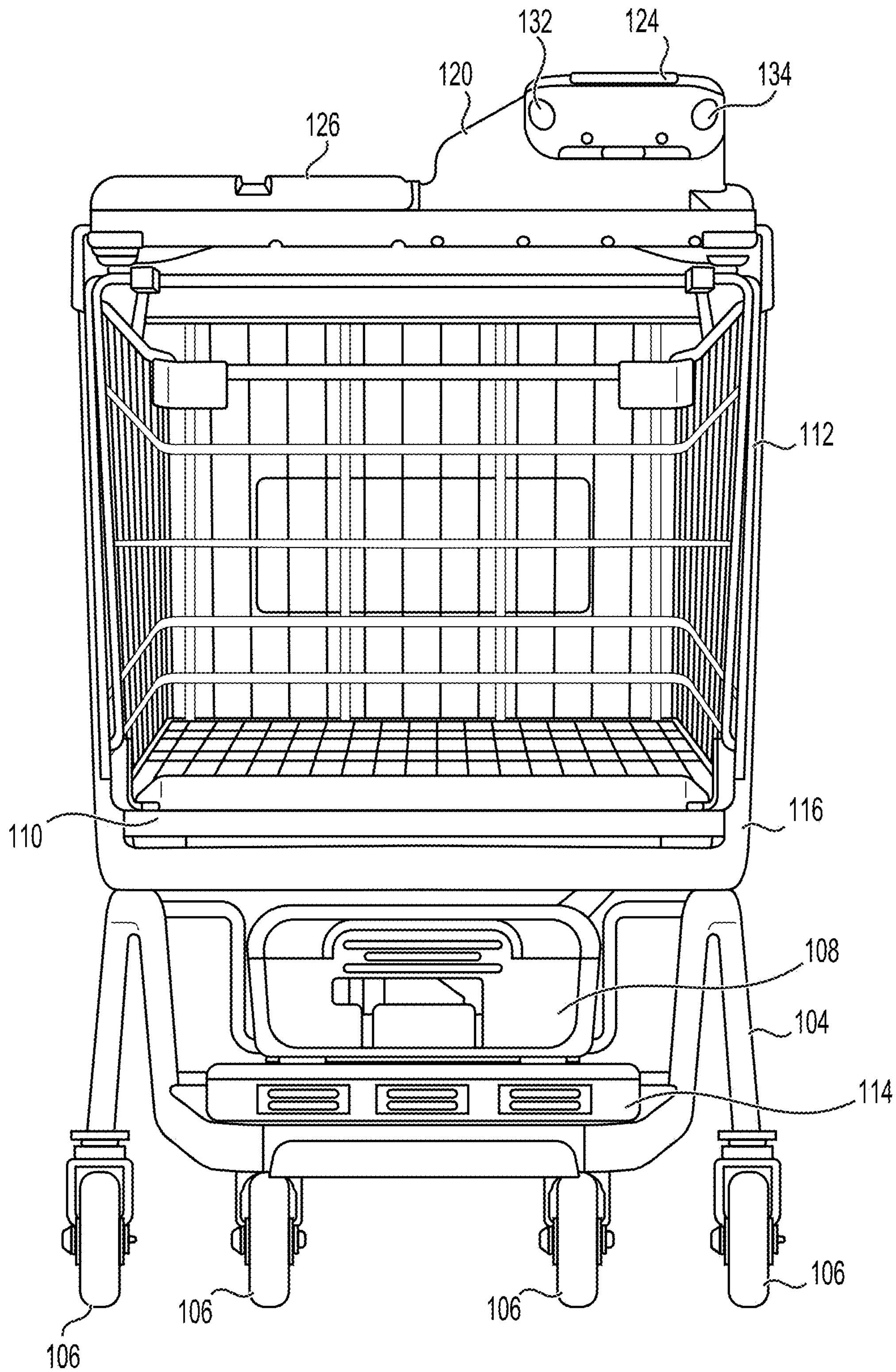
FIG. 4 illustrates a front view of the mobile apparatus of FIG. 1.
Figure 6:
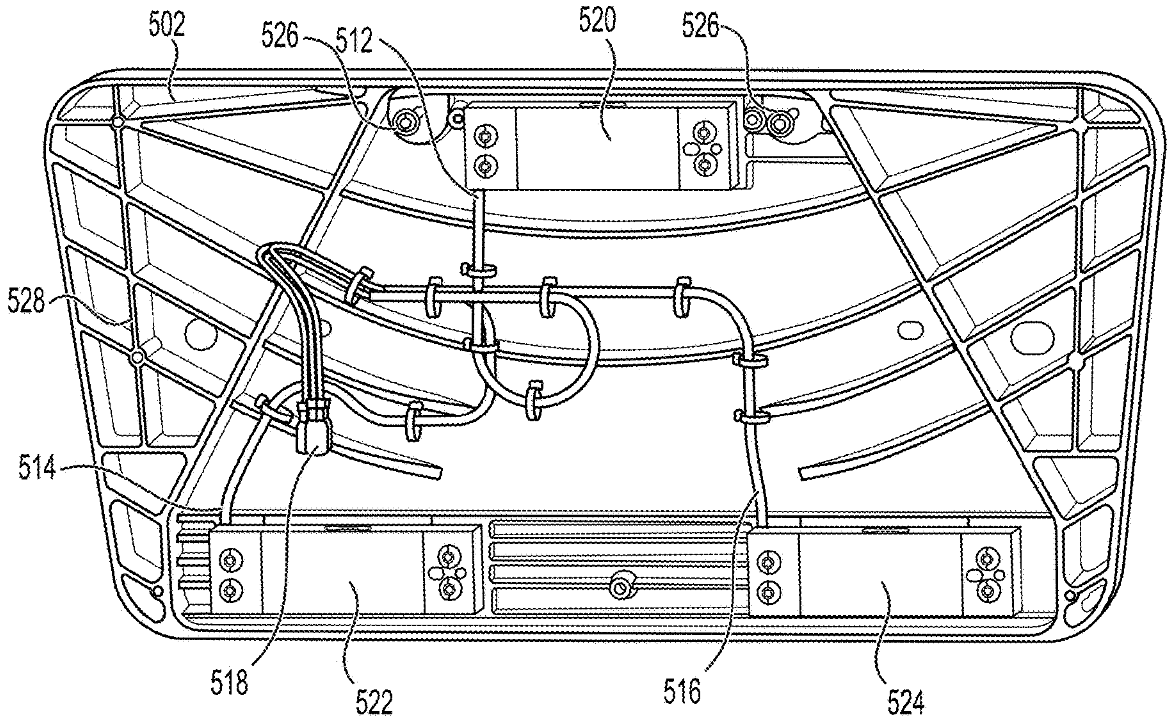
FIG. 6 illustrates a bottom view of a floating plate of a scale module of a mobile apparatus, according to at least one example.

The scale module 110 is the connection point between the basket 112 and the lower frame 104 such that any weight placed within the basket 112 is detected by the load cells of the scale module 110. The basket 112 does not couple to the upper frame 116. In some examples, such as depicted in FIG. 3, the scale module may extend less than half the length of the length of the basket 112. This results in the cantilever of the basket 112 and the load cells are loaded with the load cells arranged at the front of the scale module 110 carrying a greater portion of the load, and therefore distributed across two load cells positioned at the front of the scale module, as depicted in FIG. 6.

Figure 5:
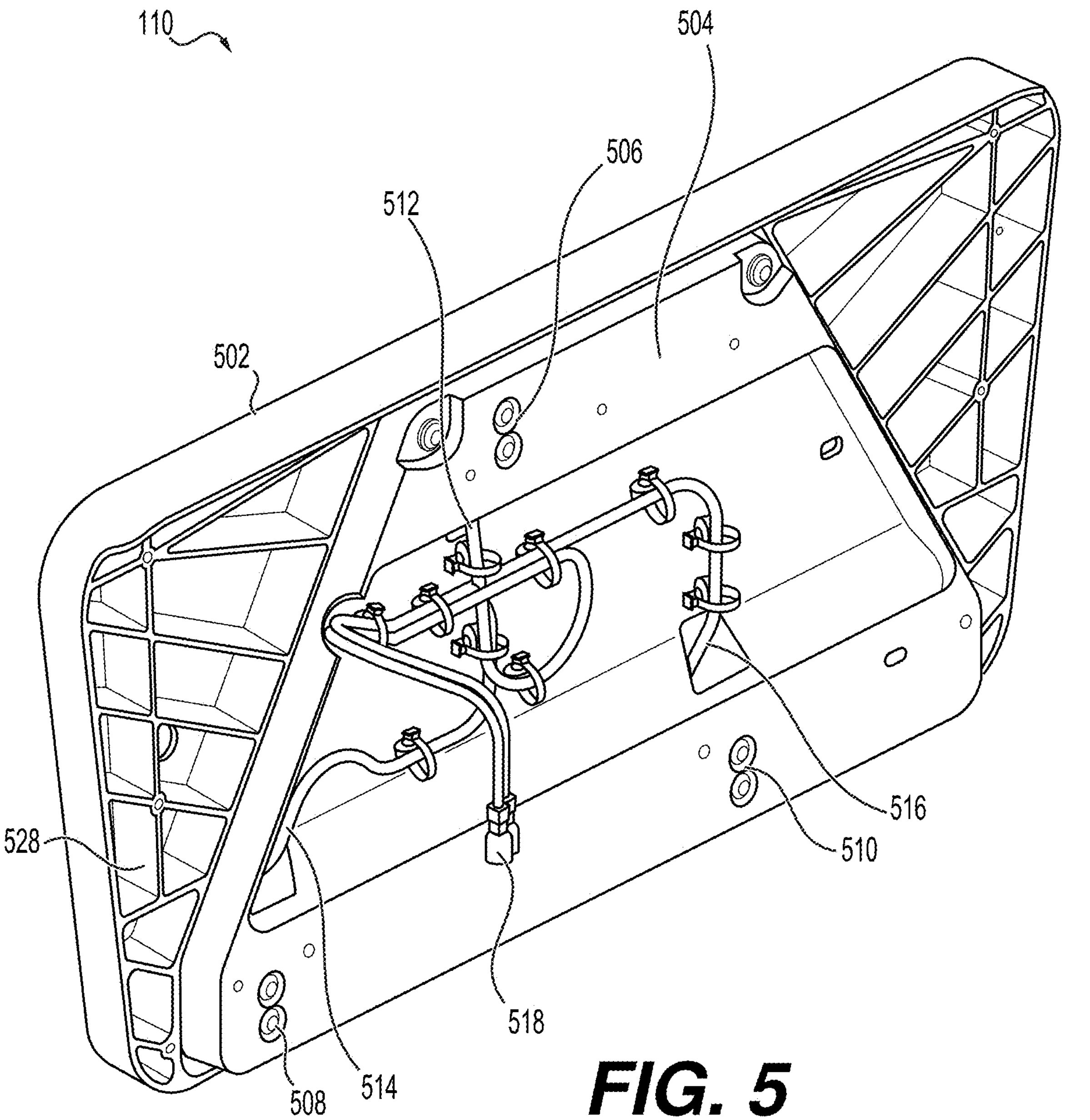
FIG. 5 illustrates a perspective view of a scale module of a mobile apparatus, according to at least one example.

FIG. 5 illustrates a perspective view of a scale module 110 of a mobile apparatus 100, according to at least one example. The scale module 110 is used to produce weight data for items placed within the basket 112. The scale module 110 connects to a computing device of the mobile apparatus 100, such as a computing device included within the power unit 108 and/or a user-facing module 120 of the mobile apparatus. The scale module 110 includes a communication connection 518 coupled through connections 512, 514 and 516 to the load cells included within the scale module 110. The communication connection 518 provides for connection to a computing device to provide data from the load cells to the computing devices. In some examples, the communication connection 518 includes a digital signal connection for data from an on-board circuit board of the load cells that converts an analog signal from the load cells to a digital signal for consumption and use by a computing device to determine a weight of an item placed within the basket 112. The communication of digital signals may prevent electromagnetic interference with analog signals from the load cells and thereby increases the accuracy and performance of the scale module 110.

The scale module 110 includes a top plate 502 and a bottom plate 504 with load cells positioned in-between and coupling the top plate 502 to the bottom plate 504. The top plate 502 is formed of a rigid material such as die cast aluminum, aluminum, steel, other metal or other rigid material such as a thermoplastic or other such material. The top plate 502 includes structural ribs 528 to provide rigidity and prevent flexing in the top plate 502. The structure and the material of the top plate 502 may be selected and designed to prevent and/or reduce flex in the scale module to provide for accuracy in the weight sensor data output by the load cells. The bottom plate 504 may similarly be formed of a rigid material such as die cast aluminum, aluminum, steel, other metal or other rigid material such as a thermoplastic or other such material. In some examples the top plate 502 and the bottom plate 504 may be formed of similar or dissimilar materials. The bottom plate 504 may include structural ribs to provide rigidity and prevent flexing in the bottom plate 504. The structure and the material of the bottom plate 504 may be selected and designed to prevent and/or reduce flex in the scale module to provide for accuracy in the weight sensor data output by the load cells. The rigidity and reduction of flex in the scale module 110 enables the load cells within the scale module to be co-planar and provide for accurate weight measurements by the scale module 110.

The bottom plate 504 connects to the load cells at connections 506, 508, and 510. The connections 506, 508, and 510 couple to one side and/or end of the load cells while a second end of the load cells is coupled to the top plate 502. In this manner, the connection between the top plate 502 and the bottom plate 504 passes through the load cells such that force applied to the basket 112 passes through the load cells and the signals from the load cells may be used to determine weight of items in the basket 112.

FIG. 6 illustrates a bottom view of a top plate 502 of a scale module 10 of a mobile apparatus 100, according to at least one example. The top plate 502 includes structural ribs or fins for providing strength and rigidity and may be cast or otherwise connected or affixed to the top plate 502. The top plate, as shown in FIG. 6 also illustrates load cells 520, 522, and 524 should coupled to the top plate through threaded connectors at a first end of each, though other connection mechanisms are contemplated.

The load cells 520, 522, and 524 are arranged with a primary axis along their length perpendicular to the length of the basket 112 when coupled together. In this manner, the load cells 520, 522, and 524, shown having a rectangular prism shape (though other shapes may be implemented) are arranged to allow deformation of the load cells in a direction perpendicular to the surface of the top plate 502. By orienting the load cells 520, 522, and 524 perpendicular to the length of the basket 112, the amount of travel afforded to the load cells is increased compared with arranging the load cells with their length parallel with the length of the basket 112.

The load cells 520, 522, and 524 are arranged with a length of each of the plurality of load cells perpendicular to a length of the basket 112, due to the relatively short distance along the length of the cart that the scale module 110 traverses (e.g., as a result of the nesting ability of the carts and the need for the basket to be cantilevered to enable the cart nesting, the load cells 520, 522, and 524 may be stiffer when oriented perpendicular to the length of the smart shopping cart and/or basket 112. This arrangement allows for an increased reaction distance for the load cells 520, 522, and 524. The load cells 520, 522, and 524 may include three load cells arranged in a triangular arrangement with a load cell 520 positioned within the scale module adjacent a rear of the basket and with a load cell 522 and a load cell 524 positioned within the scale module 110 positioned at a first position along the length of the basket 112. Each of the load cells 520, 522, and 524 may include an embedded circuit board configured to receive an analog output from a respective load cell and output a digital signal to communicate to the user-facing module or other computing device.

The scale module provides for a basket scale that can support a load of 175 kilograms centered in the basket and an additional 135 kilograms on the tip (or leading edge) of the basket without degradation in weighing performance (in an operating range of 0-70 kg). The performance is achieved in part through the use of adjustable rear hard stops 526 at the rear of the scale module and fixed hard stops above and below the front of the scale module. The scale module is built to have a modular interface with the ability to support both wire mesh and plastic baskets of mobile apparatuses.

The scale module 110 includes overload controls or hard stops within the clearance 808 to prevent overloading and deforming the load cells. In some instances, there may be hard stops or overload controls adjacent the front and back edges of the scale module 110, for example at the clearance 808 such that deflection of the load cells 520, 522, and 524 may be limited. The front of the scale module 110 may include hard stops to prevent overcompression of the load cells while the rear hard stops may be configured to prevent overcompression or overtension of the load cells based on a moment produce by loading the basket 112 (e.g., a load at the front of the basket 112 inducing compression at the front of the scale module and tension or compression at the rear of the scale module 110).

Figure 7:
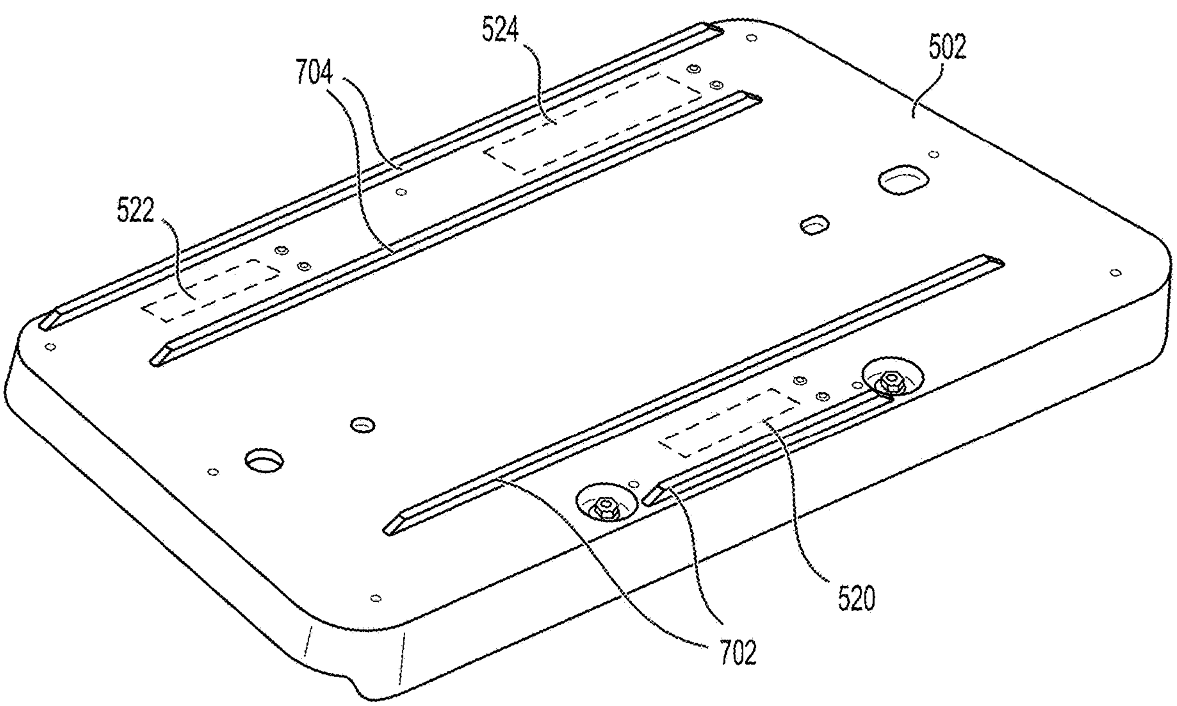
FIG. 7 illustrates a top view of the floating plate of the scale module, according to at least one example.

FIG. 7 illustrates a top view of the top plate 502 of the scale module 110, according to at least one example. The top plate 502 includes interfaces 702 and 704 configured to receive features of the basket 112 to secure the basket 112 to the top plate 502. The interfaces 702 and 704 are depicted as short walls or ridges that may surround, partially, a respective feature of the basket 112 such as a mounting bar or bracket. Additionally, fasteners such as threaded fasteners or other such features may be used to secure the basket 112 to the top plate 502 such that any force applied to the basket (e.g., applied weight) is transferred directly to the top plate 502.

Figure 8:
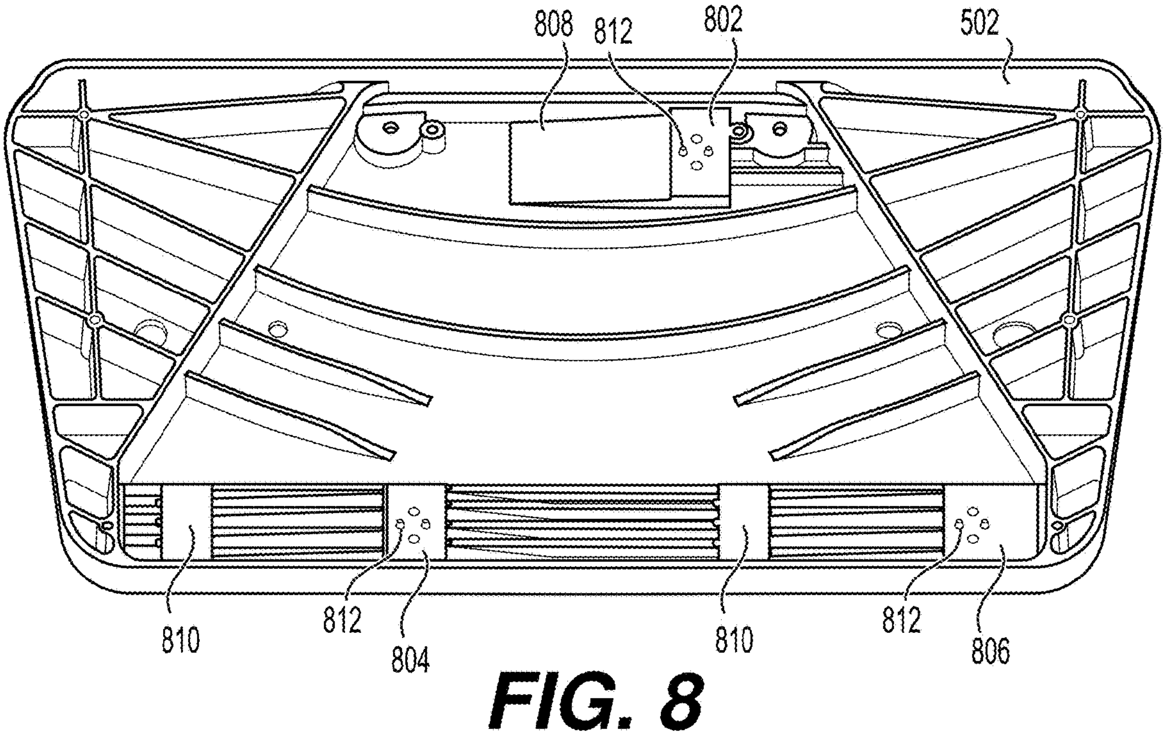
FIG. 8 illustrates a bottom view of the floating plate with the load cells, according to at least one example.

FIG. 8 illustrates a bottom view of the top plate 502 with the load cells, according to at least one example. The underside of the top plate 502 includes mounting features 802, 804, and 806 for receiving the load cells 520, 522, and 524. The mounting features 802, 804, and 806 may included threaded fasteners to secure the load cells to the top plate 502. Additionally, the underside of the top plate 502 includes clearance 808 for deflection of a load cell as well within the space between the top plate 502 and the bottom plate 504. The top plate 502 includes hard stops 810 for preventing overstressing of the load cells as a backstop in the event of overloading of the basket 112. The top plate 502 includes pins 812 that pass through openings in the for receiving pins that pass through the load cells. The pins 812 may slide into openings of bottom plate 504 to prevent movement in a direction other than perpendicular to the surface of the top plate 502 and bottom plate 504.

Figure 9:
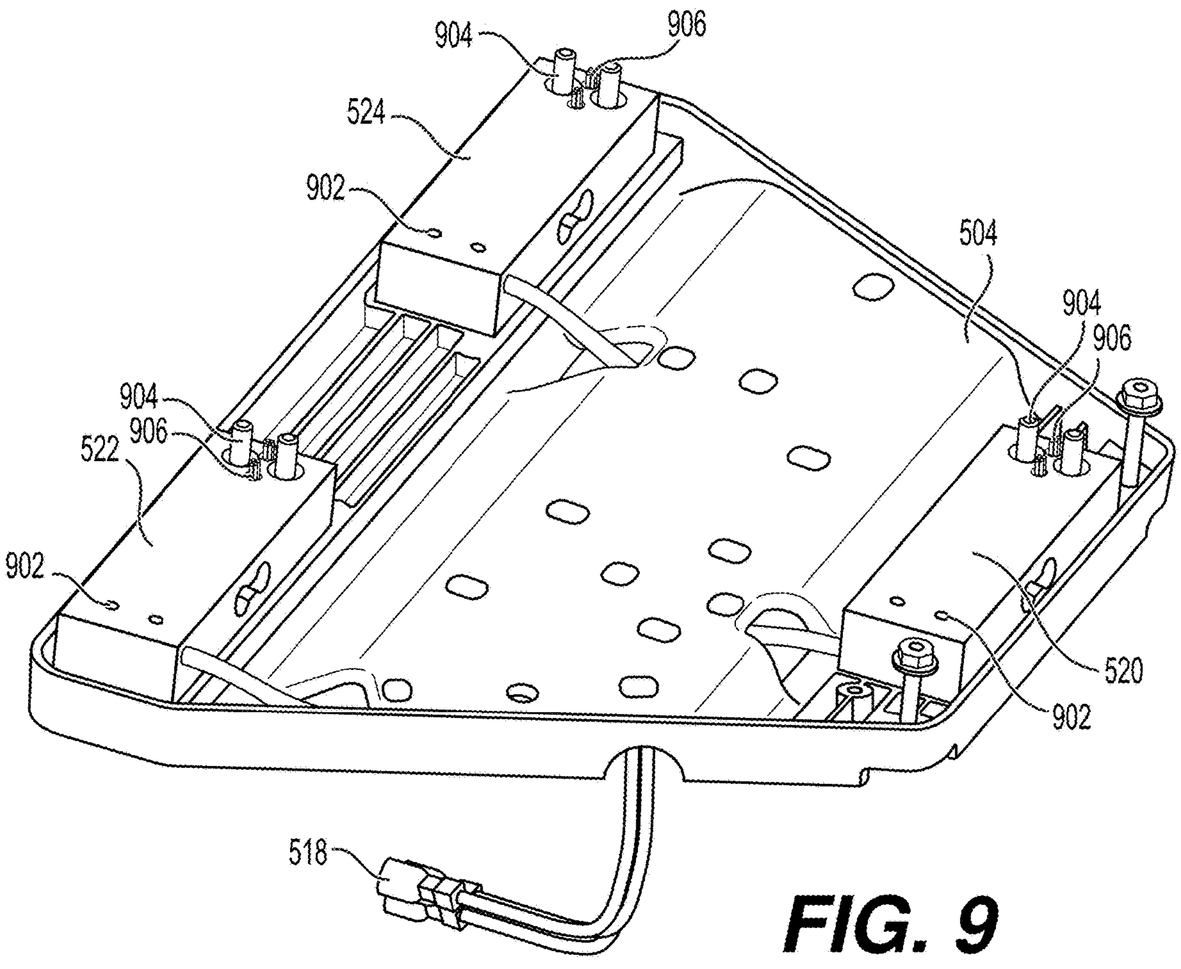
FIG. 9 illustrates a fixed plate of the scale module, according to at least one example.

FIG. 9 illustrates a bottom plate 504 of the scale module 110, according to at least one example. The bottom plate 504 may be formed of a similar or identical material to the top plate 502, for example a diecast aluminum, steel, thermoplastic, or other such rigid material. The bottom plate 504 may couple directly or indirectly to the lower frame 104. The bottom plate 504 is coupled to the load cells 520, 522, and 524 through attachments 902 and fasteners 904. The fasteners 904 pass through attachments 902 and connect to the bottom plate 504. At the opposite end of the load cells, the attachments 902 are used to connect to the top plate 502. The bottom plate 504 is also illustrated showing pins 906 that provide for maintaining alignment of the top plate 502 and the bottom plate 504. The pins 906 may be fixed to one of the top or bottom plate and may be free to move along a single axis (e.g., Z-axis) and prevent side-loading or sideways deflection of the load cells. The pins 906 pass through the load cells between the top plate 502 and the bottom plate 504. Further, the perimeter of the top plate 502 and the bottom plate 504 include a ledge or wall that extends perpendicular to the surface of the top plate 502 or bottom plate 504 and the walls overlap in height when the scale module 110 is assembled to prevent ingress of debris, liquids, or material into the scale module 110.

Figure 10:
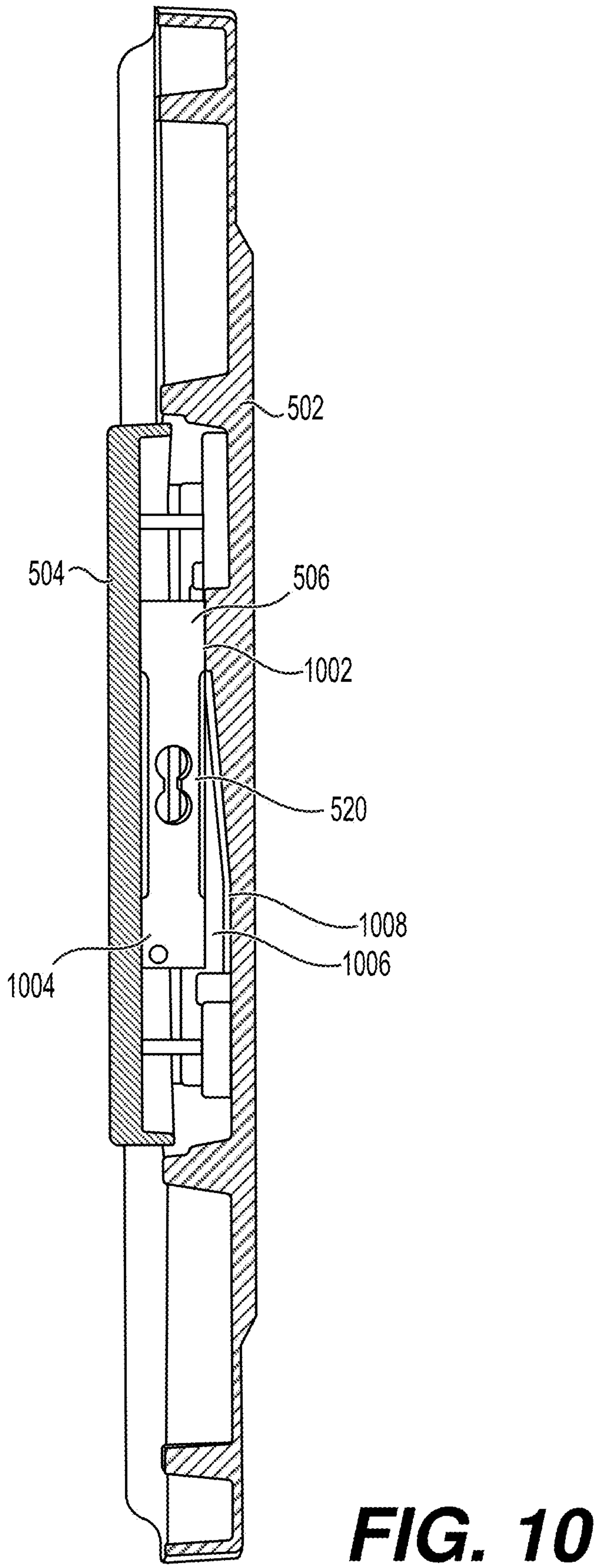
FIG. 10 illustrates a section view of the scale module of the mobile apparatus, according to at least one example.

FIG. 10 illustrates a section view of the scale module 110 of the mobile apparatus 100, according to at least one example. As shown in the section view, the top plate 502 and the bottom plate 504 are coupled together through the load cell 520. The load cell is coupled to the top plate 502 at a first end 1002 and to the bottom plate 504 at a second end 1004. A gap between the load cell 520 at the second end 1004 and the top plate 502 allows for deflection and movement of the load cell relative to the top plate 502. After the load cell deforms by a predetermined amount, the load cell 520 bottoms out or contacts the hard stop 1008. At the opposite edge of the scale module, the adjustable stops may be contacted to prevent overstressing the load cells, as shown in FIGS. 5-9.

Figure 11:
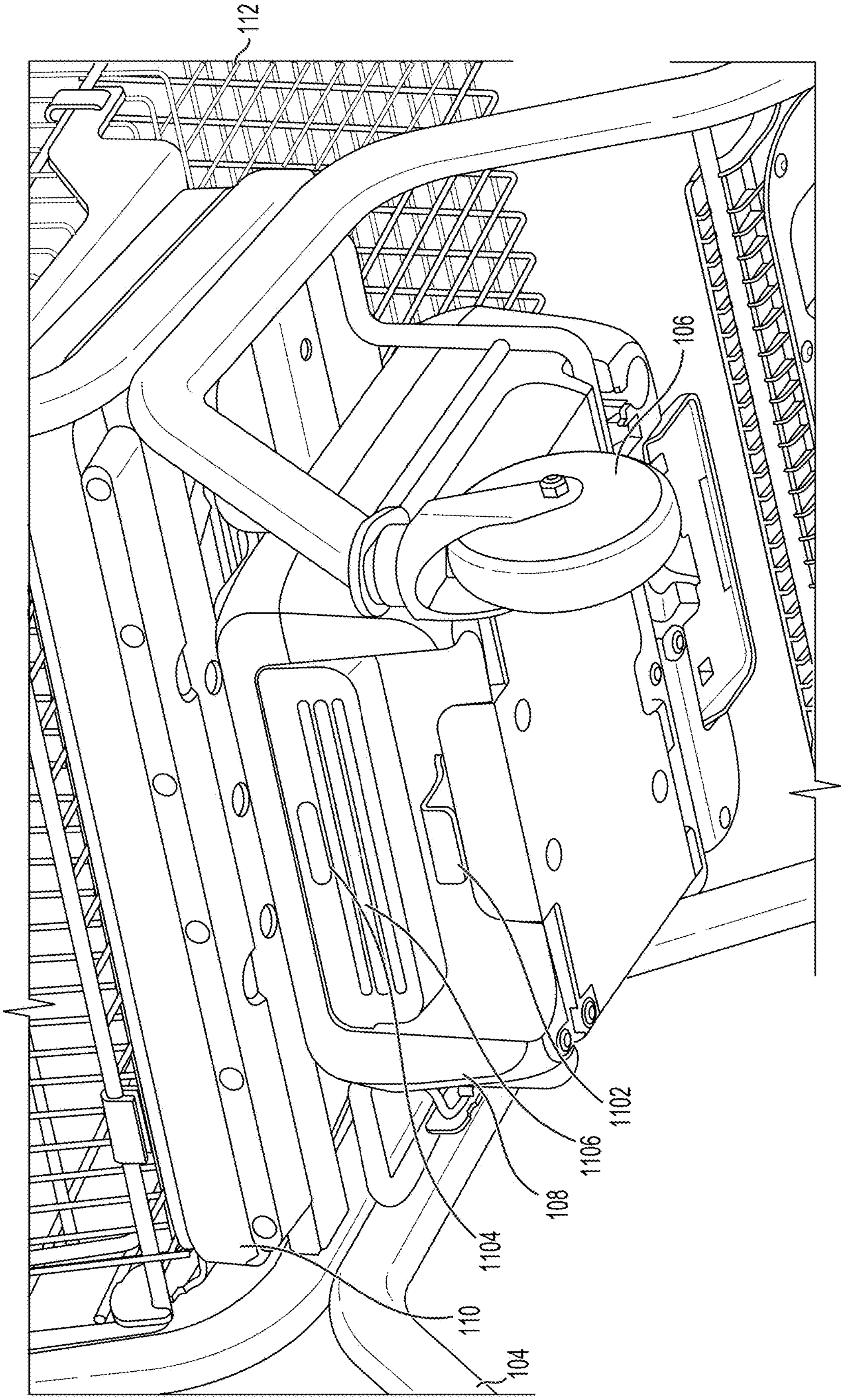
FIG. 11 illustrates a bottom portion of the mobile apparatus including the scale module and a battery pack module and computing system, according to at least one example.

FIG. 11 illustrates a bottom portion of the mobile apparatus 100 including the scale module 110 and a power unit 108, according to at least one example. The power unit, described with respect to FIGS. 23-29, provides a battery compartment as well as a housing for a computing device of the mobile apparatus 100. In some examples, the power unit 108 includes a set of power storage units (e.g., batteries) and also a processing component and computer-readable media having instruction stored thereon to perform operations of the mobile apparatus 100.

As described in further detail below, the power unit 108 is coupled to the frame 104 and includes a latch 1102, alignment feature 1104, and charging ports 1106. The latch 1102 is configured to interface with a latching mechanism, shown in FIG. 12 and described in further detail with respect to FIGS. 23-29. The latch 1102 enables the mobile apparatuses to remain coupled together while charging and prevent disconnection while charging.

The alignment feature 1104 and the charging ports are used for interfacing with charging blades and/or a handheld connector, as shown in FIG. 23 to receive power for charging the power unit 108 as well as providing power to a subsequent mobile apparatus in a sequence of nested mobile apparatuses 101.

Figure 12:
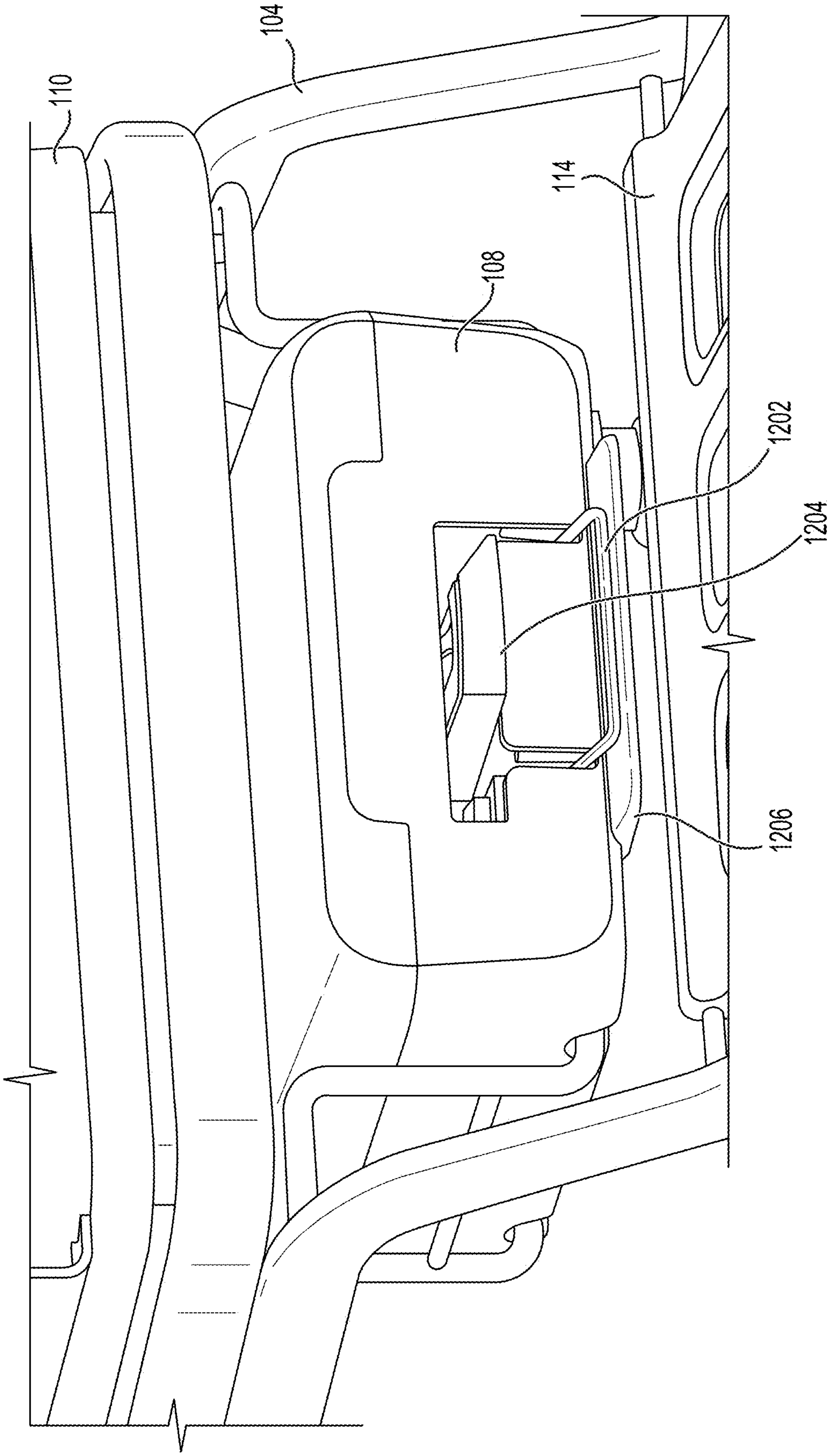
FIG. 12 illustrates a front view of the battery pack module and computing system of FIG. 11, according to at least one example.

FIG. 12 illustrates a front view of the power unit 108 of FIG. 11, according to at least one example. The power unit 108 is configured to receive power at the charging ports 1106 for charging a battery contained in the power unit 108 as well as to provide power to a subsequent nested mobile apparatus. In this manner, the mobile apparatuses may be coupled together in a series and connected to a power source at the end of the row of nested mobile apparatuses and through the charging components of the power unit 108, pass power to each of the nested mobile apparatuses.

The power unit 108 includes a latch 1202 to secure the nested mobile apparatuses together as well as charging blades 1204 and alignment features 1206 to align and electrically connect the mobile apparatuses, as shown and described with respect to FIGS. 23-29.

Figure 13:
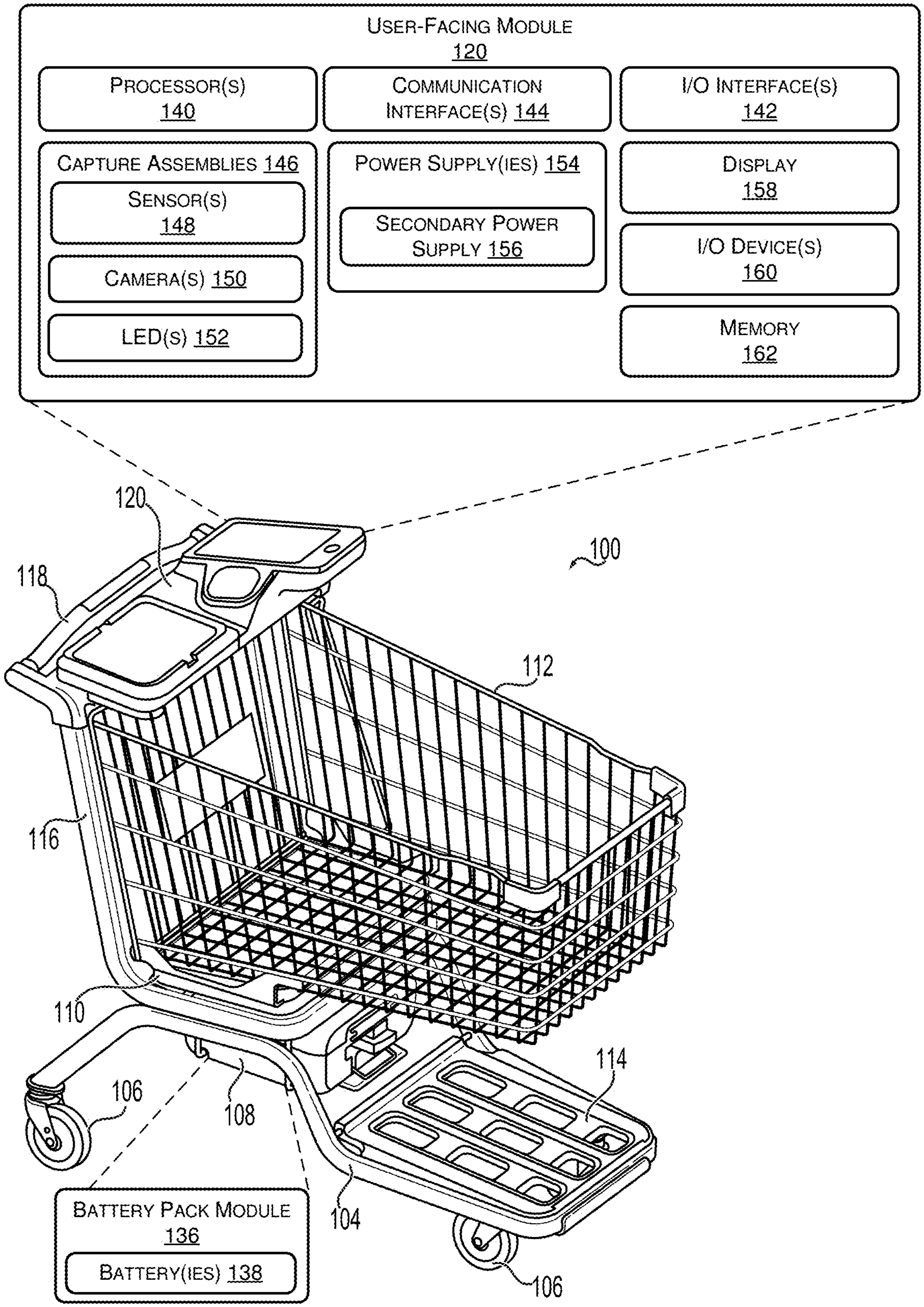
FIG. 13 illustrates a mobile apparatus for enabling customized retail environments including a user-facing module for user interaction and item and location tracking, according to at least one example.

FIG. 13 illustrates a mobile apparatus 100 for enabling customized retail environments including a user-facing module 120 for user interaction and item and location tracking, according to at least one example. The user-facing module 120 may include one or more processors 140 configured to execute one or more stored instructions. The processor(s) 140 may comprise one or more cores. The user-facing module 120 may include one or more input/output (I/O) interface(s) 142 to allow the processor(s) 140 or other portions of the user-facing module 120 to communicate with other devices. The I/O interface(s) 142 may comprise Inter-Integrated Circuit (I2C), Serial Peripheral Interface bus (SPI), Universal Serial Bus (USB) as promulgated by the USB Implementers Forum, and so forth. The I/O interface(s) 142 may allow the various modules/components to communicate with each other and/or control each other.

The user-facing module 120 may also include one or more communication interfaces 144. The communication interfaces 144 are configured to provide communications between the user-facing module 120 and other devices, such as the server(s), sensors, interface devices, routers, and so forth. The communication interfaces 144 may include devices configured to couple to personal area networks (PANs), wired and wireless local area networks (LANs), wired and wireless wide area networks (WANs), and so forth. For example, the communication interfaces 144 may include devices compatible with Ethernet, Wi-Fi™, and so forth. The user-facing module 120 may also include one or more busses or other internal communications hardware or software that allow for the transfer of data between the various modules and components of the user-facing module 120.

The user-facing module 120 may also include the one or more capture assemblies 146 that each include one or more sensor(s) 148, a camera 150, and one or more LED(s) 152. In some examples, the sensor(s) 148 may comprise any type of sensor that is able to detect the presence of nearby objects without the need for physical contact (e.g., radar, ToF sensor(s), PIR sensor(s), capacitive sensor(s), etc.). The sensor(s) 148 may be positioned to face towards and/or into the basket 112 and may also be directed to a region adjacent to the mobile apparatus 100. The sensor(s) 148 may include a radar device directed towards the basket 112 to detect the presence of new items and trigger one or more additional sensors such as the camera 150 to capture data only when triggered. In this manner, the system may save power and energy to conserve power throughout a service period.

The cameras 150 in each of the capture assemblies 146 may comprise any type of camera or imaging device configured to generate image data (and/or video data), or information descriptive of a plurality of picture elements or pixels. The LED(s) 152 may be selectively activated to emit light at any wavelength, visible or non-visible to users. In some examples, one or more capture assemblies 146 may additionally, or alternatively, be facing downward into the basket 112 of the user-facing module 120. Additionally, the user-facing module 120 may include one or more cameras 150 that are outward facing in that generate image data representing the facility around the user-facing module 120.

The user-facing module 120 may include one or more power supply(ies) 154 to provide power to the components of the user-facing module 120, such as a battery pack module 136 (e.g., a battery), which include one or more batteries. The power supply(ies) 154 may also include a secondary (e.g., internal) power supply to allow for hot swapping of battery pack modules 136, such as one or more capacitors, internal batteries, etc.

In some examples, the power supply(ies) 154 may be separate from the user-facing module 120. For instance, the battery pack module 136, battery(ies) 138, and/or secondary power supply 156 may be in a separate module, such as the power unit 108 which includes a charging port for charging the power supply(ies) 154 through one or more different modes. The user-facing module 120 may connect through a power conduit to the battery pack module 136 and/or battery(ies) at the power unit 108, shown at the bottom of the mobile apparatus 100. The charging port may include an opening for receiving the removable battery that provides power to the electrical components of the mobile apparatus. In some examples, the mobile apparatus may include a rail system that guides the battery into the opening when installing the battery into the mobile apparatus and/or guides the battery out of the opening when removing the battery from the mobile apparatus. For example, the opening may include a first rail feature that is configured to "slide into" a second rail feature of the battery when an associate is inserting the battery into the opening and/or removing the battery from the opening. In some examples, the rail system guides the battery using an angle such that the battery may be removed from and/or inserted into the mobile apparatus even when the mobile apparatus is "nested" with other mobile apparatus(es).

The user-facing module 120 may also include the display 158 configured to display content represented by image data, such as pictures, videos, user interface elements, and/or any other image data. The display 158 may comprise any type of display 158 and may further be a touch screen to receive touch input from a user. The user-facing module 120 may also include one or more input/output devices (I/O device(s) 160) such as weight scale, microphones, loudspeakers, and other such items to facilitate input and output with a user, and/or to receive feedback from the user.

The user-facing module 120 may also include other types of sensor(s). As described herein, these sensor(s) may proximity sensor(s), light sensor(s), weight sensor(s) and/or the like.

The user-facing module 120 may include one or more memories 162 (e.g., in an electronics box module along with the processor(s) 140). The memory 162 comprises one or more computer-readable storage media (CRSM). The CRSM may be any one or more of an electronic storage medium, a magnetic storage medium, an optical storage medium, a quantum storage medium, a mechanical computer storage medium, and so forth. The memory 62 provides storage of computer-readable instructions, data structures, program modules, and other data for the operation of the user-facing module 120.

Figure 14A:
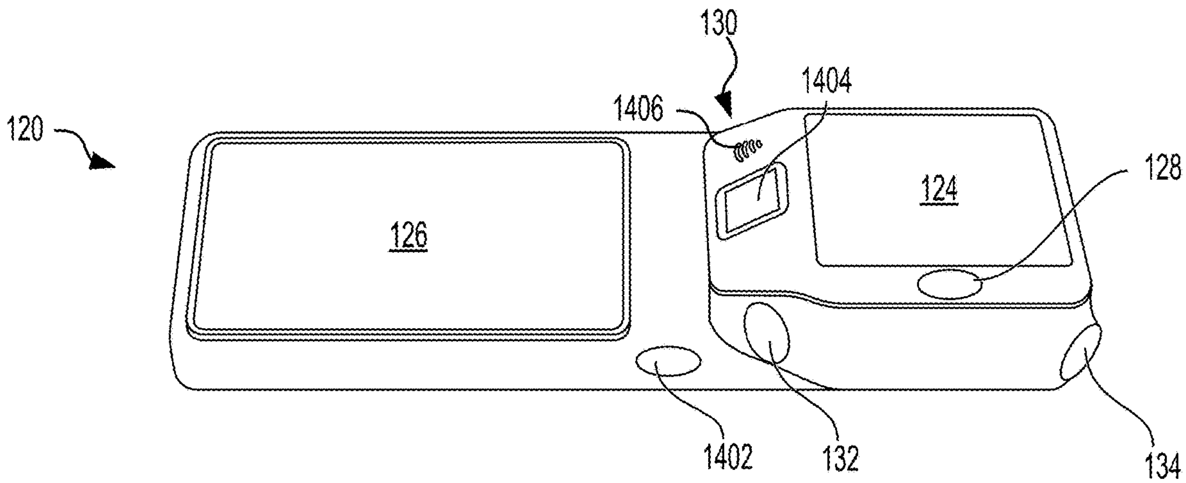
FIGS. 14A-14B illustrate perspective views of a user-facing module of a mobile apparatus, according to at least one example.
Figure 14B:
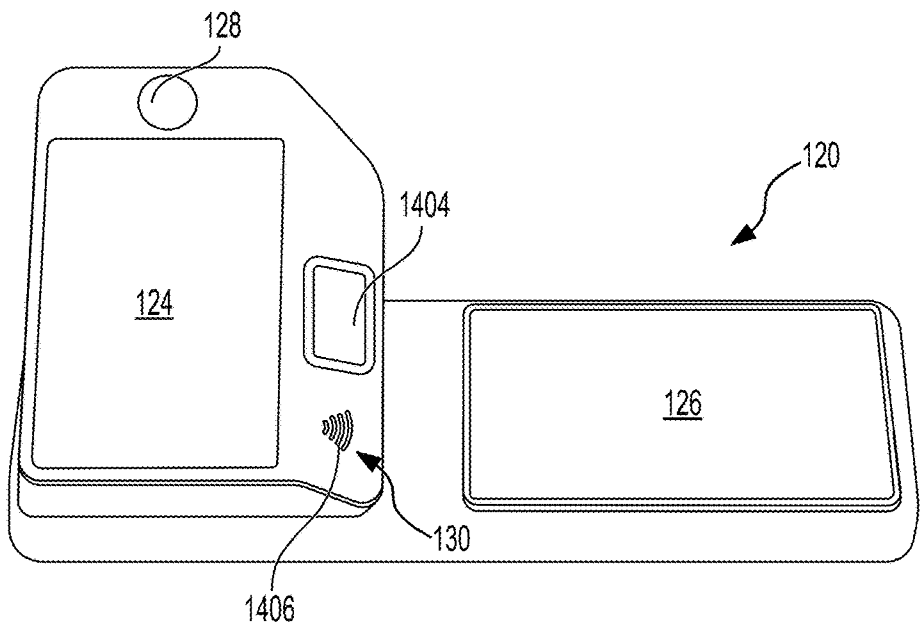

FIGS. 14A-14B illustrate perspective views of a user-facing module 120 of a mobile apparatus, according to at least one example. The mobile apparatus 100 may further include the user-facing module 120 that is coupled to the main frame of the mobile apparatus. The user-facing module 120 may include one or more imaging devices (e.g., cameras 128, 132, 134, and 1402, sensors 1404 and 1406 (e.g., scanner(s), proximity sensor(s), motion sensor(s), GPS trackers or sensing components, etc.), one or more lights, a display, product identification module 130, weight sensor 126 (e.g., scale), and/or any other type of electronic device. In some examples, the GPS tracker may be used for tracking a location of the mobile apparatus, for example to enable recovery of a mobile apparatus that is removed from an operating environment such as a retail store. The user-facing module 120 may be configured to use the imaging device(s) to perform various functions. For a first example, the user-facing module 120 may include cameras 132 and 1402 that are oriented towards the receptacle of the basket. In some examples, the user-facing module 120 includes two imaging devices oriented towards the receptacle of the basket while, in other examples, the user-facing module 120 may include any number of imaging devices oriented towards the receptacle of the basket. The mobile apparatus may thus use these imaging device(s) to identify items that are placed within the basket. For instance, the user-facing module 120 may receive image data generated by these imaging device(s), where the image data represents at least an item that is being placed within the basket by a user and/or an item that has already been placed within the basket. The user-facing module 120 may then analyze the image data, using one or more of the processes described herein, to identify the item.

The user-facing module 120 may include the product identification module 130 for identifying items brought to the mobile apparatus by a user. The product identification module 130 may include an illumination component and a sensing or detection component that gathers sensor data of an item for identification such as image data of an identification tag that may be scanned by the product identification module 130. The product identification module 130 may include the components shown and described with respect to FIGS. 17-18 herein. For instance, the product identification module 130 may include a proximity detection component such as an infrared time-of-flight sensor that may detect when an item is in the proximity of a read zone of the product identification module 130. The product identification module 130 may therefore trigger an image sensor or scanner component in response to data from the time-of-flight sensor in order to conserve resources and avoid scanning continuously.

For a second example, the user-facing module 120 may include imaging device(s) that are oriented towards the receptacle of the shelf or lower shelf. In some examples, the user-facing module 120 includes one imaging device oriented towards the receptacle of the shelf while, in other examples, the user-facing module 120 may include any number of imaging devices oriented towards the receptacle of the shelf. The mobile apparatus may thus use these imaging device(s) to identify items that are placed within the shelf. For instance, the user-facing module 120 may receive image data generated by these imaging device(s), where the image data represents at least an item that is being placed within the shelf by a user and/or an item that has already been placed within the shelf. The user-facing module 120 may then analyze the image data, using one or more of the processes described herein, to identify the item.

Figure 19A:
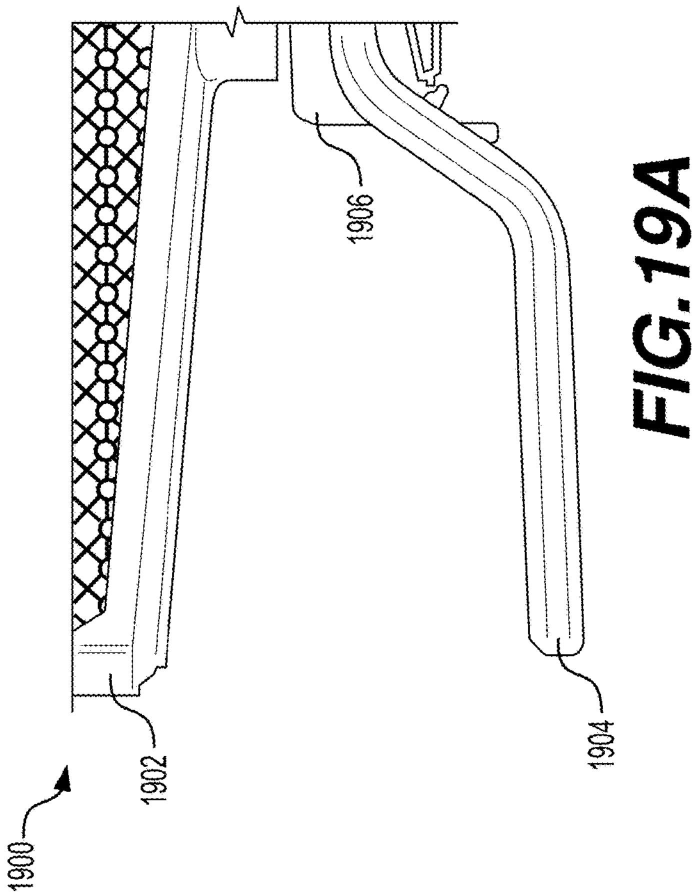
FIGS. 19A-19C illustrate a lower shelf and battery compartment of a mobile apparatus, according to at least one example.
Figure 19B:
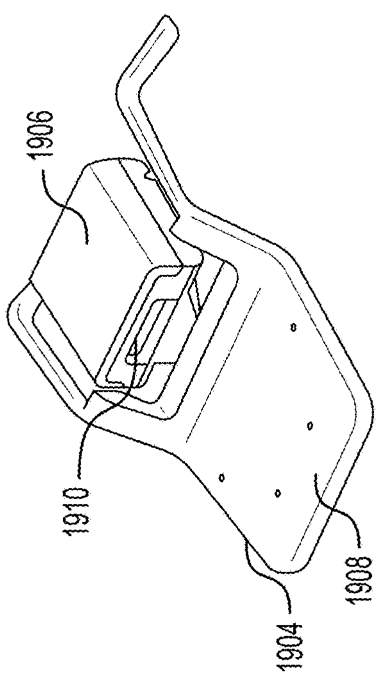
Figure 19C:
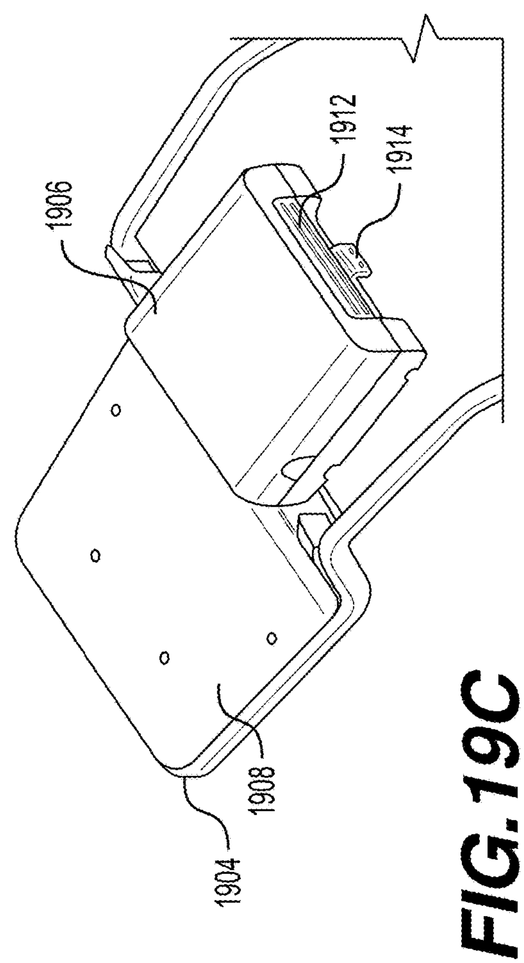
Figure 20:
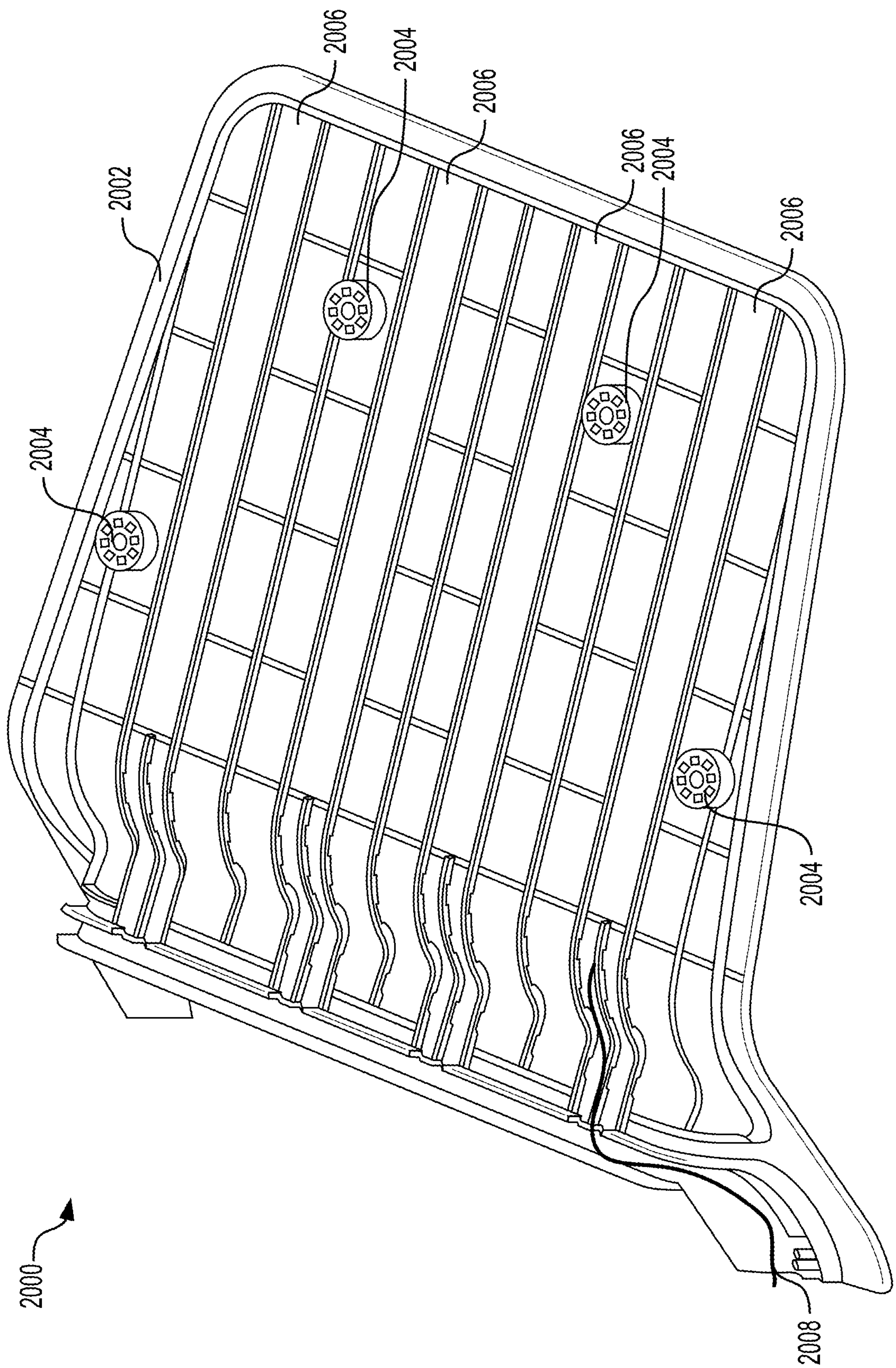
FIG. 20 illustrates capacitive sensors of the lower shelf of a mobile apparatus, according to at least one example.

In some examples, the user-facing module 120 may couple or communicate with a capacitive sensor on a shelf location of the mobile apparatus, for example as shown and described with respect to FIGS. 19-20. The capacitive sensors may be used for detecting items that are placed on a lower shelf or other location on the mobile apparatus that may not be visible to the cameras of the user-facing module 120. The capacitive sensor(s) may provide data indicative of a size of the item that may be correlated with an item scanned by the product identification module 130 and thereby ensure that all items placed within the mobile apparatus are the same as the items scanned by the user at the product identification module 130. The user-facing module 120 may include a sell-by-weight sensor 126 for weighing items that may be sold by weight such that items may be accurately accounted for.

For a third example, the user-facing module 120 may include imaging device(s) oriented substantially perpendicular with respect to a ground plane (e.g., oriented towards a ceiling of the facility) such as camera 128. In some examples, the user-facing module 120 includes one imaging device oriented substantially perpendicular with respect to the ground plane while, in other examples, the user-facing module 120 includes any number of imaging devices orientated substantially perpendicular with respect to the ground plane. The mobile apparatus 100 may then use these imaging device(s) to determine a location of the mobile apparatus within the facility. For instance, the user-facing module 120 may receive image data generated by these imaging device(s), where the image data represents a portion of the facility (e.g., the ceiling of the facility or from a side-facing camera of a shelf or storage location). The user-facing module 120 may then analyze the image data, using one or more of the processes described herein, in order to determine the location of the mobile apparatus within the facility as well as to perform other operations.

Additionally, the user-facing module 120 may include a product identification module 130 that may include one or more proximity and/or presence detection sensors as well as an illumination element and an imaging device configured to capture image data of a specific item when presented to the product identification module. The product identification module 130 may use a time of flight (ToF) sensor, capacitive sensor, proximity sensor, or other such sensor to detect a presence of an item in a read area of the camera. The camera may then be used for performing a product identification and establishing a tracking system for a product that is identified. In this manner, items that are selected by the user may have a complete chain of custody from selection by the user to completion of the transaction (e.g., leaving the facility).

The mobile apparatus may then be configured to update a virtual shopping cart for a user, where the virtual shopping cart represents the item(s) that have been placed within the receptacle(s), item(s) that have been placed on the tray, weight(s) of the item(s), price(s) of the item(s), and/or any other information. Additionally, the mobile apparatus may be configured to use the display associated with the user-facing module 120 to present the information to the user. This way, the user is provided with the most updated information associated with the shopping session while the user continues to place new items in the mobile apparatus.

The mobile apparatus, and specifically the user-facing module 120 described herein, integrates an Infrared Time-of-Flight (IR-ToF) sensor with a global shutter camera and illumination all contained within the product identification module 130 to provide a reliable and efficient barcode scanning experience for items selected by users. This integrated system may be intuitive for users as it may resemble a familiar checkout process and therefore improves accuracy and user experience, while reducing power consumption and computing load of the mobile apparatus for doing product identification and tracking after selection by a user. In particular, the system described herein uses the IR-ToF sensor to identify if an item is within the camera's field of view. When an object is detected by the IR-ToF sensor, the system may trigger the camera and a synchronized illumination device, where the illumination device may operate in a strobe mode. The synchronization between the strobe illumination and the global shutter camera's frame capture enables the camera to capture crisp, clear images devoid of motion blur. The clear images are used for product identification, particularly barcode scanning, and to provide a seamless and hassle-free experience for the user.

By activating the camera based on the IR-ToF sensor, the system can conserve power for illumination, and resource-intensive algorithms only when an object is present in the camera's field of view. In an example, the field of view of the IR-ToF sensor is divided into 16 (or more or less) sub-fields, with customizable thresholds for detecting an object in any of the sub-fields. This feature enables the system to avoid false detections, such as a user's hand when interacting with a screen of the user-facing module 120 or holding the handlebar.

A first algorithm processes the IR-ToF sensor's signals to ensure reliability under various lighting conditions, including outdoor lighting under sunlight. This first algorithm allows for detection of objects with varying properties, such as dark or light coloration and opaque or transparent materials. It also intelligently ignores objects, people, or store fixtures that are in the vicinity of the mobile apparatus but are not intended for scanning by the product identification module. The product identification module 130 includes the global shutter camera, illumination source, lens, cover glass, and IR-ToF sensor, all packaged into a compact, sealed module. This module is positioned and directed on the user-facing module 120 of the mobile apparatus to provide simple access by the user when scanning items to add to the cart.

Additionally, the systems and techniques provided herein enable a system for monitoring fraud and abuse in mobile apparatuses. The system employs one or more cameras on the user-facing module 120, for example two 12-megapixel rolling shutter cameras, each having a field of view of 180 degrees, such as cameras 132 and 134, which may continuously monitor the space and/or environment surrounding the mobile apparatus to ensure accurate identification and tracking of items. A camera 128, may be positioned on the user-facing module above the screen 124 and facing upward. This strategic placement provides a viewpoint encompassing the user-facing module 120, sell-by-weight sensor 126, and the product identification module 130. The first camera 206 may be tasked with identifying and tracking an item when it is scanned by the product identification module 130 and moved into the basket. In addition, the camera 128 may opportunistically use its view of ceiling features to localize the mobile apparatus within the facility for navigation and tracking.

A second camera 1402 faces the basket. Its position provides an overlapping field of view with the camera 132 to monitor all of the mobile apparatus' basket airspace. The second camera 1402 may be used for gathering image data that may be used for identifying any item that is being added to the mobile apparatus. Collectively, the camera 132 and second camera 1402 establish a "chain of custody" for each item added to the mobile apparatus. However, as a chain of custody algorithm may be resource-intensive, in some examples additional trigger mechanisms may be used to conserve power and compute utilization. Specifically, in a first example, the camera 128 and its chain of custody algorithm may activated only when an item is presented to the product identification module 130 and detected by the IR-ToF sensor. Likewise, in a second example, the camera 132 and its chain of custody algorithm may be triggered when a radar facing the basket (e.g., at the location of second camera 1402) detects an object in the mobile apparatus' airspace.

Additionally, in some situations, the user may scan an item at the product identification module 130 and place it on the lower shelf, and a capacitive sensor of the lower shelf may detect the presence of the item. This sensor, which may cover the surface of the lower shelf, detects the presence of items of different sizes and material properties. This sensor may be low in power consumption, enhancing the overall efficiency of the mobile apparatus and preventing unnecessary power drain during use.

Figure 15B:
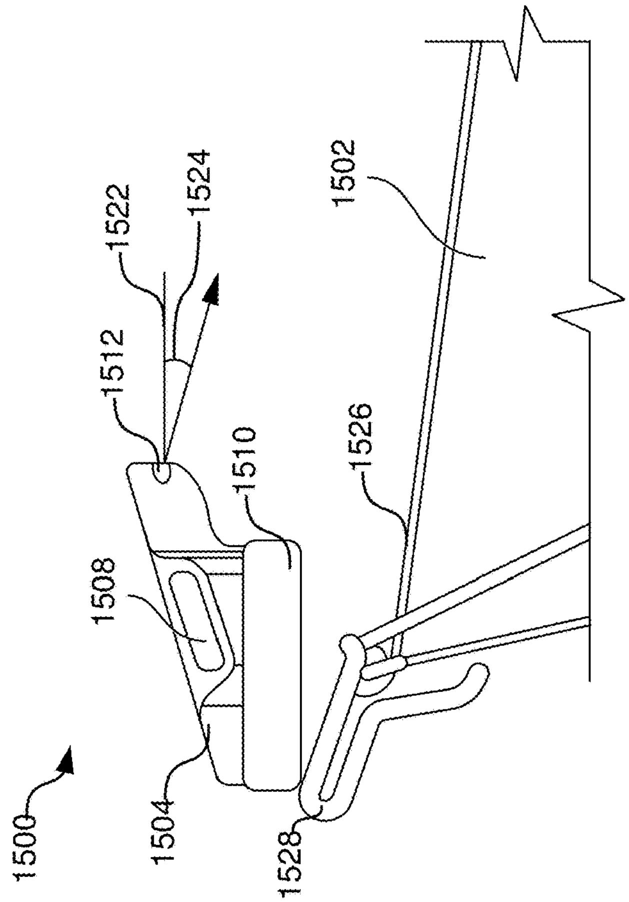
FIGS. 15A-15B illustrate views of a user-facing module attached to a mobile apparatus showing viewing directions of view for different sensors, according to at least one example.
Figure 15A:
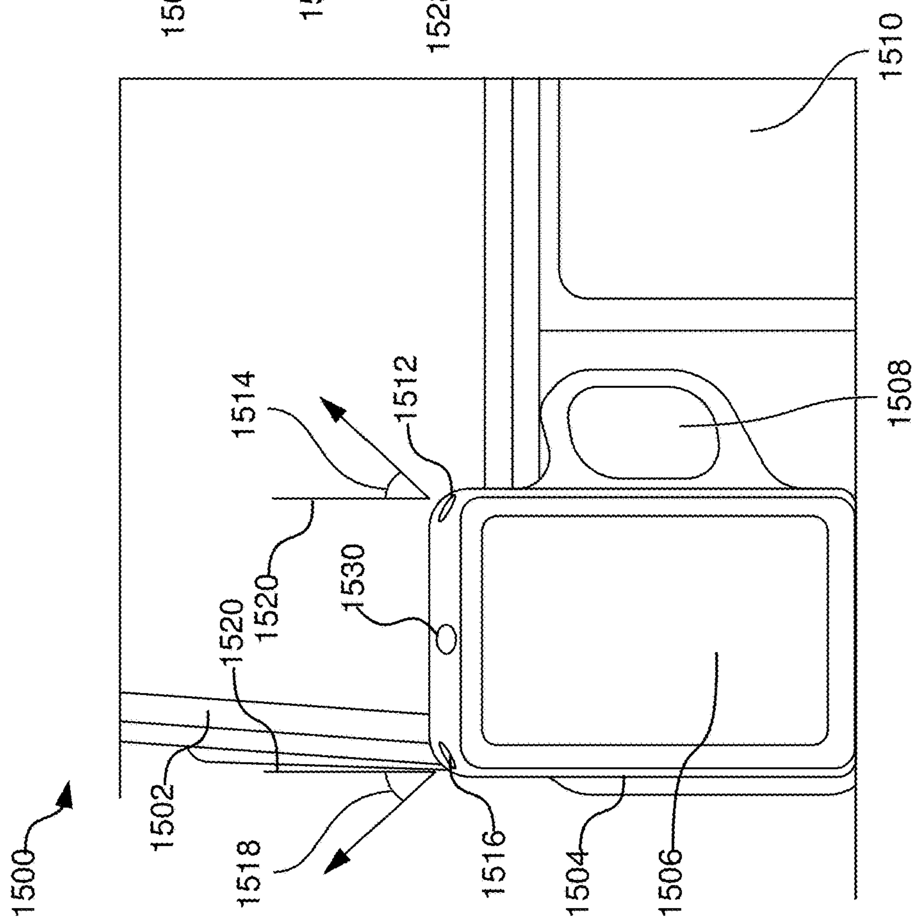

FIGS. 15A-15B illustrate views of a user-facing module 1504 attached to a mobile apparatus 1502 showing viewing directions of view for different sensors, according to at least one example. The user-facing module 1504 may be an example of the user-facing module 120 described herein. The user-facing module 1504 is coupled to a handle 1528 and/or frame 1526 of the mobile apparatus 1502. The user-facing module 1504 includes a screen 1506, a product identification module 1508, a weight sensor 1510, a first camera 1512, a second camera 1516, and other components similar to those described with respect to FIGS. 13 and 14.

Figure 17:
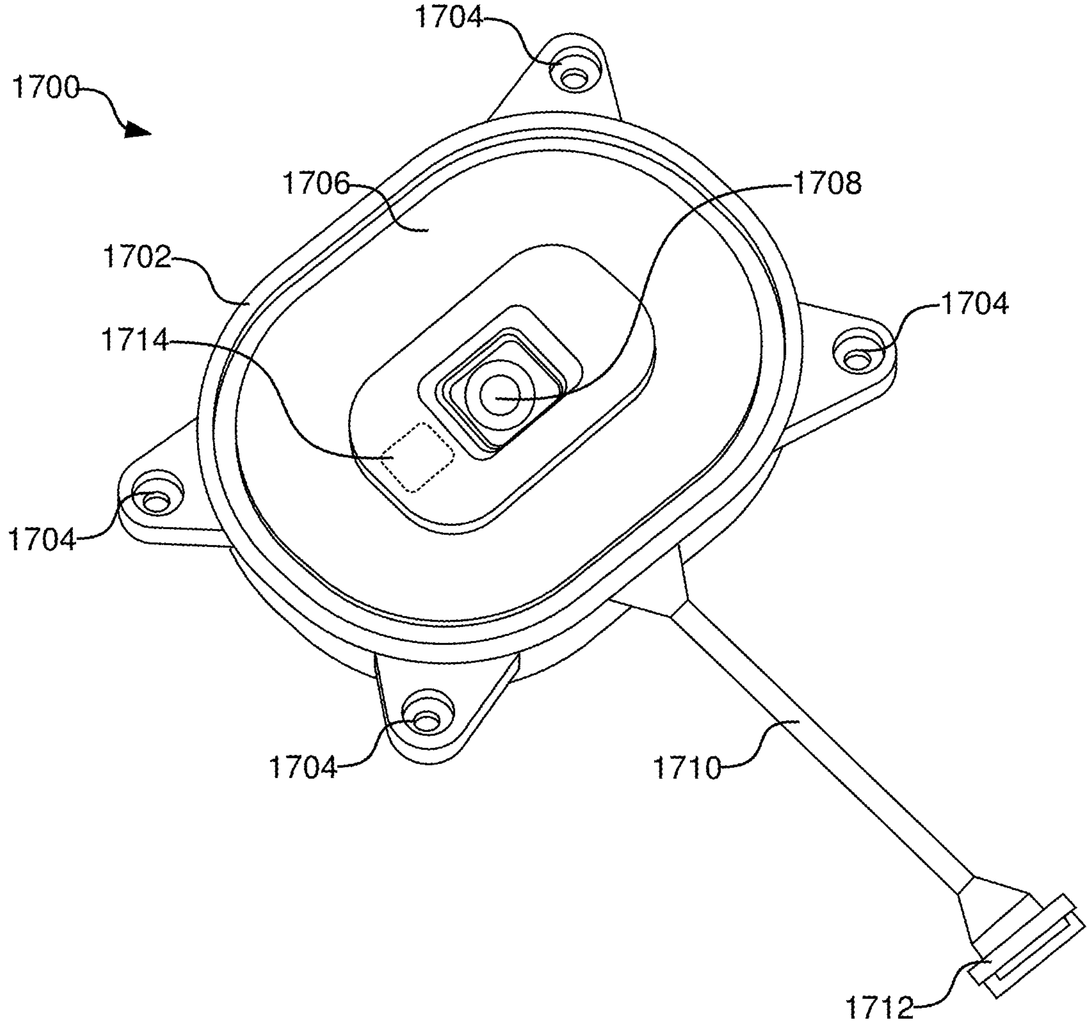
FIG. 17 illustrates a product identification module of the user-facing module, according to at least one example.
Figure 18:
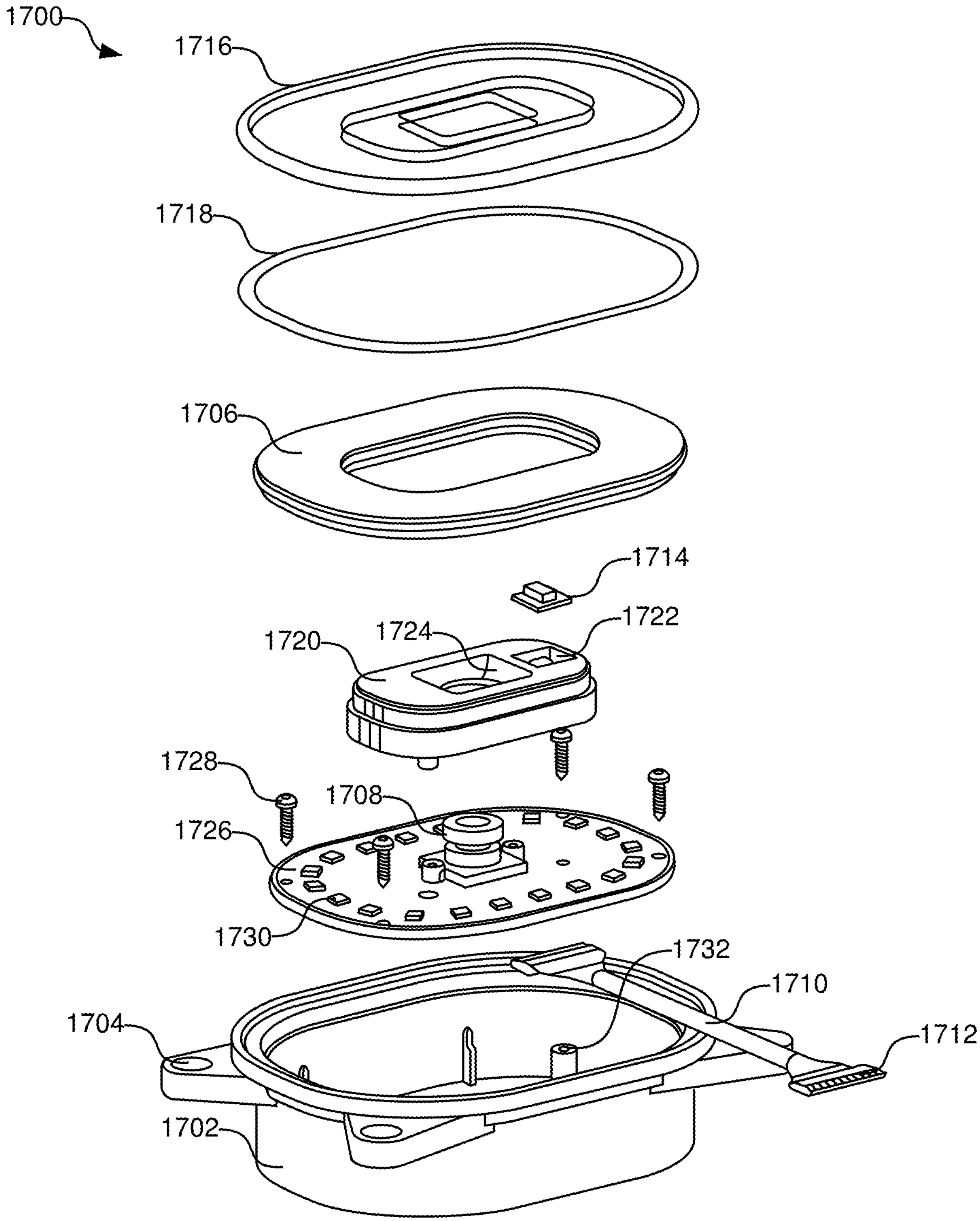
FIG. 18 illustrates an exploded view of the product identification module of FIG. 5.

The screen 1506 may be used for a user to interact with the user-facing module 1504 and the product identification module 1508 may be similar or identical to the product identification module 130 and/or the product identification module of FIGS. 17-18. The first camera 1512 is directed towards a basket of the mobile apparatus 1502. Accordingly, the first camera 1512 may be directed at an angle 1514 with respect to a first direction 1520, which may align with or be parallel with a first axis along a length of the mobile apparatus 1502. This angle 1514 may enable the first camera 1512 to capture a view of the basket as well as environment around the mobile apparatus 1502. The second camera 1516 is directed at a second angle 1518 with respect to the first direction 1520. The second camera 1516 may therefore capture a view of the environment to a second side of the mobile apparatus 1502, for example to capture image data of storage locations, events, or other actions that may occur adjacent to the mobile apparatus 1502. A third camera 1530 may capture an upward facing view from the user-facing module 1500. The third camera 1530 may be used to determine a location of the mobile apparatus 1502 within a facility, to capture image data of user interactions, detect products being brought near the product identification module 1508, or other such purposes.

Figures 16A, 16B, 16C:
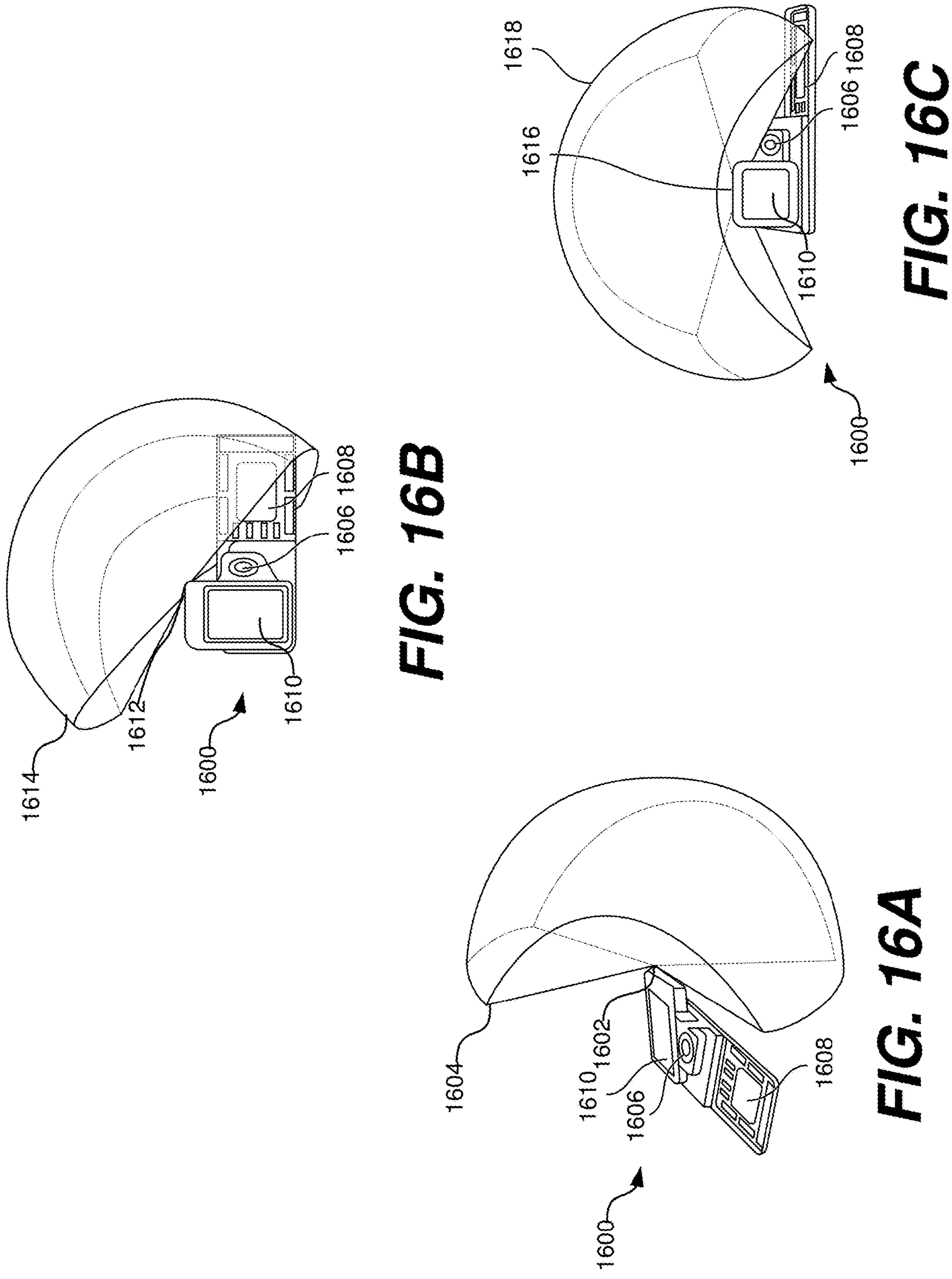
FIGS. 16A-16C illustrate the user-facing module and different sensing regions for different sensors of the module, according to at least one example.

In some examples, the cameras may have overlapping fields of view, as illustrated in FIGS. 16A-16C. For example, as illustrated in FIG. 16A, the user-facing module 1600 may include the first camera 1602 that provides a first field of view 1604 that may be directed to a first side of the mobile apparatus. The user-facing module 1600 may also include a product identification module 1606, weight sensor 1608, and screen 1610. As illustrated in FIG. 16B, the user-facing module 1600 further includes a second camera 1612 with a second field of view 1614. The first field of view 1604 and the second field of view 1614 may overlap over a portion of the mobile apparatus in some examples. The user-facing module 1600 further includes a third camera 1616 with a third field of view 1618 that corresponds with a camera facing upwards that may partially overlap with one or more of the first field of view 1604 and/or the second field of view 1614.

In some examples, the cameras shown and described herein may include steerable and/or movable cameras that may be rotated or steered by a computing device to provide automated and/or manual steering for various purposes. For example, a camera with a limited field of view may be implemented with a steering mechanism to sweep through a field of view. Additionally, the focus of the cameras may be adjustable and/or be set to a particular range based on the purpose of the camera. For instance, a camera intended to view the basket may have a first focal length while an upward facing or side-facing camera may have a second, longer, focal length. In some examples the focal length may be adjustable and/or variable, for example through the use of a liquid lens.

Returning to FIG. 15B, the first camera 1512 is shown having a third angle 1524 from a horizontal direction or horizontal plane 1522. Accordingly, the first camera 1512 and/or the second camera may be directed at an angle relative to a horizontal surface, for example to enable view into the basket of the mobile apparatus 1502.

Accordingly, the user-facing module 1500 enables a system for monitoring fraud and abuse in the mobile apparatus 1502. The system employs one or more cameras on the user-facing module, for example one or more 12-megapixel rolling shutter cameras, having a field of view of 180 degrees or more or less, which may be used to continuously monitor the environment of the mobile apparatus 1502 to ensure accurate identification and tracking of items. For example, the third camera 1530, is positioned on the user-facing module 1500 above the screen 1506 and facing upward. This strategic placement provides a viewpoint encompassing the user-facing module 1500, weight sensor 1510, and the product identification module 1508. The third camera 1530 may be tasked with identifying and tracking an item when it is scanned by the product identification module 1508 and moved into the basket. In addition, the third camera 1530 may opportunistically employ its view of a ceiling feature to localize the mobile apparatus within the facility.

The first camera 1512 faces the basket. The position and direction of the first camera 1512, as shown in FIG. 15A and FIG. 15B provides an overlapping field of view with the third camera 1530 to monitor all of the mobile apparatus' airspace. The first camera 1512 may be used for gathering image data that may be used for identifying any item that is being added to the mobile apparatus 1502. Collectively, the first camera 1512 and the third camera 1530 may establish a "chain of custody" for each item added to the mobile apparatus 1502.

FIG. 17 illustrates a product identification module 1700 of the user-facing module, according to at least one example in an assembled as well as an exploded view. The product identification module 1700 may include one or more proximity and/or presence detection sensors such as sensor 1714 as well as an illumination element 1706 and a camera 1708 configured to capture image data of a specific item when presented to the product identification module 1700. The product identification module 1700 may use a time of flight (ToF) sensor, capacitive sensor, proximity sensor, or other such sensor to detect a presence of an item in a read area of the camera for example as the sensor 1714. The sensor 1714 may therefore be used to trigger the use of the camera 1708. The camera 1708 may be used for performing a product identification and establishing a tracking system for a product that is identified. In particular, the camera 1708 may be used to scan or capture image data of a barcode or other indicator of a product. After the camera 1708 is used to capture the image data, the system may identify the item and determine a location where the item is placed within the mobile apparatus (e.g., in a basket or on a lower shelf). In this manner, items that are selected by the user may have a complete chain of custody from selection by the user to completion of the transaction (e.g., leaving the facility).

The product identification module 1700 includes a housing 1702 having mounting points 1704 for securing to a user-facing module of a mobile apparatus as well as a data cable 1710 and data connection 1712 for communicating with a computing device of the user-facing module. In the exploded view of FIG. 18, the product identification module 1700 is shown with a cover 1716 that may protect the camera 1708 and other components of the product identification module 1700. A seal 1718 may secure the cover 1716 to an illumination element 1706 such as a transparent or semi-transparent piece of plastic that distributes light from one or more LEDs 1730 secured to a board 1726 that may be used to illuminate a field of view of the camera 1708. The LEDs 1730 are arranged around a perimeter of the camera 1708 and around a housing 1720 for the camera 1708 that includes an aperture 1724 for the camera 1708 to pass through and also includes a socket 1722 for the sensor 1714.

The housing 1720 is secured to the board 1726 and the board 1726 is secured, through fasteners 1728 into the housing 1720 by coupling the fasteners 1728 to features 1732. Accordingly, the product identification module 1700 may be assembled as a single component for installation within the user-facing module.

The sensor 1714 and the camera 1708 may share a field of view such that the field of view of the sensor 1714 and the field of view of the camera 1708 at least partially overlap. Additionally, the board 1726 may be used to provide control to the LEDs 1730, camera 1708, sensor 1714, and other systems. As such, the board 1726 may perform calculations and computations to cause the components of the product identification module 1700 to work in synchronization without requiring input or control from an external system.

The sensor 1714 and camera 1708 may be used to identify items, as previously described herein. For example, the sensor 1714 may include an infrared time-of-flight sensor that can detect a presence, range, and/or location of an item relative to the camera 1708 and the field of view of the camera 1708. Accordingly, the sensor 1714 may be used to trigger the camera 1708 to capture image data when an item is at a read zone, as detected by the sensor 1714. Additionally, the sensor 1714 may be used for range detection to the item such that a lens or focus of the camera 1708 may be adjusted, in some examples, such that an image of the item (including an identifier such as a barcode) may be captured clearly. The sensor 1714 may be used for activity detection, such as to detect items brought to the product identification module 1700. Accordingly, the sensor 1714 may be used to trigger the LEDs 1730 to strobe in synchronization with the camera 1708 such that the camera 1708 (e.g., a global shutter camera) may capture a clear image without motion blur, of the item. The sensor 1714 may also ne used for triggering one or more algorithms or processes on-board the mobile apparatus to save power. For example, the sensor 1714 may be used to alter a duty cycle of one or more components, algorithms, processes, or systems of the user-facing module to alter a responsiveness and/or power-saving characteristic of the user-facing module or such components.

FIGS. 19A-19C illustrate a lower shelf 1904 and battery compartment 1906 of a mobile apparatus 1900, according to at least one example. In FIG. 19A, the mobile apparatus 1900 is depicted having a receptacle 1902 such as a basket as well as a lower shelf 1904 for receiving items. The lower shelf 1904 may be in other positions and/or configurations in some examples of the mobile apparatus 1900. The lower shelf 1904 is supported by the chassis and/or frame of the mobile apparatus 1900. The lower shelf 1904 may be positioned underneath the receptacle 1902 and may receive items. The lower shelf 1904 may be equipped with sensors, such as capacitive sensors as depicted with respect to FIGS. 8-9 and/or weight sensors to determine a presence of one or more items on the lower shelf 1904.

In FIG. 19B, the lower shelf 1904 is depicted without the receptacle 1902. The lower shelf 1904 has a load surface 1908 that may be equipped with the sensors described with respect to FIGS. 8-9 and/or other sensors such as weight sensors to determine a presence or properties of items placed on the load surface 1908 during use of the mobile apparatus 1900. The battery compartment 1906 may store one or more power supplies for supplying power to different components of the mobile apparatus 1900 and includes a first port 1910 as well as a second port 1912 (shown in FIG. 19C) for coupling with additional mobile apparatuses, for example when nested together, to form an electrical link that may be used to charge the mobile apparatus 1900 through the first port 1910 and/or the second port 1912. An additional lock 1914 provides a physical link or connection between the mobile apparatus and an adjacent mobile apparatus when nested such that they are physically coupled together while charging.

FIG. 20 illustrates capacitive sensors 2006 of the lower shelf 2000 of a mobile apparatus, according to at least one example. The lower shelf 2000 includes grommets 2004 that may be used with fasteners to couple to a structure of the mobile apparatus from a frame 2002 or structure of the lower shelf 2000. The capacitive sensors 2006 may be used to detect when an item is added or removed from the lower shelf 2000, or items are rummaged in the lower shelf 2000. The activity detection by the capacitive sensors 2006 may be used for fraud and abuse detection, for example by identifying when items are replaced or swapped for other items after scanning. The capacitive sensors 2006 may be used to detect a change in an object and/or object location. The capacitive sensors 2006 may be connected to a computing device of the mobile apparatus through connections 2008.

Figure 21:
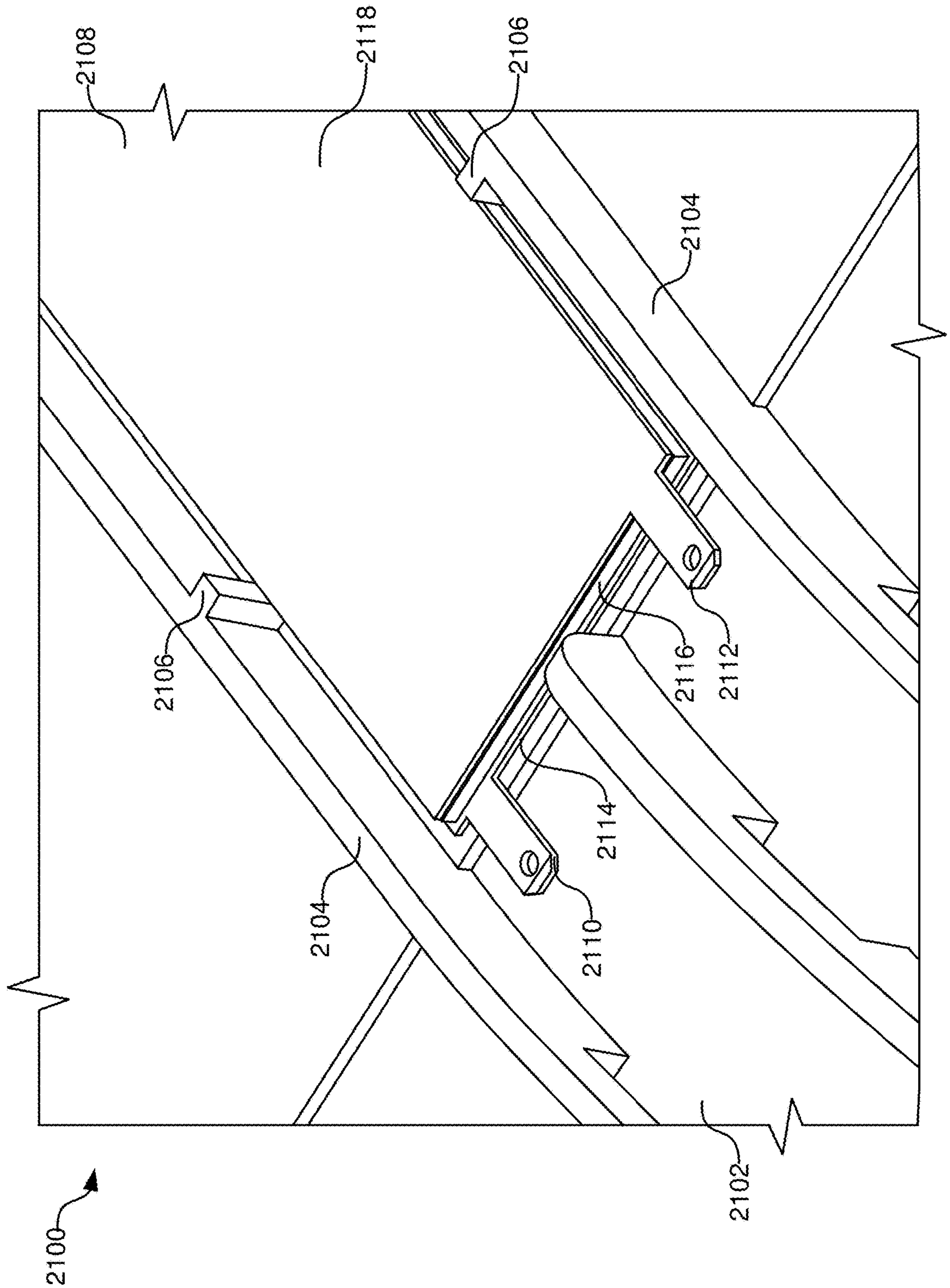
FIG. 21 illustrates a detail view of the capacitive sensors of the lower shelf, according to at least one example.

FIG. 21 illustrates a detail view 2100 of capacitive sensors 2108 of the lower shelf 2102, according to at least one example. The lower shelf 2102 is shown with ribs 2104 and tabs 2106 that may be used to maintain the position of the capacitive sensors 2108 on the lower shelf 2102. The capacitive sensors 2108 include a first layer 2114 of a conductive material connected to a first electrode 2110 with a spacer material 2116 and a second layer 2118 of a conductive material connected to a second electrode 2112. In some examples, the capacitive sensors 2108 may include a printed circuit board having multiple layers, a first layer of copper or a copper compound, a second layer of an insulating material, and a third layer of copper or a copper compound. Other electrically conductive materials may be used for the first layer and/or the third layer.

In some examples, the capacitive sensor 2108 may include a single circuit board with traces printed thereon to cover the length and width, or a substantial portion of the length and width of the lower shelf. In some examples, the capacitive sensor 2108 may include a single layer strip of a conductive material such as a metal. The capacitive sensor 2108 may be connected to the user-facing module which may compare an electrical ground, such as from a connection to the frame of the mobile apparatus, to the signals from the capacitive sensor 2108 in order to determine the properties and locations of the items on the lower shelf.

Figure 22A:
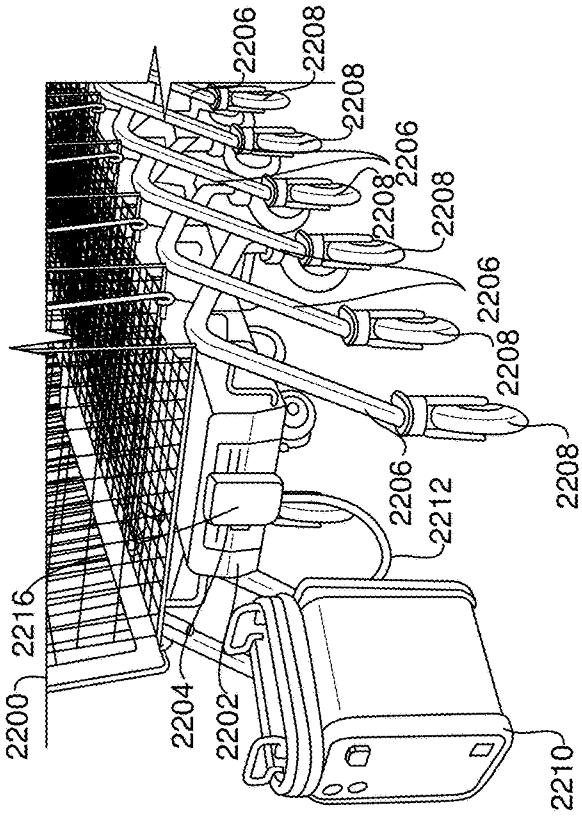
FIGS. 22A-22B illustrate a system for charging a fleet of mobile apparatuses, according to at least one example.
Figure 22B:
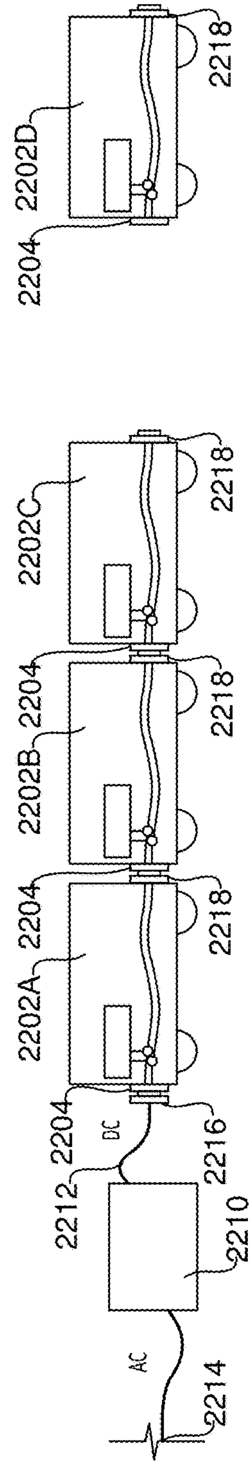

FIGS. 22A-22B illustrate a system for charging a fleet of mobile apparatuses, according to at least one example. FIG. 22A illustrates an example of a mobile apparatus 2200. The mobile apparatus 2200 includes a basket, frame 2206 with wheels 2208, and battery system 2202. In some examples, the mobile apparatus 2200 may be used for enabling customized retail environments includes a user-facing module 120 for user interaction and item and location tracking, according to at least one example. The user-facing module 120 may include one or more components such as a user device a weight scale and other such components. The user-facing module 120 may removably couple to a frame of the mobile apparatus 100 such as at a handlebar.

The user-facing module 120 may electrically couple to the battery system 2202 to provide power to the components of the user-facing module 120, such as a battery pack module (e.g., a battery), which include one or more batteries. The battery system 2202 may power one or more additional electronic components of the mobile apparatus 2200. The user-facing module 120 may connect through a power conduit to the battery system 2202, shown at the bottom of the mobile apparatus 100 and coupled to the frame 2206 of the mobile apparatus. The port 2204 may include an opening for receiving a charging connector and/or a mechanical connector for charging of the battery system, as described herein. In some examples, the charging connector and/or mechanical connector may interface with the port 2204 when the mobile apparatus is "nested" with other mobile apparatus(es) as shown in FIG. 22A.

In FIG. 22A, a set of mobile apparatuses 2200 are shown nested together such that frames 2206 of the adjacent mobile apparatuses 2200 nest together to fit together such that the baskets of the mobile apparatuses fit together and the battery system 2202 of adjacent mobile apparatuses are positioned adjacent one another, end to end. In FIG. 22A, a charging system 2210 is coupled to the port 2204 through a cable 2212 and a handheld connector 2216. The charging system 2210 is configured to provide DC current to charge the battery system of the mobile apparatus 2200. Additionally, the battery systems 2202 of the adjacent mobile apparatuses 2200 electrically and mechanically couple together as described herein. In particular, the battery system 2202 of the adjacent mobile apparatuses couple together as shown in FIG. 22B.

In FIG. 22B, a series of battery systems 2202A, 2202B, 2202C, and 2202D are linking together as the corresponding mobile apparatuses 2200 are brought together. The charging system 2210 is shown receiving alternating current (AC) from a power source 2214 and outputting DC through the cable 2212 and handheld connector 2216 to the first battery system 2202A at the port 2204.

The second battery system 2202B is further coupled to the first battery system 2202A through a port 2204 and interface 2218. Additionally, the second battery system 2202B is coupled to the third battery system 2202C through a port 2204 and interface 2218. Further, as a mobile apparatus 2200 associated with fourth battery system 2202 may couple with the third battery system 2202C through a port 2204 and interface 2218 as the mobile apparatuses 2200 nest together as depicted in FIG. 22A.

The interface 2218 includes, in some examples, a rotating blade connector as shown and described with respect to FIGS. 23-29 herein. When a mobile apparatus 2200 receives power from the mobile apparatus 2200 behind it or from a charger unit, then the mobile apparatus 2200 may trigger its own rotating blade connector at the interface 2218 to extend forward to attempt to connect with the port 2204 of a mobile apparatus positioned in front of the present mobile apparatus.

The rotating blade connector described herein includes blade contacts mounted to a cylindrical housing. The cylindrical housing is mounted on a motor that rotates when charging is to commence (e.g., when charging power is applied to the mobile apparatus) in order to connect the blade contacts to the port 2204 on the mating connector of an adjacent mobile apparatus 2200. The housing of the battery system is mounted to the frame 2206 with flat springs that guide the housing to reach an alignment position where the blade contacts are aligned with the receptacles.

As the rotating blade connector extends, a latch may engage between the mobile apparatuses 2200 to mechanically couple the mobile apparatuses together while charging and prevent separating until charging is complete.

The system for charging the battery systems 2202 of the mobile apparatuses includes the mobile apparatuses 2200 with a battery on board that will require charging to power one or more electronic components of the mobile apparatuses 2200 such as the user-facing module 120. The mobile apparatuses 2200 are manually moved by a human. Each mobile apparatus has a front and rear power connector such as the port 2204 and the interface 2218. When the mobile apparatuses 2200 are placed in a row (e.g., in series) the interface 2218 contacts a port 2204 of a mobile apparatus 2200 that is next in series, forming a series connection (e.g., daisy chain charging). A cable 2212 is attached to the port 2204 connector at the mobile apparatus 2200 at the end of the row to charge all the mobile apparatuses 2200 in the row. Though described with respect to charging from a port 2204 at the rear of the mobile apparatus 2200 at a back of the series, in some examples the mobile apparatuses 2200 may be charged through an interface 2218 at the front and/or from a mobile apparatus 2200 at a front of the series.

In some examples the charging system 2202 may include a mobile power supply with a handheld connector 2216. The handheld connector 2216 makes a connection between the charging system 2202 and the first battery system 2202A in the row or stack to be charged.

The connection between the mobile apparatuses 2200 in the row may be automatic and may use a rotating connector to form an electrical connection as described herein. The connection between the mobile apparatuses 2200 (e.g., at the port 2204 and interface 2218) may also include a mechanical connection that uses a physical connector to prevent the mobile apparatuses 2200 from being pulled apart while charging. In some examples, the mechanical connection is automatic and is coupled between mobile apparatuses 2200 at the same time as the electrical connection. The automatic coupling may be performed by a latch mechanism that is releasably secured depending on a position of an extendable electrode that forms the electrical connection.

The electrical connection may include a rotating blade connector used to make an electrical connection between the mobile apparatuses 2200 and may also include features for latching between adjacent mobile apparatuses 2200 to prevent disconnection. The connection components may include in an energy or charging/power assembly. The battery system 2202 may include a blade connector subassembly and a receptacle subassembly. The blade connector subassembly may be included with the interface 2218 at a front side of the battery system 2202 and the receptacle connector may be included with the port 2204 at the rear side. In some examples, the blade connector subassembly may be at the rear side of the battery system 2202 and the receptacle connector may be at the front side of the battery system 2202. In addition to the blade connector, a latching bar is mounted to the front side of the battery system 2202 and a latching hook is mounted to the rear of the battery system 2202 to provide a mechanical connection between the adjacent mobile apparatuses 2200.

Figure 23A:
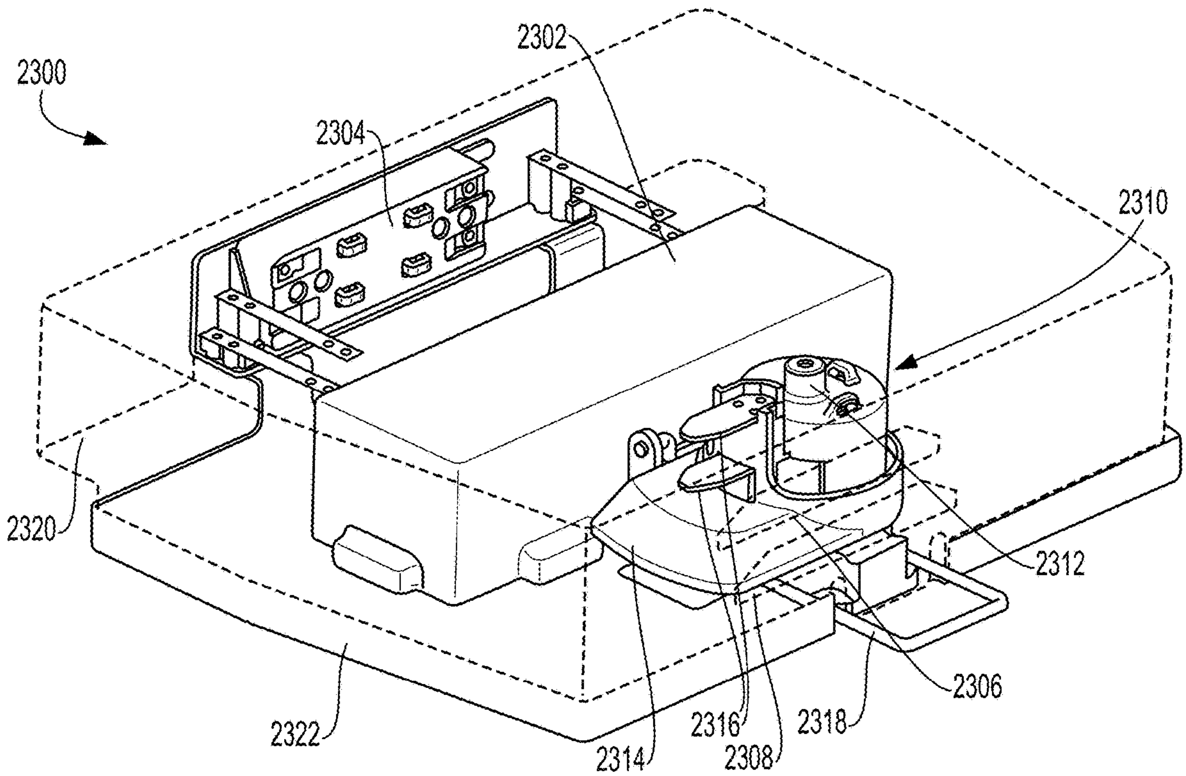
FIGS. 23A-23B illustrate a battery and charging system of a mobile apparatus, according to at least one example.
Figure 23B:
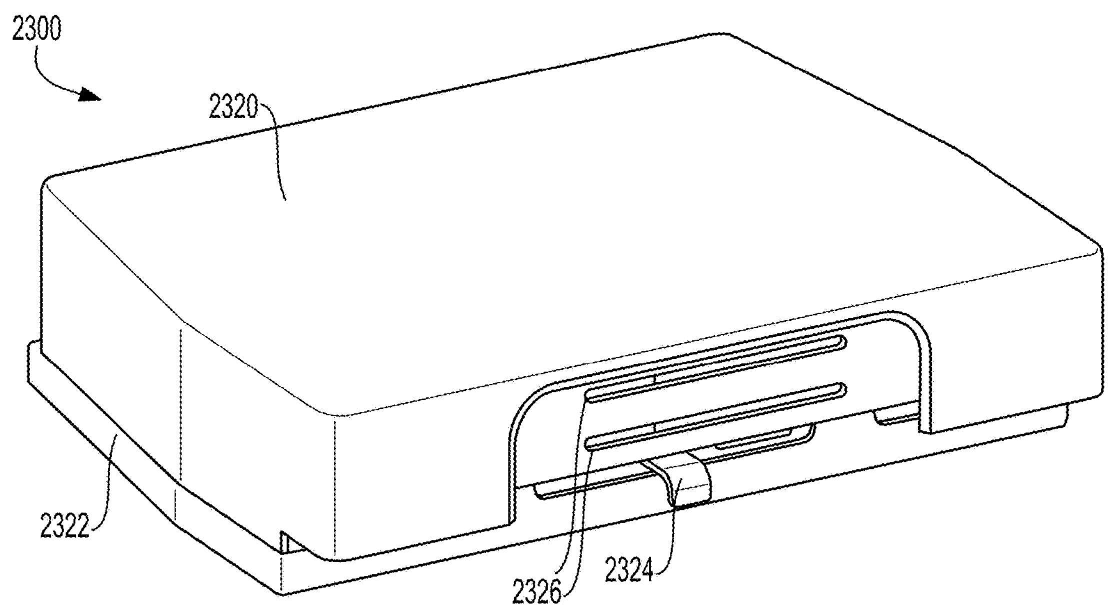

FIGS. 23A-23B illustrate a battery system 2300 of a mobile apparatus, according to at least one example. The battery system 2300 may be similar and/or identical to the battery system 2202 of FIGS. 22A-22B. The battery system 2300 includes a housing having atop cover 2320 and a bottom cover 2322 that enclose the components of the battery system 2300. The battery system 2300 encloses a battery 2302 first interface 2304 and second interface 2310. The first interface includes a receptacle that receives a blade electrode from the second interface 2310 of a separate mobile apparatus 2200.

The second interface 2310 includes a rotating blade connector used to make an electrical connection between the battery system 2300 and an adjacent battery system 2300 and may also include a latch 2318 to prevent disconnection.

The battery system 2300 includes a blade connector subassembly at the second interface 2310 and a receptacle subassembly at the first interface 2304. The blade connector subassembly is mounted on a front side of the battery system 2300 and the receptacle connector is mounted on the rear side. In some examples, the blade connector subassembly may be at the rear side of the charging/power assembly and the receptacle connector may be at the front side of the charging/power assembly. In addition to the blade connector, a latch 2318 is mounted to the front side of the battery system 2300 and a latch hook 2324 is mounted to the rear of the battery system 2300.

The latch 2318 is mounted inside of the battery system 2300 and within the housing such that it can pivot. A portion of the latch 2318 extends outside of the housing through an opening 2308 that allows the latch 2318 to move between a first position and a second position, the first position a latched or closed position and the second position an open or free position. The latch 2318 may be biased towards the first position by a spring within the housing. The latch hook 2324 is statically mounted to the rear of the battery system 2300 and is designed to engage the latch 2318 as the latch 2318 moves from the second position to the first position. In some examples, the latch 2318 is spring loaded to bias it to the second position where it engages with the latch hook 2324.

The first interface 2304 includes openings 2326 through which blade connectors of the second interface 2310 may pass to form an electrical connection between the battery systems 2300. The first interface 2304 includes two receptacle contacts, a magnet for an interlock sensor and is connected to the mobile apparatus with springs.

Figure 28A:
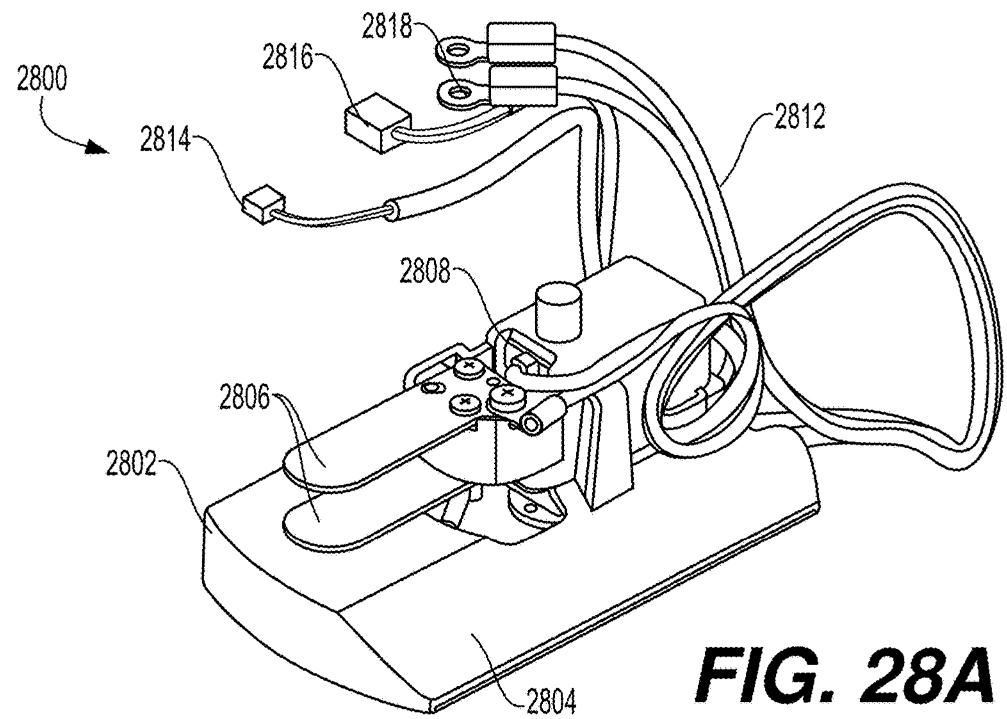
FIGS. 28A-28B illustrate a rotating electrode assembly, according to at least one example.
Figure 28B:
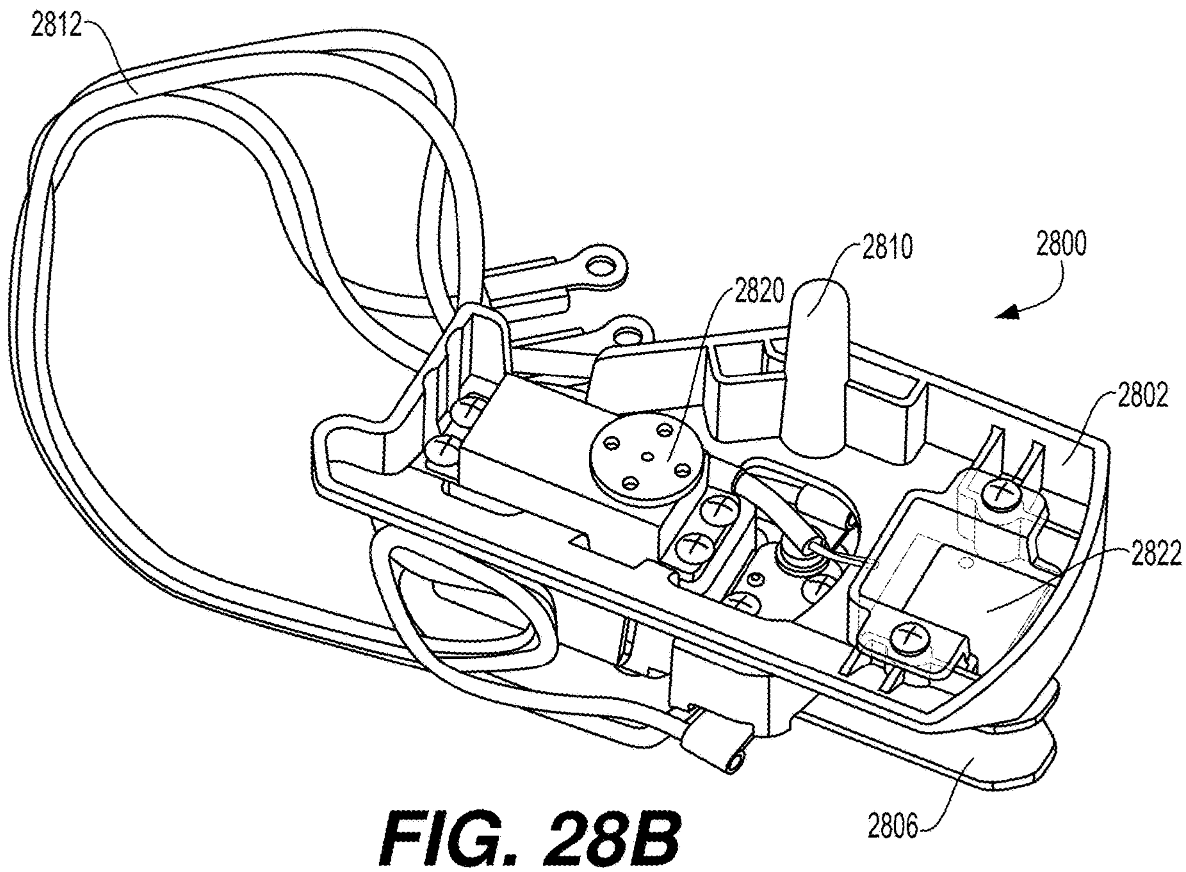

The blade connector of the second interface 2310 includes an alignment wedge 2314, a motor 2312 such as a servo or gearmotor, blade contacts 2316 and a hall effect sensor (shown and described with respect to FIGS. 28A-28B. The blade contacts 2316 may be formed of an electrically conductive material and may be coated to prevent or reduce oxidization on the blade contacts 2316. The blade connector also includes a post as part of the alignment wedge 2314 which is used to push the latch 2318 (e.g., against the spring) to a retracted state when the blade contacts 2316 of the connector are retracted within the housing of the battery system 2300. The blade contacts 2316 rotate due to rotation of the motor to extend from the housing of the battery system 2300.

To make a connection between the first interface 2304 and the second interface 2310 of an adjacent battery system 2300, the motor 2312 will rotate the blade contacts 2316. During the rotation, the blade contacts 2316 are brought from inside the housing to extending beyond the housing through the openings 2306. During rotation of the blade contacts 2316, the latch 2318 is disengaged as the post that causes the latch 2318 to be in the first position (e.g., away from the latch hook 2324) while a spring biases the latch 2318 into engagement with the latch hook 2324 when the post and alignment wedge 2314 are rotated out through the openings 2306 and 2308.

The rotation of the blade subassembly also causes the alignment wedge 2314 to contact a bottom surface of the housing of an adjacent battery system 2300. As the alignment wedge 2314 contacts the housing, the housing is lifted by the alignment wedge 2314 to a height such that the blade contacts 2316 are aligned with openings 2326. As the blade connector subassembly continues to rotate, the blade contacts 2316 enter through the openings 2326 in the housing and begin to engage the receptacles of the first interface 2304 of the adjacent battery system 2300.

After the blade connector subassembly is rotated into position to couple the adjacent mobile apparatuses, the mobile apparatus may use the hall effect interlock sensor to determine if the mobile apparatuses are interlocked. If the hall effect sensor detects a magnet which is mounted in the housing of the adjacent mobile apparatus, the blade contacts 2316 will be energized for charging. If no magnet is detected, the blade contacts 2316 are not energized and the blade connector subassembly may be retracted into the housing to reattempt connection or to cease attempting to connect.

When charging is complete, the blade connector subassembly retracts back into the housing. During retraction the blade contacts 2316 are deenergized and then rotate towards the retracted position. As the blade contacts 2316 rotate, they disengage from the first interface 2304. The alignment wedge 2314 disengages the housing and the housing drops down to its normal position (e.g., no longer lifted into alignment by the alignment wedge 2314). The blade connector subassembly engages with the latch 2318 to push it down with the post against the force of the spring to its retracted position to release the latch from the latch hook 2324 and enable the mobile apparatuses to be separated.

When a mobile apparatus receives power from the mobile apparatus behind it or from a charger unit, then the mobile apparatus may trigger its own rotating blade connector at the second interface 2310.

The rotating blade connector includes blade contacts 2316 mounted to a cylindrical housing. The cylindrical housing is mounted on a motor 2312 that rotates when charging is to commence (e.g., when charging power is applied to the mobile apparatus) in order to connect the blade contacts 2316 to the first interface 2304 on the mating connector of an adjacent mobile apparatus. The housing of the battery system 2300 is mounted to the frame 2206 with flat springs that guide the housing to reach an alignment position where the blade contacts 2316 are aligned with the receptacles.

The connection between the mobile apparatuses in the row may be automatic and may use the first interface 2304 and the second interface 2310 to form an electrical connection. The connection between the mobile apparatuses may also include a mechanical connection that uses a physical connector (e.g., latch 2318) to prevent the mobile apparatuses from being pulled apart while charging. In some examples, the mechanical connection is automatic and is coupled between mobile apparatuses at the same time as the electrical connection.

Figure 24A:
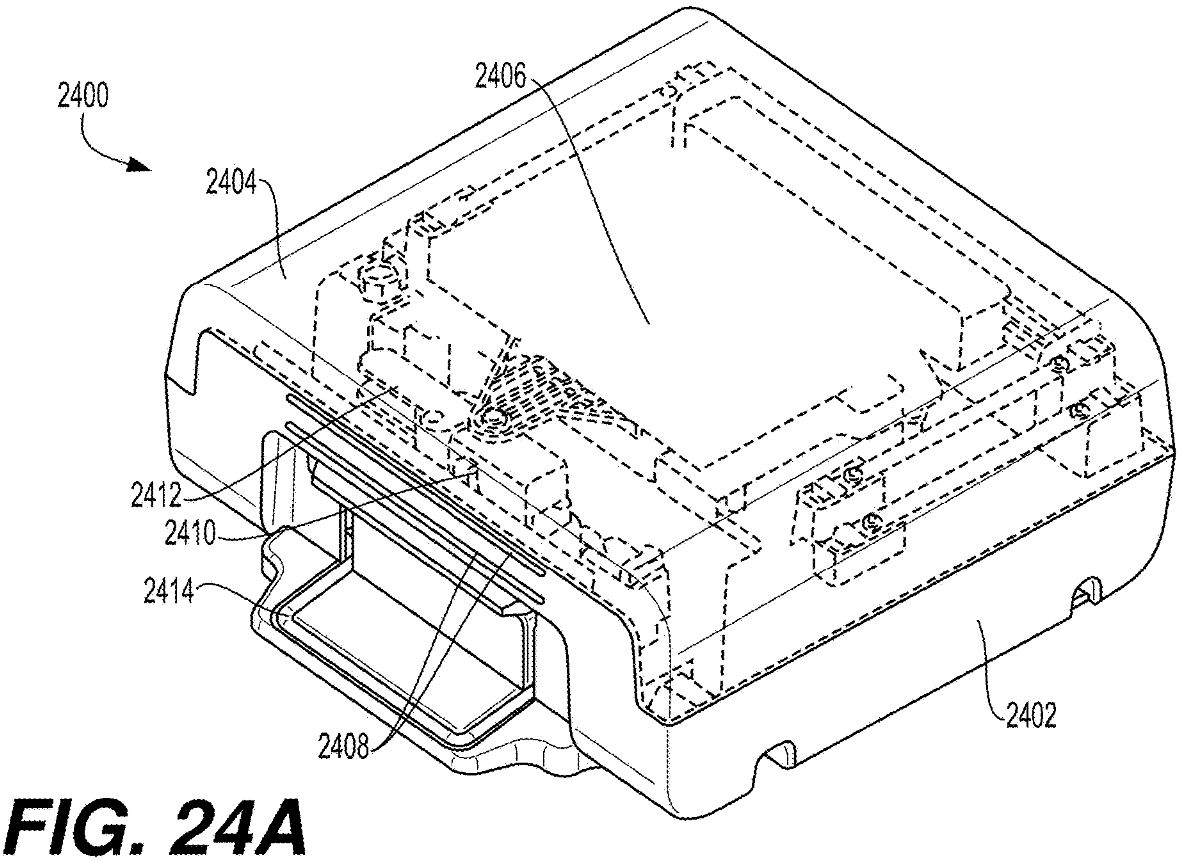
FIGS. 24A-24B illustrate a battery and charging system of a mobile apparatus, according to at least one example.

FIGS. 24A-3B illustrate a battery system 2400 of a mobile apparatus, according to at least one example. The battery system 2400 may be similar to the battery system 2202 and/or the battery system 2300 described herein. The battery system 2400 is enclosed within a housing with a first component 2402 and a second component 2404. The first component 2402 may include a battery cover 2420 that provides access to a battery or energy storage device contained within the housing.

The battery system 2400 further includes a printed circuit board 2406 to control one or more operations of the battery system 2400 such as charging of the battery, passing energy through to a charging interface, passing energy to one or more electronic devices of the mobile apparatus, latching and mechanically and/or electrically coupling the battery system 2400 with an adjacent battery system 2400, and other such operations.

The battery system 2400 includes openings 2408 in the housing as well as openings 2418 to enable electrical contacts to interface between the battery systems 2400. The blade contacts 2412 of the rotating blade connector 2410 extend through the openings 2408 to engage with receptacles at openings 2418. The blade contacts 2412 are rotates by the rotating blade connector 2410 as described with respect to FIGS. 23A-23B. The latch 2414 and latch hook 2416 interface to mechanically couple the ends of battery systems 2400 together when the mobile apparatuses are nested together.

Figure 24B:
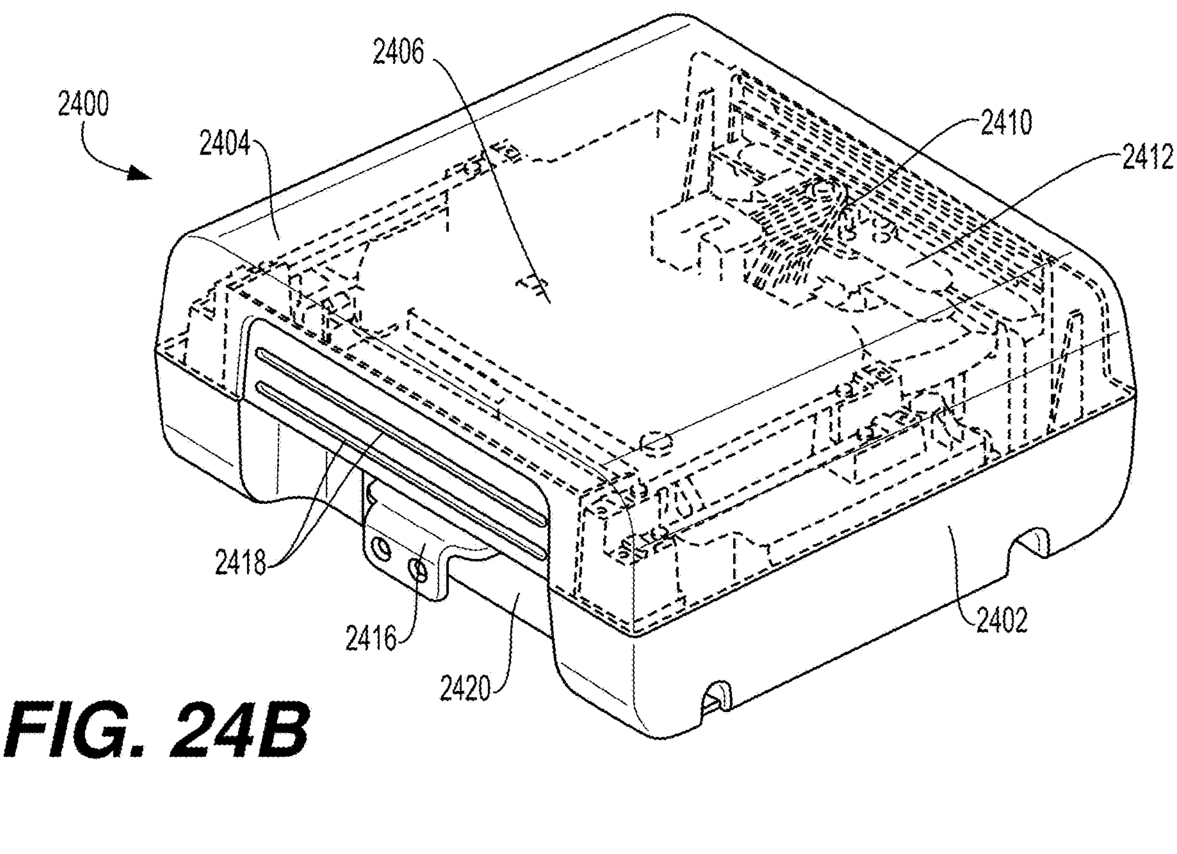
Figure 25B:
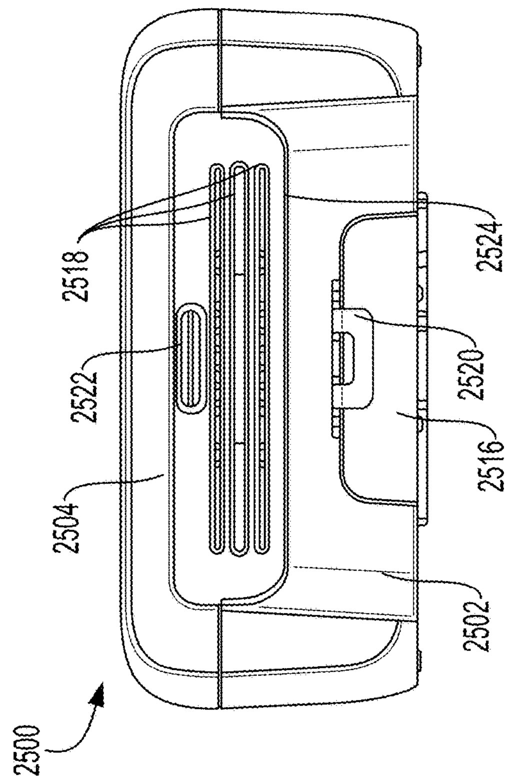
FIGS. 25A-25C illustrate perspective views of the battery and charging system of FIGS. 24A-24B.
Figure 25A:
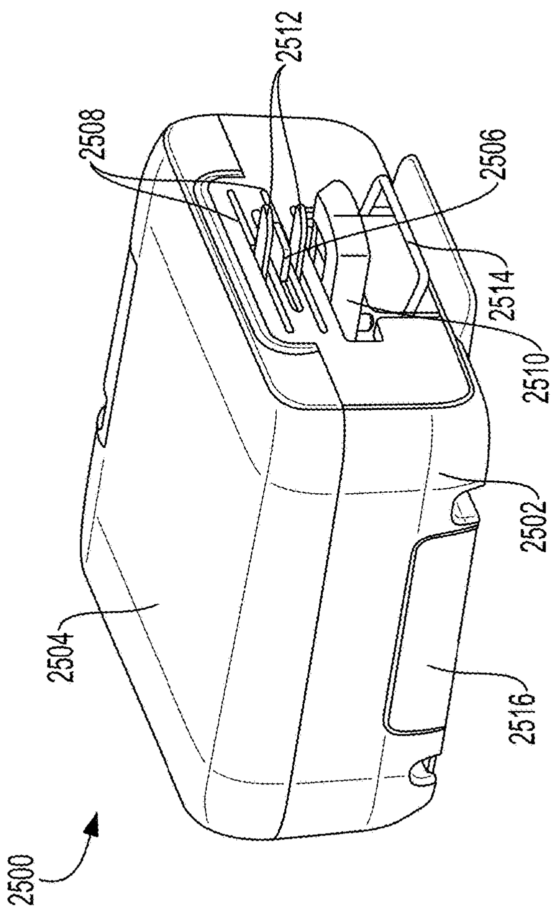
Figure 25C:
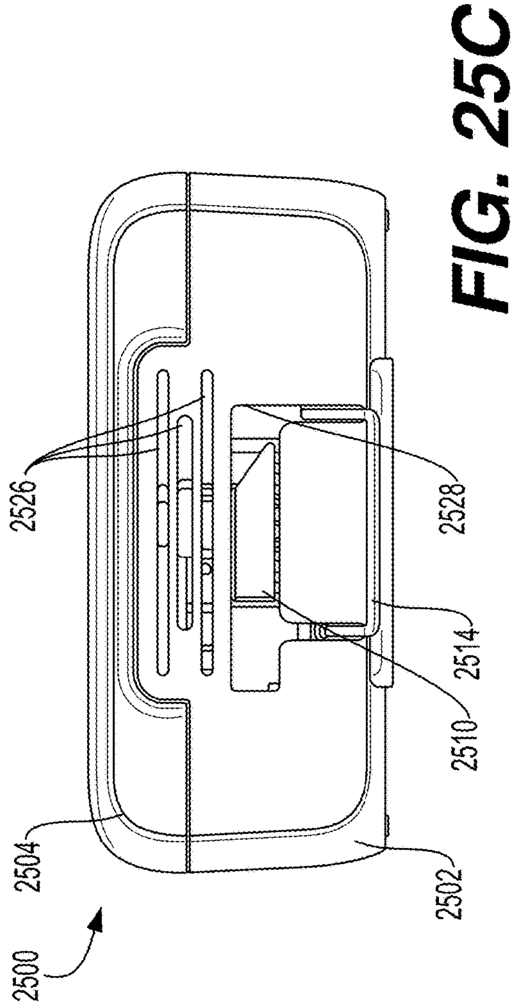

FIGS. 25A-25C illustrate perspective views of the battery and charging system of FIGS. 24A-24B. The battery system 2500 includes the housing components 2502 and 2504 as well as a battery cover 2516 that provides access to service, replace, and/or provide maintenance to the contents within the housing. In FIG. 25A, the blade contacts 2512 are shown protruding through openings 2518 along with alignment wedge 2510. The blade contacts 2512 and alignment wedge 2510 are extended when the battery system 2500 is coupling with an adjacent battery system 2500. A spacer 2506 is positioned between the blade contacts 2512 to prevent shorting across the blade contacts 2512. The blade contacts 2512 may extend through the openings 2518 to reach electrical contacts within the housing.

The alignment wedge 2510 is shown protruding from the housing, and the alignment wedge 2510 extends such that it no longer contacts the latch 2514 and therefore allows the latch 2514 to be raised to an upper position where the latch 2514 engages with the latch hook 2520. The alignment wedge 2510 further contacts the surface 2524 or ledge of the housing to raise and/or align the blade contacts 2512 with the openings 2518 of the adjacent battery system 2500.

In FIG. 25B, the end of the battery system is shown, with a latch hook 2520 that engages with the latch 2514. The latch 2514 of FIG. 25A is shown in a raised position to engage with and lock with the latch hook 2520. The latch 2514 extends through opening 2528 while the blade contacts 2512 extend through openings 2526 as shown in FIG. 25C. In this manner, the electrical contacts are entirely enclosed within the housing during normal operation and only extend during a charging operation for the mobile apparatuses. The battery system further includes an alignment slot 2522 to engage with an alignment feature of a handheld charging coupler.

Figure 26B:
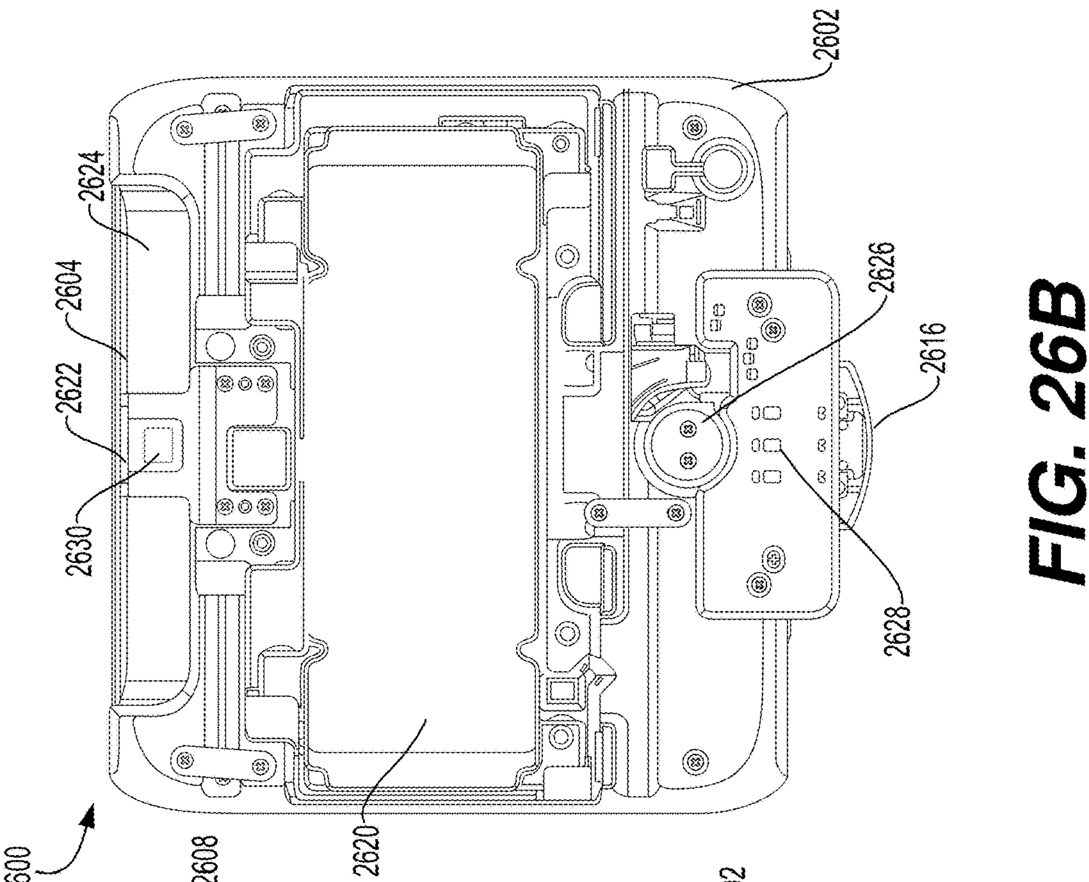
FIGS. 26A-26B illustrate a battery and charging system with a housing cover removed, according to at least one example.
Figure 26A:
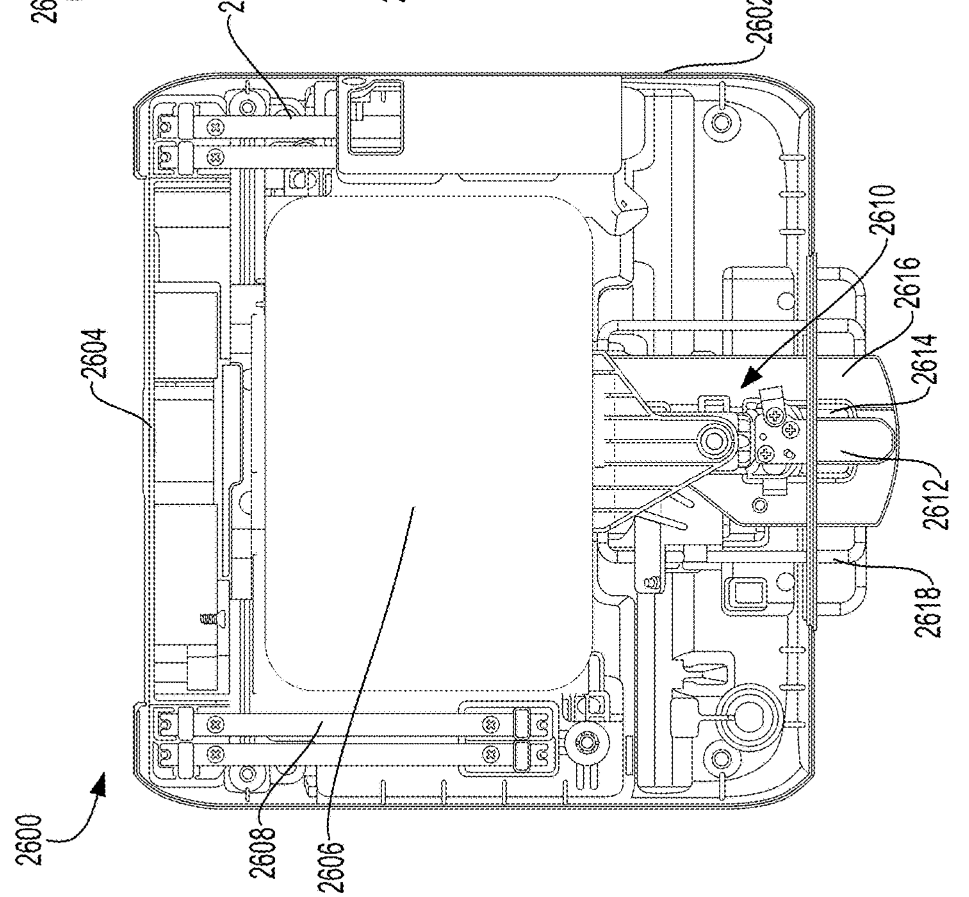

FIGS. 26-26B illustrate a battery system 2600 with a housing cover removed, according to at least one example. FIG. 26A illustrates a top view of the battery system 2600. FIG. 26B illustrates a bottom view of the battery system 2600. The battery system 2600 includes a housing 2602 with a first interface 2604 at a first side and a second interface 2610 at a second side of the battery system 2600. The battery system 2600 includes a battery system 2600 and bus bars for conducting electricity between the first interface 2604 and the second interface 2610. The battery system further includes a printed circuit board 2606 and circuitry for performing various actions as described herein. The flat springs 2608 may be used to mount and/or connect to the frame of the mobile apparatus such that the battery system 2600 can be vertically displaced, for example to align the electrical connectors as described herein.

The first interface 2604 includes a receptacle for receiving electrical contacts as well as a latch hook 2622 as described herein. Further, at the side of the battery system 2600 including the first interface 2604, a surface 2624 of the housing 2602 is shown. The surface 2624 interacts with the alignment wedge 2616 as described herein.

The second interface 2610 includes the blade contacts 2612, spacer 2614, latch 2618, and alignment wedge 2616. The blade contacts 2612 may be similar or identical to blade contacts 216 described herein. The spacer 2614 may be similar or identical to the spacer 406. The latch 2618 may be similar or identical to the latch 414 described herein. The alignment wedge 2616 may be similar or identical to the alignment wedge 2510 of FIG. 25.

In FIG. 26B, the underside of the battery system 2600. The battery system 2600 includes a battery 2620 as well as components of the housing 2602 used for connecting adjacent housings together for charging. For instance, the housing 2602 includes a surface 2624 that may contact an alignment wedge of a rotating connector to bring the housing 2602 into alignment such that the connectors may couple together. The housing 2602 also includes a detection element 2630, such as a magnet or other component that may be detected by a hall effect sensor or other sensor included within the alignment wedge. The detection element 2630 and the sensor may be used to determine a successful interlock between the housing 2602 and the adjacent rotating blade connector.

The housing further includes a pivot and mount 2626 for the servo motor to drive rotation of the rotating blade connector. The housing 2602 further includes a nesting sensor 2628 that may include a capacitive sensor or other such sensor capable of detecting the presence and/or proximity of an adjacent housing 2602.

In some examples, the battery system 2600 may rely on and/or use an inertial motion unit (IMU) to detect nesting between adjacent mobile apparatuses. For example, the battery system 2600 may receive power from an adjacent mobile apparatus through a rotating blade connector of the adjacent mobile apparatus and/or from a charging unit. In response to receiving the power, the battery system 2600 may extend the second interface 2610 (e.g., the rotating connector). After extending the second interface 2610 (e.g., the rotating connector), a computing system of the mobile apparatus may analyze sensor data from the interlock sensor and/or the nesting sensor 2628. If no electrical connection is detected but the nesting sensor indicates the presence of an adjacent mobile apparatus and/or housing, then the computing system may determine to retract the rotating blade and determine, using the IMU, if the mobile apparatus has any motion (e.g., from jostling the mobile apparatus to align and/or nest them together as done by an associate). In response to detecting the motion, the computer system may determine to re-attempt to connect to the next mobile apparatus.

Figure 27A:
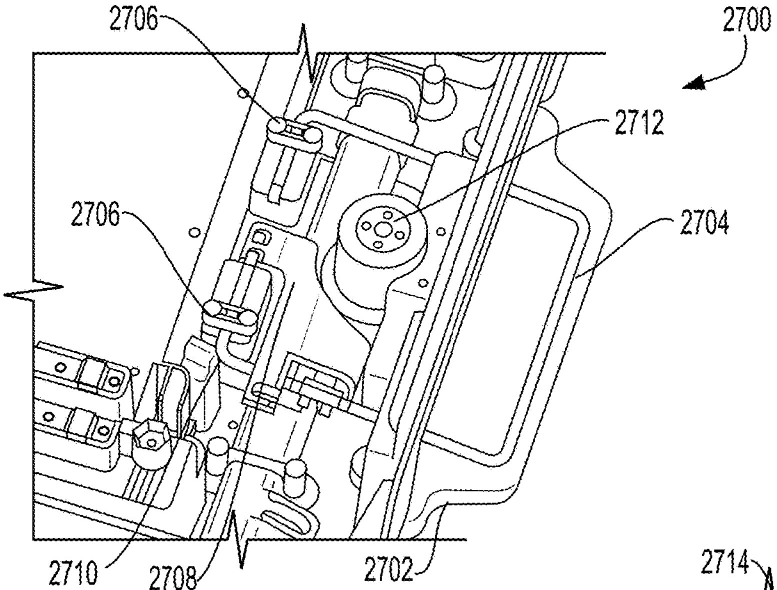
FIGS. 27A-27C illustrate stages of electrode extension from a battery and charging system of a mobile apparatus, according to at least one example.
Figure 27B:
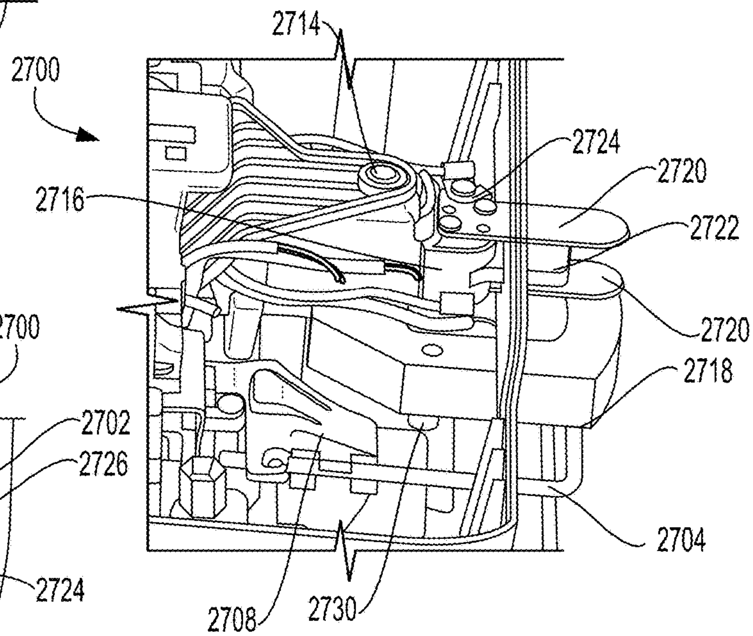
Figure 27C:
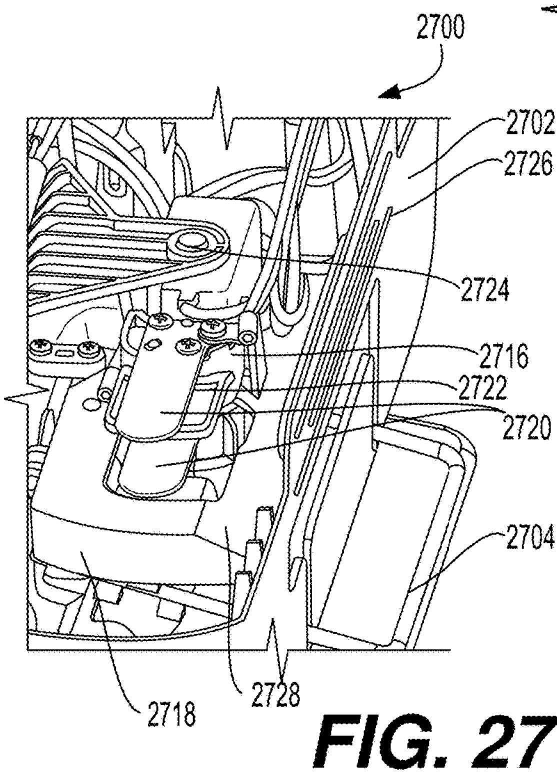

FIGS. 27A-27C illustrate stages of electrode extension from a battery system 2700 of a mobile apparatus, according to at least one example. The battery system 2700 includes a housing 2702, latch 2704, pivots for latch 2706, spring 2710 for biasing the latch 2704, and a latch compressor 2708 that causes the latch to move between the first position and the second position based on the orientation of the rotating connector and the alignment wedge 2718. The rotating connector pivots around pivot 2712.

In FIG. 27B, the rotating blade connector is shown extending through the housing 2702. The rotating blade connector includes a servo 2716 that drives the blade contacts 2720, spacer 2722, and alignment wedge 2718. The servo 2716 rotates the rotating blade connector around pivot 2714 to extend the blade contacts 2720 through openings 2726. Connector 2724 couples to the blade contact 2720 and provides an electrical connection to the opposite end of the battery system 2700 as well as to the battery for charging.

The alignment wedge 2718 includes an angled surface 2728 at a leading edge of the alignment wedge 2718 such that the angled surface 2728 contacts the housing of an adjacent battery system as described herein with respect to surface 2624. The angled surface 2728 enables the alignment wedge 2718 to contact the surface 2624 and lift the housing into alignment with the blade contacts 2720 of FIG. 27B. The surface 2624 may include a detection element 2630 such as a magnet or other such component that may be detected by a sensor, such as a hall effect sensor of the rotating blade assembly, as described with respect to FIGS. 28A-28B.

The alignment wedge 2718 further includes a post 2730. The post 2730 contacts the latch compressor 2708 when retracted to apply a force against the latch 2704 to release the latch 2704 from a latch hook as described herein. The latch compressor 2708 and post 2730 work to compress against the spring 2710 that biases the latch 2704. Accordingly, as the alignment wedge 2718 rotates back into the housing 2702, the post 2730 contacts the latch compressor 2708 to compress the latch 2704. In this manner, the latch 2704 disengages from a latch hook when the electrical components are retracted, thus causing electrical and mechanical connections to disengage simultaneously. As such, in FIG. 27C, the latch 2704 is compressed against the housing 2702 in the lower position.

FIGS. 28A-28B illustrate a rotating electrode assembly 2800, according to at least one example. FIG. 28A illustrates a top view of the rotating electrode assembly 2800. FIG. 28B illustrates a bottom view of the rotating electrode assembly 2800. The rotating electrode assembly may be similar and/or identical to the rotating blade connector assembly and/or the second interface described herein.

The rotating electrode assembly 2800 includes an alignment wedge 2802 such as other alignment wedges described herein. The alignment wedge 2802 includes an angles surface 2804 similar to the angled surface 2728 of FIG. 27. The rotating electrode assembly 2800 further includes blade contacts 2806 and motor 2808 that drives rotation of the rotating electrode assembly 2800 within the housing of a battery system. The motor 2808 connects to the housing at mount 2820.

A series of cables 2812 collect data from the hall effect sensor 2822 to a connection 2814 of a circuit board as well as receive electrical energy at contacts 2818 from the blade contacts 2806 to deliver to a battery or additional battery system of an adjacent mobile apparatus. The cables 2812 also include a connector 2816 for providing control to the motor 2808. In some examples, the hall effect sensor 2822 may include an interlock sensor that is used to determine connection and interlock with an adjacent housing of an adjacent mobile apparatus. As such, the hall effect sensor 2822 (or other such sensor configured to measure presence or proximity of an adjacent housing and/or detect interlock between the housings) may be used to determine when a connection is successfully made between mobile apparatuses, or if a second attempt should be made to connect.

After the rotating electrode assembly 2800 is rotated into position to couple adjacent mobile apparatuses, the mobile apparatus may use the hall effect sensor 2822 to determine if the mobile apparatuses are interlocked. If the hall effect sensor 2822 detects a magnet (which is mounted in the housing, e.g., at surface 2624) of the adjacent mobile apparatus, the blade contacts 2806 will be energized for charging. If no magnet is detected, the blade contacts 2806 are not energized and the rotating electrode assembly 2800 may be retracted to reattempt connection or to cease attempting to connect.

Figure 29:
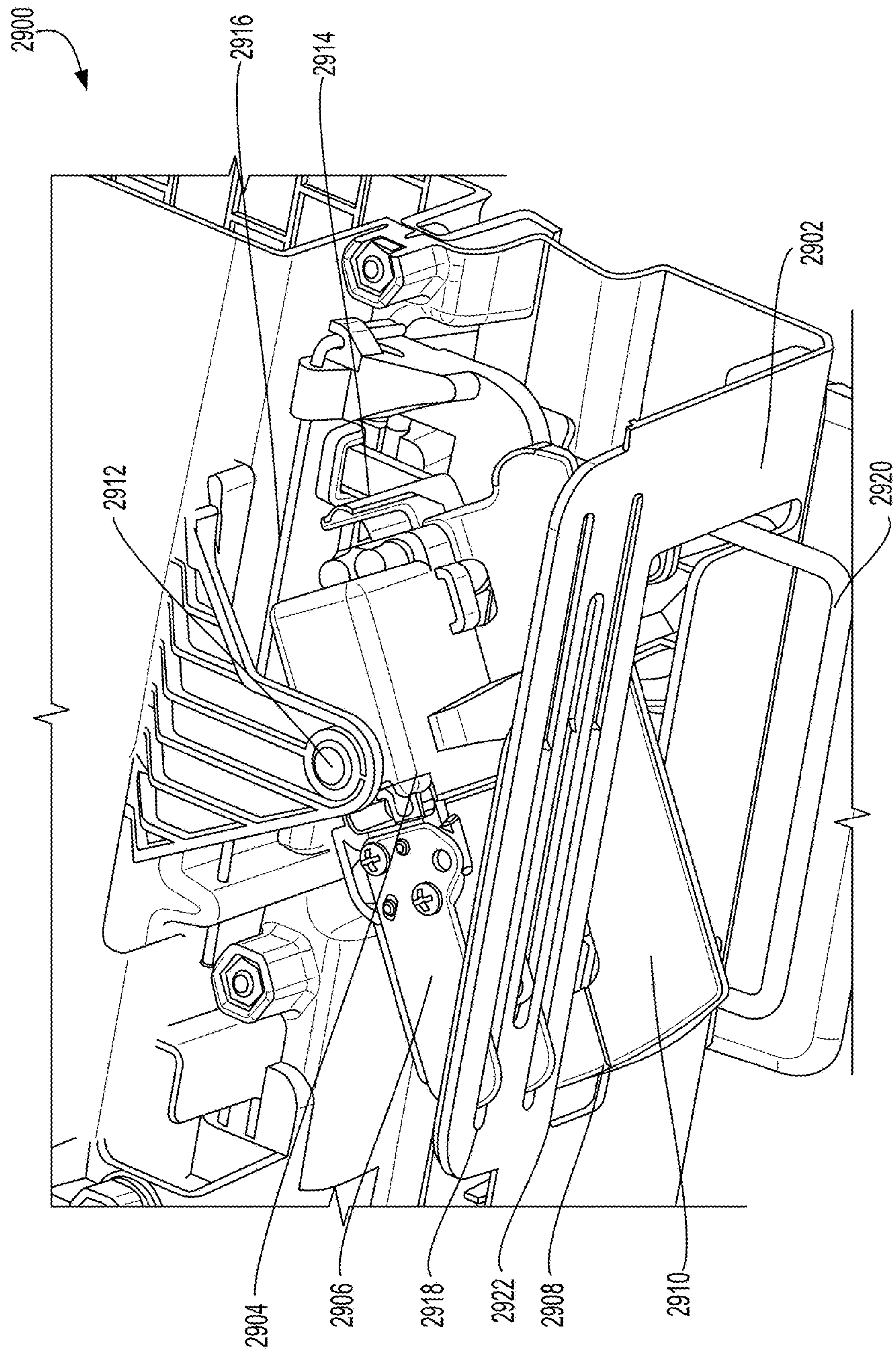
FIG. 29 illustrates an example of a rotating electrode assembly including a bidirectional spring element, according to at least one example.

Turning now to FIG. 29 that illustrates an example of a rotating electrode assembly 2900 including a bidirectional spring element, according to at least one example. The rotating electrode assembly 2900 may an alternative to the rotating electrode assembly 2800, or other electrode assemblies described herein. The rotating electrode assembly 2900 includes a rotating connector 2904 within a housing 2902. The housing 2902 may be similar or identical to other housings described herein. The rotating connector 2904 may be similar or identical to the blade connector 2410 and includes blade contacts 2906 and an alignment wedge 2908 having an angled surface 2910 for contacting a housing of an adjacent mobile apparatus. The rotating connector 2904 extends through openings 2918 and 2922 as the rotating connector 2904 pivots around pivot 2912.

The rotating electrode assembly 2900 is shown including a latch 2920 that be similar to the latch 2318, latch 2414, or latch 2514 described herein and may be actuated by rotation of the rotating connector 2904.

The rotating electrode assembly 2900 includes a bidirectional spring element that includes a spring member 2916 that includes a rod or member that spans between two locations within the housing. The spring member 2916 interacts with a deflection element 2914 positioned on a side of the rotating connector 2904 such that rotation of the rotating connector 2904 around the pivot 2912 causes the deflection element 2914 to contact the spring member 2916. Because the spring member 2916 is offset or eccentric from the pivot 2912, the rotation of the rotating element causes the spring member 2916 to move closer and further away from the spring member 2916. Specifically, as the rotating connector 2904 spins, the spring member 2916 contacts the spring member 2916 and causes deflection of the spring member 2916 to produce a force on the rotating connector 2904. In this manner, the rotating connector 2904 may rotate to extend from the housing 2902 in either a clockwise and/or a counter-clockwise direction.

In some examples, the latch 2920 may be actuated due to contact of the deflection element 2914 with the spring member 2916. The spring member 2916 may be coupled with the latch 2920 such that lateral movement of the spring member 2916 as a result of contact with the deflection member 2914 results in vertical movement of the latch 2920. For example, the spring member 2916 may couple to the latch 2920 such that the latch 2920 is configured to pivot about a pivot in response to lateral movement of the spring member 2916. The spring member 2916 may be loaded by a biasing force (e.g., a spring) to a position that leaves the latch 2920 in a lower position and when contacted by the deflection element 2914, the spring member 2916 moves against the biasing force and thereby raises the latch 2920.

Figure 30:
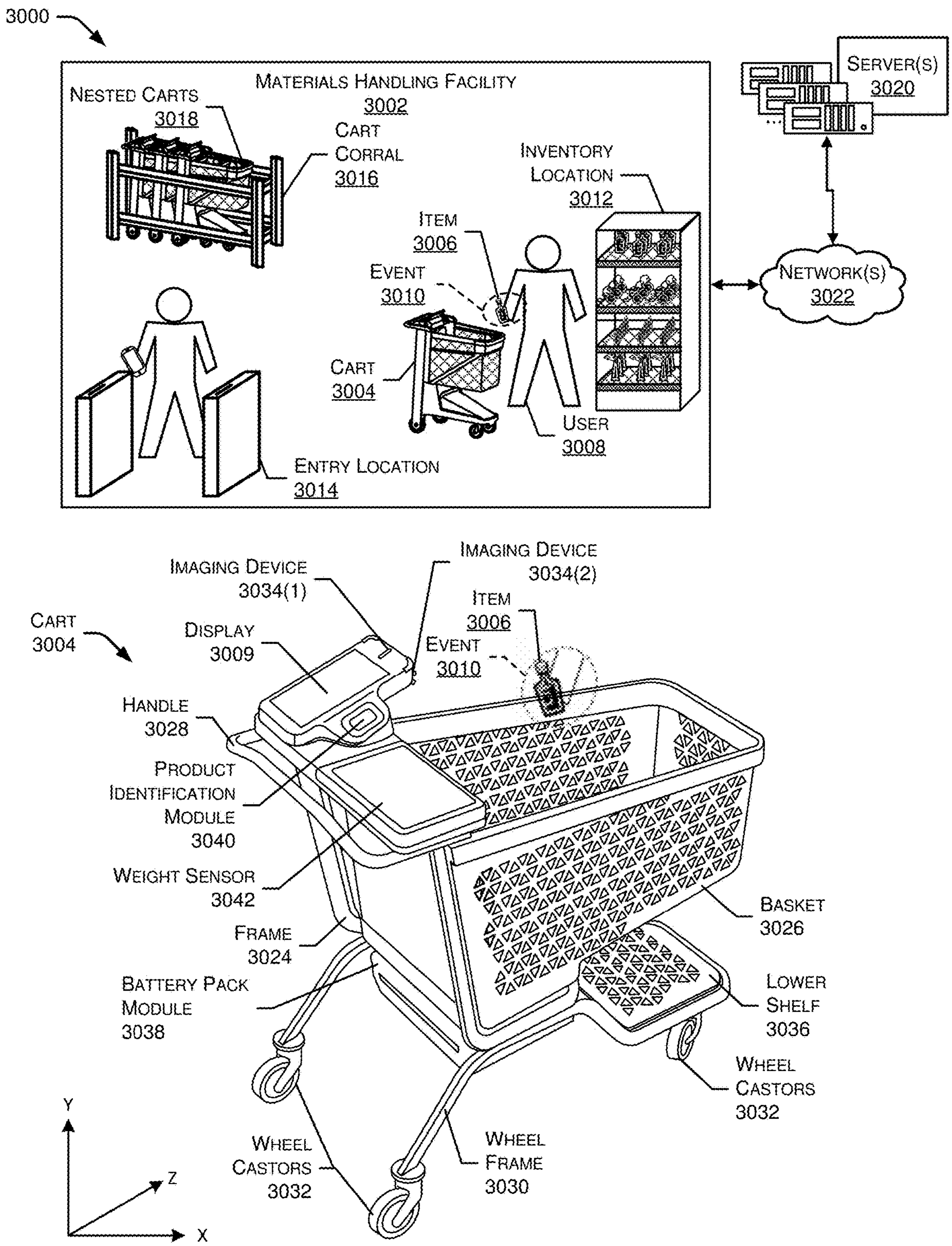
FIG. 30 illustrates an example environment of a materials handling facility that includes an item-identifying cart to identify items placed in, and removed from, a basket of the cart by a user.

FIG. 30 illustrates an example environment 3000 of a material handling facility 3002 that includes an item-identifying cart 3004 to identify items 3006 placed in, and removed from, a basket of the cart 3004 by an example user 3008. In some instances, the cart 3004 corresponds to the mobile apparatus 100 described above. In addition to identifying and analyzing image data for determining a location of the cart, the cart 3004 may generate first image data for identifying a user and generate second image data depicting the item 3006. In addition, the cart may analyze the second image data to identify an item identifier for the item 3006, determine the event 3010 involving the item (e.g., add to cart, remove from cart, multiple items, quantity of items, etc.) and update a virtual shopping cart associated with the identified user 3008 using the item identifier.

As FIG. 30 depicts, the user 3008 may have engaged in a shopping session in the materials handling facility 3002. For instance, the user 3008 may have selected an item 3006 from an inventory location 3012 (e.g., shelf, aisle, etc.) and placed the item 3006 in the cart 3004 (e.g., shopping cart). The inventory location 3012 may house one or more different types of items 3006 and the user 3008 may pick (i.e., take, retrieve, etc.) one of these items 3006.

As illustrated, the materials handling facility 3002 (or "facility") may have one or more entry locations 3014, such as lanes. The entry location 3014 may be defined by a gate in some examples and may include a movable barrier to control movement of users 3008. For example, the gate may include computer-controlled panels that may be closed to impede passage of the users 3008 or opened to permit passage of the user 3008. Upon entering a facility 3002, a user 3008 may desire to utilize a cart 3004 for their shopping session to transport items 3006 around the facility 3002 during their shopping session. In such examples, the user 3008 may approach a cart corral 3016, or other locations, at which carts 3004 are stored. In some examples, the cart corral 3016 may comprise a structure, such as an aisle, for storing nested carts 3018.

Generally, two or more of the carts 3004 may be configured to nest or otherwise functionality join with one another, so that the carts 3004 may be easily stored in a cart corral 3016, and/or transported in bulk. In some examples, the cart corral 3016 may provide additional functionality beyond storage. For instance, the cart corral 3016 may facilitate charging of the nested carts 3018 that are in the cart corral 3016. For instance, the cart corral 3016 may have various electrical contacts extending along the length of a horizontal and/or vertical member of the corral 3016 that, when placed in electrical contact with an electrical contact of the nested carts 3018, charge one or more batteries of the nested carts 3018. In other examples, power cords may extend from the cart corral 3016 that may be plugged into the nested carts 3018 to recharge batteries of the nested carts 3018 while not in use.

In some instances, as described above, each of the nested carts 3018 may reside in a low-power (e.g., deep-sleep) state when in the cart corral 3016. For instance, proximity sensors of the cart may detect an object (e.g., another cart) very near and, in response, may cause the respective cart to enter the low-power state. In addition, or in the alternative, each cart may include a mechanical switch that may be actuated when placed into the cart corral 3016, resulting in the cart entering the low-power state. In still other instances, when the cart corral 3016 includes the electrical contacts to contact with corresponding contacts of the nested carts 3018, each cart may use this signal to cause the cart to enter the low-power state. Of course, while a few examples are provided, the carts may enter the low-power state in any number of ways when nested with other carts in the corral 3016.

To utilize a cart 3004, a user 3008 may approach an unused cart that is not currently engaged in a shopping session (e.g., a nested cart 3018), and interact with the unused cart 3004 to identify themselves to the cart 3004 and begin a shopping session. For instance, the carts 3004 may include a first imaging device 3034(1) (e.g., an image sensor such as a camera, photodetector, or other sensing apparatus designed to read a one or two-dimensional barcode) such that when a user 3008 presents a user device, or portion thereof, such as the display, to the imaging device 3034(1), the cart 3004 may identify the user and corresponding user account for a shopping session. Other types of interaction may be performed by a user 3008 to identify themselves to a cart 3004 (e.g., uttering a name or other keyword to identify the user 3008, presenting the user's face for facial recognition, typing in a password or other user information into a display of the cart 3004, and/or any other type of user identification technique).

Further, in some instances the cart 3004 may transition from a low-power state to a higher-power state in response to the user approaching the cart 3004 and/or removing the cart 3004 from the corral 3016. For instance, the imaging devices 3034 and/or the proximity sensors may identify the user approaching (e.g., entering within the threshold distance of the cart 3004) and, in response, may cause the cart to enter the higher-power state by, for example, powering on and/or up one or more components that were previously powered off and/or down. In another example, removing the cart 3004 from the corral 3016 may cause the mechanical switch to trip or may cause the electrical contacts of the corral 3016 to become uncoupled from the contacts of the cart 3004, resulting in the cart entering the higher-power state. Again, while a few examples are provided, it is to be appreciated that the cart may transition from a low-power state to a higher-power state in response to being removed from the corral 3016 and/or in response to a user approaching the cart 3004 in any number of other ways.

Once a user has identified themselves to the cart 3004, the item-identifying functionality of the cart 3004 may be activated such that subsequent items 3006 placed in the cart 3004 will be identified by the cart 3004 and added to a virtual shopping cart for the user 3008. As illustrated, a user 3008 may move the cart 3004 around the facility 3002 to one or more inventory locations 3012. The user 3008 may retrieve items from the inventory location 3012 and place the items 3006 in the cart 3004. Additionally, the user 3008 may retrieve items 3006 from the cart 3004 and put the items 3006 back in an inventory location 3012, such as when the user 3008 changes their mind regarding their desire to purchase or otherwise acquire the item 3006. The cart 3004 may include various components for identifying item identifiers corresponding to the items 3006 placed in the cart and maintaining a virtual shopping cart for the shopping session of the user 3008.

Once the user 3008 has finished their shopping session, the user 3008 may end the shopping session in various ways. For instance, the user 3008 may return the cart 3004 to the cart corral 3016, provide input to the cart 3004 indicating an end of the shopping session (e.g., utterance, utilize a user interface element on a touch display, etc.), or simply remove item bags or other item carriers from the cart 3004 and leave the facility 3002. After the user 3008 has ended their shopping session, the list of item identifiers in the virtual shopping cart may be uploaded to one or more remote servers 3020, over one or more networks 3022, that manage user accounts for users 3008 of the facility 3002. The server(s) 3020 may charge the appropriate user account for the listing of the items in the virtual shopping cart that the user took from the facility 3002. For instance, the server(s) 3020 may be configured to determine or generate information indicative of a cost of the items 3006 picked by the user 3008. Additionally, the server(s) 3020 may store payment information (e.g., credit card information, bank account information, etc.) for each user account. In this way, when the user 3008 finished their shopping session and the cart 3004 sends the listing of item identifiers in the virtual shopping cart over the network(s) 3022 to the server(s) 3020, the server(s) 3020 may be configured to determine a cost or price for all of the listed item identifiers and charge the user via their payment information for the items 3006 selected during their shopping session. In this way, the user 3008 need not go through steps of a traditional check-out experience (e.g., waiting in line for a cashier, scanning items with the cashier, paying for items at the cashier, etc.).

The network(s) 3022 may include private networks such as an institutional or personal intranet, public networks such as the Internet, or a combination thereof. The network(s) 3022 may utilize wired technologies (e.g., wires, fiber optic cable, and so forth), wireless technologies (e.g., radio frequency, infrared, acoustic, optical, and so forth), or other connection technologies. The network(s) 3022 is representative of any type of communication network, including one or more of data networks or voice networks. The network(s) 3022 may be implemented using wired infrastructure (e.g., copper cable, fiber optic cable, and so forth), a wireless infrastructure (e.g., cellular, microwave, satellite, etc.), or other connection technologies.

The cart 3004 may include communication interface(s) such as devices configured to couple to personal area networks (PANs), wired and wireless local area networks (LANs), wired and wireless wide area networks (WANs), and so forth. For example, the communication interfaces may include devices compatible with Ethernet, Wi-Fi™, and so forth. In some examples, the communication interface(s) may encode the data prior to sending over the network(s) 3022 according to the type of protocol or standard being used. As noted above, in some examples, the servers 3020 may perform some or all of the operations described below as being performed by the cart 3004. While the servers 3020 are illustrated as being in a location outside of the facility 3002, in other implementations, at least a portion of the servers 3020 may be located at the facility 3002.

As illustrated, the cart 3004 may generally include or be formed of a frame 3024, a basket 3026, a first handle 3028(1) for pushing the cart 3004, a second handle 3028(2) for pulling the cart, a wheel frame 3030—, and one or more-wheel castors 3032 to enable movement of the cart 3004 on a surface. The frame 3024, the basket 3026, the handles 3028, and the wheel frame 3030 may be formed from any suitable materials such as plastics, wood, metals, composites, or any other combinations of materials. Moreover, frame 3024, the basket 3026, the handle 3028, and the wheel frame 3030 may take any form.

The basket 3026 may generally be part of the frame 3024 and/or supported by the frame 3024 (e.g., be welded, fused, adhered, bolted, screwed, molded, or otherwise joined to the frame 3024). In some examples, the basket 3026 may comprise a grid or lattice-like structure (e.g., a honeycombed arrangement or framework) having one or more bars or members that are welded, fused, adhered, bolted, screwed, molded, stitched, or otherwise joined in a substantially perpendicular alignment with respect to one another. The basket 3026 may generally be any shape that defines an interior cavity, or receptacle, for receiving items 3006 that are placed in the cart 3004. The basket 3026 may comprise a bottom, multiple sides protruding from the bottom, and atop. As illustrated, the bottom basket 3026 may be in the shape of a quadrilateral such that there are four sides protruding from the bottom of the basket 3026. Similarly, the top of the basket 3026 may be defined according to the quadrilateral shape and have a perimeter with four corners. The perimeter of the top of the basket 3026 may define an opening to the interior cavity (or receptacle) of the basket 3026 to receive items placed inside the basket 3026. In various examples, the perimeter of the top of the basket may be disposed in a substantially horizontal plane (e.g., a plane substantially along the x-axis as illustrated), and the frame 3024 may include at least one vertical member that extends downward from the basket 3026 to the wheel frame 3030 along a substantially vertical plane (e.g., a plane substantially along the y-axis as illustrated).

The wheel frame 3030 may support one or more wheel castors 3032 to enable movement of the cart 3004 along a surface. The wheel casters 3032 include one or more wheels, axles, forks, joints, or other components which enable the cart 3004 to travel on various surfaces. For example, in some implementations each of the wheel casters 3032 may include a single wheel provided on an axle within a fork, or two or more wheels provided on such an axle. In some other implementations, the wheel casters 3032 may include two or more axles. Alternatively, in still other implementations, a single caster may be provided in lieu of the multiple wheel casters 3032 shown in FIG. 30. In accordance with the present disclosure, the wheel casters 3032 may operate in any manner, such as being configured to pivot or swivel, and thus automatically adjust or align with a direction of travel. In some examples, the cart 3004 may be equipped with other apparatuses for enabling the cart 3004 to travel on solid surfaces, including one or more wheeled components other than casters, including but not limited to omnidirectional wheels, spherical wheels, or other like apparatuses. Additionally, in some other implementations, the cart 3004 may include two or more skis or other runners for traveling on smooth surfaces. In still other implementations, the cart 3004 may be levitated, e.g., by magnetic levitation through the use of one or more linear induction motors. Moreover, the cart 3004 may be propelled or pushed by humans or autonomous mobile robots or, alternatively, by one or more motors (e.g., electric-powered, or gasoline-powered).

As illustrated, the cart 3004 may include a first imaging device 3034(1), for identifying a user operating the cart as described above, and additional, second imaging devices 3034(2), 3034(3), 3034(4) . . . , 3034(N) that include components for use in identifying items placed in the basket 3026 and removed from the basket 3026. The imaging device 3034(1) may, in some instances, be positioned in a manner such that an FOV of the imaging device 3034(1) is away from the basket 3026 and substantially towards the first handle 3028(1) where a user may typically operate the cart 3004. The imaging devices 3034(2)-(N) may be positioned at any location on the cart 3004 (e.g., in the basket 3026, on the basket 3026, mounted to the frame 3024, mounted to the basket 3026, and/or any other location), oriented to have respective FOVs for identifying events that occur within and proximate to the basket 3026. In some examples, the cart 3004 may include at least four of the second imaging devices 3034(1), 3034(2), 3034(3), and 3034(N) that are disposed or coupled proximate to four corners of the top of the basket 3026. In some examples, one or all of the components of the second imaging devices may be disposed internal to the form factor of the basket 3026 and/or frame 3024, at least partially internal to the form factor of the basket 3026 and/or frame 3024, and/or entirely external to the form factor of the basket 3026 and/or frame 3024 (e.g., mounted to the cart 3004). However, in the illustrated example, the second imaging devices may be disposed at locations proximate to the four corners of the top or perimeter of the basket 3026/frame 3024. In some instances, the less that the second imaging devices protrude from the form factor of the cart 3004, the more efficiently the carts 3004 may be nested with respect to each other.

In some examples, the cart 3004 may further include one or more one light sources (e.g., LED) for emitting light at or prior to the time of the second imaging devices generating the second image data. The cart 3004 may further include, in some instances, one or more proximity sensors (e.g., ToF sensor, PIR sensor, etc.). In some examples the proximity sensors may be activated to detect the proximity of users, objects above the top of the basket 3026, and/or other objects. The proximity sensors may be configured to generate sensor data that indicates distances between objects above the top of the basket 3026 of the cart 3004 and the second imaging devices. The cart 3004 may include components configured to analyze the sensor data and determine that an item 3006 is within some threshold distance from the top of the basket 3026 and/or within the basket 3026. Upon detecting an object within the threshold proximity of the basket 3026 using the proximity sensor, one or more components of the cart 3004 may cause the light sources (LEDs) to emit light and the second imaging devices to generate image data. In some examples, the FOVs of the second imaging devices 3034(2)-(N) may each at least partially overlap at a location above the top of the basket 3026 corresponding to a centroid of the quadrilateral defining the top of the basket 3026. The light sources may illuminate the basket 3026 and/or the area above the top of the basket 3026 to illuminate items 3006 being placed in the cart 3004, or removed from the cart 3004, to act as a "flash" for the cameras that are generating image data. The second imaging devices may generate image data for a predefined period of time and/or until the proximity sensors (or the image data itself) indicates that there is no longer an object within the threshold distance from the cart 3004 or top of the cart 3004.

After generating the image data, one or more components of the cart 3004 may process the image data to determine an item identifier for the item(s) 3006 represented in the image data, and an event 3010 for the image data (e.g., addition of an item 3006 to the cart, removal of an item 3006 from the cart). As described in more detail below, the cart 3004 may include component(s) to determine an item 3006 identifier for the item 3006 (e.g., name of the item 3006, SKU number for the item 3006, etc.), and determine if the item 3006 is being taken from the cart 3004, or added to the cart 3004, based on the motion of the item 3006 and the result of the movement around the cart 3004 once movement is no longer detected and represented by the image data. The components of the cart 3004 may then update a virtual shopping cart associated with the cart 3004 that indicates a virtual listing of items 3006 taken by the user 3008 from the facility based on the determined event 3010. In some examples, the image data may be transmitted to the server(s) 3020 over the network(s) 3022 where the processing may be performed.

In various examples, the cart 3004 may include a display 3036 to present various information in user interface(s) for the user 3008 to consume. In some examples, the display 3036 may comprise a touch screen to receive input from the user 3008 (e.g., a selection of an item identifier to disambiguate amongst potential item identifiers). In some instances, the display 3036 may present customized information to the user 3008 upon identifying the user 3008, such as a shopping list of the user or the like.

The cart 3004 may further include a battery pack module 3038 that houses one or more batteries to power the components of the cart 3004. The battery pack module 3038 may include rechargeable batteries. In some examples, the battery pack module 3038 may be detachably coupled to the wheel frame 3030 and/or the frame 3024 of the cart 3004 such that the battery pack module 3038 may be removed and taken to a charging station. In various examples, the battery pack module 3038 may include rechargeable batteries that may be charged when the cart 3004 is placed in a cart corral 3016 (e.g., through electrical contacts, power cords, etc.). In various examples, the frame 3024 and/or basket 3026 may have one or more channels (e.g., grooves, holes, paths, tunnels, etc.) through which power cables/cords may pass. In this way, power cables may be run at least partially through the channels in the frame 3024 and/or basket 3026 inconspicuously to provide power to the various components of the cart 3004.

In some instances, the cart 3004 may further include one or more lighting element(s) 3040 disposed on the frame 3024 and/or basket 3026 of the cart 3004. The user 3008 may, in some instances, operate a controller to turn on (and off) the lighting element(s) 3040 to cause the lighting element(s) to emit light. Further, in some instances the controller may enable the lighting element(s) 3040 to transition between multiple light states, such as different colors, flashing effects, and/or the like. The controller operable by the user 3008 may comprise functionality accessible to the user 3008 via the display (e.g., one or more soft buttons for turning on and/or off the light), a physical toggle switch on the frame 3024 of the cart 3004, and/or the light. Further, the lighting element(s) 3040 may be used to signal a predefined state of the cart 3004 and/or the user 3008. For example, the user 3008 may turn on the lighting element(s) 3040 to indicate that he or she requests assistance from an associate of the facility 3002, or for any other reason. In some instances, in response to the user 3008 operating a controller to request assistance, the cart 3004 may perform one or more actions in addition to turning on the lighting element(s) 3040. For example, the display may present content responding to this request, such as an offer to connect the user 3008 with an associate of the store (e.g., in person, via I/O devices of the cart, etc.). For example, in response to requesting assistance, the cart 3004 may facilitate an audio-only or an audio/video call between the user 3008 and an associate of the facility using one or more I/O devices on the cart, such as the display, one or more speakers, one or more microphones, one or more cameras pointed toward the user 3008 and/or the like.

In still other instances, associates of the facility may, remotely or otherwise, operate the lighting element(s) 3040 to change states (e.g., turn on or off) and/or the cart 3004 may include components to automatically change a state of the lighting element(s) 3040. For example, upon the card identifying that an item of a predefined class of items has entered the basket, the cart 3004 may cause the lighting element(s) 3040 to change state (e.g., from an off state to an on state) to indicate that an additional checkout workflow may now be required. For example, if the user 3008 places an item into the basket 3026 that requires the purchasing user to be of a certain age (e.g., alcohol) or to have a certain prescription (e.g., medicine), the cart 3004 may illuminate the lighting element(s). In some instances, the cart 3004 may include a lighting element on a right side of the frame, a lighting element on a left side of the frame, and/or one or more other lighting elements in other locations on the cart 3004.

Figure 31:
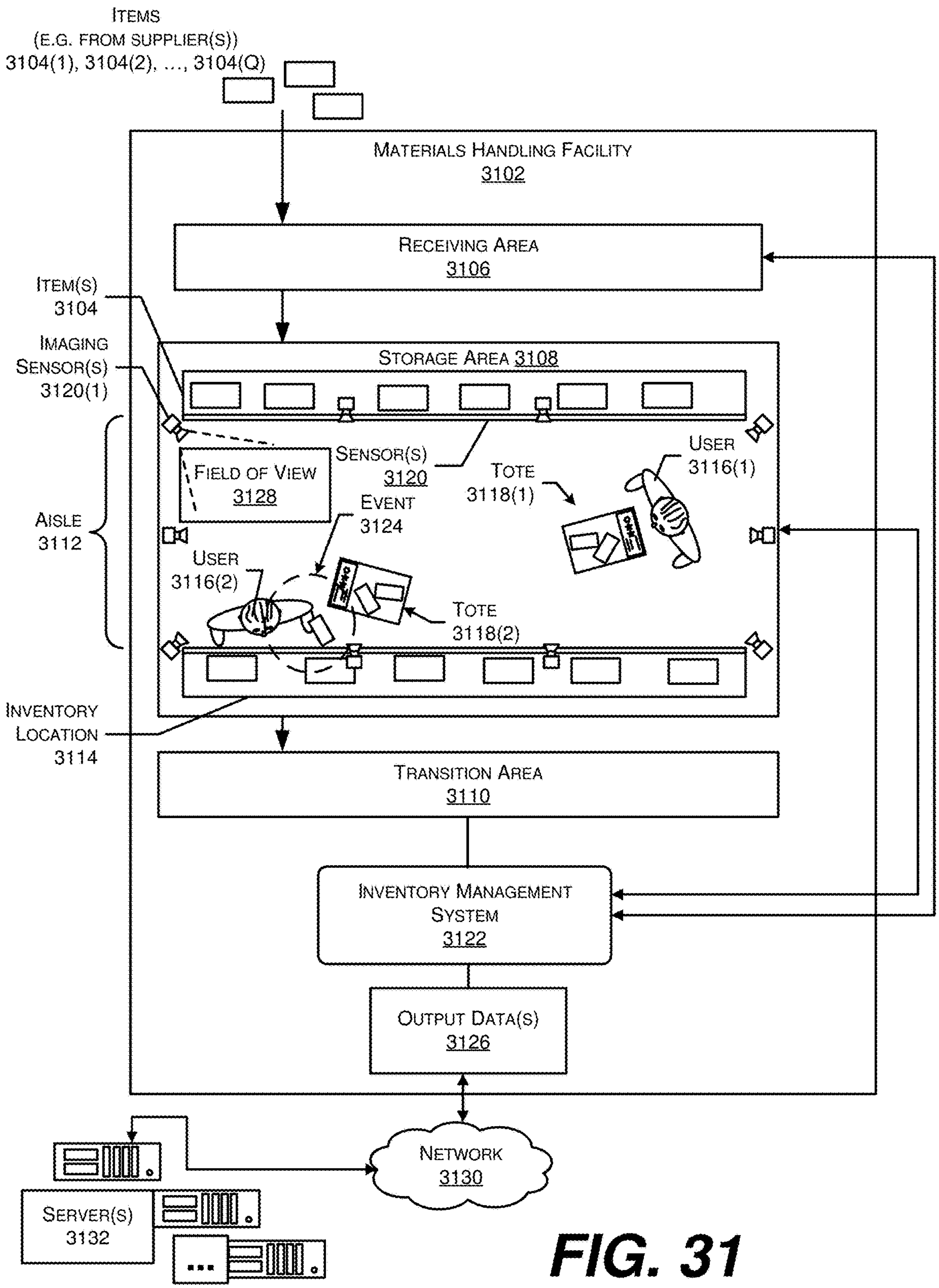
FIG. 31 is a block diagram of an example materials handling facility that includes sensors and an inventory management system configured to generate output regarding events occurring in the facility using the sensor data, according to at least one example.

FIG. 31 represents an illustrative materials handing environment, such as the materials handling facility 3102, in which the techniques described herein may be applied to cameras monitoring the environments as described below. However, the following description is merely one illustrative example of an industry and environment in which the techniques described herein may be utilized. The materials handling facility 3102 (or "facility") comprises one or more physical structures or areas within which one or more items 3104(1), 3104(2), . . . , 3104(Q) (also referred to as "items 3104") may be held. As used in this disclosure, letters in parentheses such as "(Q)" indicate an integer result. The items 3104 comprise physical goods, such as books, pharmaceuticals, repair parts, electronic gear, groceries, and so forth.

The facility 3102 may include one or more areas designated for different functions with regard to inventory handling. In this illustration, the facility 3102 includes a receiving area 3106, a storage area 3108, and a transition area 3110. The receiving area 3106 may be configured to accept items 3104, such as from suppliers, for intake into the facility 3102. For example, the receiving area 3106 may include a loading dock at which trucks or other freight conveyances unload the items 3104.

The storage area 3108 is configured to store the items 3104. The storage area 3108 may be arranged in various physical configurations. In one implementation, the storage area 3108 may include one or more aisles 3112. The aisle 3112 may be configured with, or defined by, inventory locations 3114 on one or both sides of the aisle 3112. The inventory locations 3114 may include one or more of shelves, racks, cases, cabinets, bins, floor locations, or other suitable storage mechanisms for holding or storing the items 3104. The inventory locations 3114 may be affixed to the floor or another portion of the facility's structure, or may be movable such that the arrangements of aisles 3112 may be reconfigurable. In some implementations, the inventory locations 3114 may be configured to move independently of an outside operator. For example, the inventory locations 3114 may comprise a rack with a power source and a motor, operable by a computing device to allow the rack to move from one location within the facility 3102 to another.

One or more users 3116(1), 3116(2) (also referred to as "users 3116")), totes 3118(1), 3118(2) (also referred to as "totes 3118")) or other material handling apparatus may move within the facility 3102. For example, the users 3116 may move about within the facility 3102 to pick or place the items 3104 in various inventory locations 3114, placing them on the totes 3118 for ease of transport. A tote 3118 is configured to carry or otherwise transport one or more items 3104. For example, a tote 3118 may include a basket, a cart, a bag, and so forth. In other implementations, other agencies such as robots, forklifts, cranes, aerial drones, and so forth, may move about the facility 3102 picking, placing, or otherwise moving the items 3104.

One or more sensors 3120 may be configured to acquire information in the facility 3102. The sensors 3120 in the facility 3102 may include sensors fixed in the environment (e.g., ceiling-mounted cameras) or otherwise, such as sensors in the possession of users (e.g., mobile phones, tablets, etc.). The sensors 3120 may include, but are not limited to, sensors 3120(1), weight sensors, radio frequency (RF) receivers, temperature sensors, humidity sensors, vibration sensors, and so forth. The sensors 3120 may be stationary or mobile, relative to the facility 3102. For example, the inventory locations 3114 may contain sensors 3120(1) configured to acquire images of pick or placement of items 3104 on shelves, of the users 3116(1) and 3116(2) in the facility 3102, and so forth. In another example, the floor of the facility 3102 may include weight sensors configured to determine a weight of the users 3116 or another object thereupon.

During operation of the facility 3102, the sensors 3120 may be configured to provide information suitable for tracking how objects move or other occurrences within the facility 3102. For example, a series of images acquired by a sensor 3120(1) may indicate removal of an item 3104 from a particular inventory location 3114 by one of the users 3116 and placement of the item 3104 on or at least partially within one of the totes 3118.

While the storage area 3108 is depicted as having one or more aisles 3112, inventory locations 3114 storing the items 3104, sensors 3120, and so forth, it is understood that the receiving area 3106, the transition area 3110, or other areas of the facility 3102 may be similarly equipped. Furthermore, the arrangement of the various areas within the facility 3102 is depicted functionally rather than schematically. For example, multiple different receiving areas 3106, storage areas 3108, and transition areas 3110 may be interspersed rather than segregated in the facility 3102.

The facility 3102 may include, or be coupled to, an inventory management system 3122, which may perform some or all of the techniques described herein. For example, the inventory management system 3122 may maintain a virtual cart of each user within the facility. The inventory management system 3122 may also store a record associated with each user indicating an identifier associated with the user, the location of the user, and whether the user is eligible to exit the facility with one or more items without performing a manual checkout of the items. The inventory management system 3122 may also generate and output notification data to the users, indicating whether or not they are so eligible.

As illustrated, the inventory management system 3122 may reside at the facility 3102 (e.g., as part of on-premises servers), on the servers 3132 that are remote from the facility 3102, a combination thereof. In each instance, the inventory management system 3122 is configured to identify interactions and events with and between users 3116, devices such as sensors 3120, robots, material handling equipment, computing devices, and so forth, in one or more of the receiving area 3106, the storage area 3108, or the transition area 3110. As described above, some interactions may further indicate the existence of one or more events 3124, or predefined activities of interest. For example, events 3124 may include the entry of the user 3116 to the facility 3102, stocking of items 3104 at an inventory location 3114, picking of an item 3104 from an inventory location 3114, returning of an item 3104 to an inventory location 3114, placement of an item 3104 within a tote 3118, movement of users 3116 relative to one another, gestures by the users 3116, and so forth. Other events 3124 involving users 3116 may include the user 3116 providing authentication information in the facility 3102, using a computing device at the facility 3102 to authenticate identity to the inventory management system 3122, and so forth. Some events 3124 may involve one or more other objects within the facility 3102. For example, the event 3124 may comprise movement within the facility 3102 of an inventory location 3114, such as a counter mounted on wheels. Events 3124 may involve one or more of the sensors 3120. For example, a change in operation of a sensor 3120, such as a sensor failure, change in alignment, and so forth, may be designated as an event 3124. Continuing the example, movement of a sensor 3120(1) resulting in a change in the orientation of the field of view 3128 (such as resulting from someone or something bumping the sensor 3120(1)) may be designated as an event 3124.

By determining the occurrence of one or more of the events 3124, the inventory management system 3122 may generate output data 3126. The output data 3126 comprises information about the event 3124. For example, where the event 3124 comprises an item 3104 being removed from an inventory location 3114, the output data 3126 may comprise an item identifier indicative of the particular item 3104 that was removed from the inventory location 3114 and a user identifier of a user that removed the item.

The inventory management system 3122 may use one or more automated systems to generate the output data 3126. For example, an artificial neural network, one or more classifiers, or other automated machine learning techniques may be used to process the sensor data from the one or more sensors 3120 to generate output data 3126. For example, the inventory management system 3122 may perform some or all of the techniques for generating and utilizing a classifier for identifying user activity in image data, as described in detail above. The automated systems may operate using probabilistic or non-probabilistic techniques. For example, the automated systems may use a Bayesian network. In another example, the automated systems may use support vector machines to generate the output data 3126 or the tentative results. The automated systems may generate confidence level data that provides information indicative of the accuracy or confidence that the output data 3126 or the tentative data corresponds to the physical world.

The confidence level data may be generated using a variety of techniques, based at least in part on the type of automated system in use. For example, a probabilistic system using a Bayesian network may use a probability assigned to the output as the confidence level. Continuing the example, the Bayesian network may indicate that the probability that the item depicted in the image data corresponds to an item previously stored in memory is 80%. This probability may be used as the confidence level for that item as depicted in the image data.

In another example, output from non-probabilistic techniques such as support vector machines may have confidence levels based on a distance in a mathematical space within which the image data of the item and the images of previously stored items have been classified. The greater the distance in this space from a reference point such as the previously stored image to the image data acquired during the occurrence, the lower the confidence level.

In yet another example, the image data of an object such as an item 3104, user 3116, and so forth, may be compared with a set of previously stored images. Differences between the image data and the previously stored images may be assessed. For example, differences in shape, color, relative proportions between features in the images, and so forth. The differences may be expressed in terms of distance with a mathematical space. For example, the color of the object as depicted in the image data and the color of the object as depicted in the previously stored images may be represented as coordinates within a color space.

The confidence level may be determined based at least in part on these differences. For example, the user 3116 may pick an item 3104(1) such as a perfume bottle that is generally cubical in shape from the inventory location 3114. Other items 3104 at nearby inventory locations 3114 may be predominantly spherical. Based on the difference in shape (cube vs. sphere) from the adjacent items, and the correspondence in shape with the previously stored image of the perfume bottle item 3104(1) (cubical and cubical), the confidence level that the user 3116 has picked up the perfume bottle item 3104(1) is high.

In some situations, the automated techniques may be unable to generate output data 3126 with a confidence level above a threshold result. For example, the automated techniques may be unable to distinguish which user 3116 in a crowd of users 3116 has picked up the item 3104 from the inventory location 3114. In other situations, it may be desirable to provide human confirmation of the event 3124 or of the accuracy of the output data 3126. For example, some items 3104 may be deemed age restricted such that they are to be handled only by users 3116 above a minimum age threshold.

In instances where human confirmation is desired, sensor data associated with an event 3124 may be processed to generate inquiry data. The inquiry data may include a subset of the sensor data associated with the event 3124. The inquiry data may also include one or more of one or more tentative results as determined by the automated techniques, or supplemental data. The subset of the sensor data may be determined using information about the one or more sensors 3120. For example, camera data such as the location of the sensor 3120(1) within the facility 3102, the orientation of the sensor 3120(1), and a field of view 3128 of the sensor 3120(1) may be used to determine if a particular location within the facility 3102 is within the field of view 3128. The subset of the sensor data may include images that may show the inventory location 3114 or that the item 3104 was stowed. The subset of the sensor data may also omit images from other sensors 3120(1) that did not have that inventory location 3114 in the field of view 3128. The field of view 3128 may comprise a portion of the scene in the facility 3102 that the sensor 3120 is able to generate sensor data about.

Continuing the example, the subset of the sensor data may comprise a video clip acquired by one or more sensors 3120(1) having a field of view 3128 that includes the item 3104. The tentative results may comprise the "best guess" as to which items 3104 may have been involved in the event 3124. For example, the tentative results may comprise results determined by the automated system that have a confidence level above a minimum threshold.

The facility 3102 may be configured to receive different kinds of items 3104 from various suppliers and to store them until a customer orders or retrieves one or more of the items 3104. A general flow of items 3104 through the facility 3102 is indicated by the arrows of FIG. 14. Specifically, as illustrated in this example, items 3104 may be received from one or more suppliers, such as manufacturers, distributors, wholesalers, and so forth, at the receiving area 3106. In various implementations, the items 3104 may include merchandise, commodities, perishables, or any suitable type of item 3104, depending on the nature of the enterprise that operates the facility 3102. The receiving of the items 3104 may comprise one or more events 3124 for which the inventory management system 3122 may generate output data 3126.

Upon being received from a supplier at receiving area 3106, the items 3104 may be prepared for storage. For example, items 3104 may be unpacked or otherwise rearranged. The inventory management system 3122 may include one or more software applications executing on a computer system to provide inventory management functions based on the events 3124 associated with the unpacking or rearrangement. These inventory management functions may include maintaining information indicative of the type, quantity, condition, cost, location, weight, or any other suitable parameters with respect to the items 3104. The items 3104 may be stocked, managed, or dispensed in terms of countable, individual units or multiples, such as packages, cartons, crates, pallets, or other suitable aggregations. Alternatively, some items 3104, such as bulk products, commodities, and so forth, may be stored in continuous or arbitrarily divisible amounts that may not be inherently organized into countable units. Such items 3104 may be managed in terms of measurable quantity such as units of length, area, volume, weight, time, duration, or other dimensional properties characterized by units of measurement. Generally speaking, a quantity of an item 3104 may refer to either a countable number of individual or aggregate units of an item 3104 or a measurable amount of an item 3104, as appropriate.

After arriving through the receiving area 3106, items 3104 may be stored within the storage area 3108. In some implementations, like items 3104 may be stored or displayed together in the inventory locations 3114 such as in bins, on shelves, hanging from pegboards, and so forth. In this implementation, all items 3104 of a given kind are stored in one inventory location 3114. In other implementations, like items 3104 may be stored in different inventory locations 3114. For example, to optimize retrieval of certain items 3104 having frequent turnover within a large physical facility 3102, those items 3104 may be stored in several different inventory locations 3114 to reduce congestion that might occur at a single inventory location 3114. Storage of the items 3104 and their respective inventory locations 3114 may comprise one or more events 3124. In some instances, device(s) may be placed on one or more of the items 3104, where the devise(s) are used to track the one or more items 3104 while within the facility 3102, as described herein.

When a customer order specifying one or more items 3104 is received, or as a user 3116 progresses through the facility 3102, the corresponding items 3104 may be selected or "picked" from the inventory locations 3114 containing those items 3104. In various implementations, item picking may range from manual to completely automated picking. For example, in one implementation, a user 3116 may have a list of items 3104 they desire and may progress through the facility 3102 picking items 3104 from inventory locations 3114 within the storage area 3108, and placing those items 3104 into a tote 3118. In other implementations, employees of the facility 3102 may pick items 3104 using written or electronic pick lists derived from customer orders. These picked items 3104 may be placed into the tote 3118 as the employee progresses through the facility 3102. Picking may comprise one or more events 3124, such as the user 3116 in moving to the inventory location 3114, retrieval of the item 3104 from the inventory location 3114, and so forth.

After items 3104 have been picked, they may be processed at a transition area 3110. The transition area 3110 may be any designated area within the facility 3102 where items 3104 are transitioned from one location to another or from one entity to another. For example, the transition area 3110 may be a packing station within the facility 3102. When the item 3104 arrives at the transition area 3110, the items 3104 may be transitioned from the storage area 3108 to the packing station. The transitioning may comprise one or more events 3124. Information about the transition may be maintained by the inventory management system 3122 using the output data 3126 associated with those events 3124.

In another example, if the items 3104 are departing the facility 3102 a list of the items 3104 may be obtained and used by the inventory management system 3122 to transition responsibility for, or custody of, the items 3104 from the facility 3102 to another entity. For example, a carrier may accept the items 3104 for transport with that carrier accepting responsibility for the items 3104 indicated in the list. In another example, a customer may purchase or rent the items 3104 and remove the items 3104 from the facility 3102. The purchase or rental may comprise one or more events 3124.

The inventory management system 3122 may access or generate sensor data about the facility 3102 and the contents therein including the items 3104, the users 3116, the totes 3118, and so forth. The sensor data may be acquired by one or more of the sensors 3120, data provided by other systems, and so forth. For example, the sensors 3120 may include sensors 3120(1) configured to acquire image data of scenes in the facility 3102. The image data may comprise still images, video, or a combination thereof. The image data may be processed by the inventory management system 3122 to determine a location of the user 3116, the tote 3118, the identifier associated with the user 3116, and so forth. As used herein, the identifier associated with the user may represent a unique identifier of the user (e.g., number associated with user, username, etc.), an identifier that distinguishes the user amongst other users being located within the environment, or the like.

The inventory management system 3122, or systems coupled thereto, may be configured to determine the identifier associated with the user 3116, as well as to determine other candidate users. In one implementation, this determination may comprise comparing sensor data with previously stored identity data. For example, the identifier associated with the user 3116 may be identified by presenting a token carrying authentication credentials, providing a fingerprint, scanning a barcode or other type of unique identifier upon entering the facility, and so forth. The identifier associated with the user 3116 may be determined before, during, or after entry to the facility 3102. Determination of the user's identifier may comprise comparing sensor data associated with the user 3116 in the facility 3102 to previously stored user data.

In some instances, the inventory management system 3122 groups users within the facility into respective sessions. That is, the inventory management system 3122 may utilize the sensor data to determine groups of users that are effectively "together" (e.g., shopping together). In some instances, a particular session may include multiple users that entered the facility 3102 together and, potentially, that navigate the facility together. For example, when a family of two adults and two children enter the facility together, the inventory management system may associate each user with a particular session. Locating groups in addition to individual users may help in determining the outcome of individual events, given that users within a session may not only individually order, pick, return, or otherwise interact with items, but may also pass the items back and forth amongst each other. For instance, a child in the above example may pick the box of cereal before handing the box to her mother, who may place it in the tote 3118. Noting the child and the mother as belonging to the same session may increase the chances of successfully adding the box of cereal to the virtual shopping cart of the mother.

By determining the occurrence of one or more events 3124 and the output data 3126 associated therewith, the inventory management system 3122 is able to provide one or more services to the users 3116 of the facility 3102. By utilizing one or more human associates to process inquiry data and generate response data that may then be used to produce output data 3126, overall accuracy of the system may be enhanced. The enhanced accuracy may improve the user experience of the one or more users 3116 of the facility 3102. In some examples, the output data 3126 may be transmitted over a network 3130 to one or more servers 3132.

Based on the foregoing, it should be appreciated that technologies for predictively generating facts for query optimization have been presented herein. Although the subject matter presented herein has been described in language specific to computer structural features, methodological acts, and computer readable media, it is to be understood that the invention defined in the appended claims is not necessarily limited to the specific features, acts, or media described herein. Rather, the specific features, acts, and mediums are disclosed as example forms of implementing the claims.

The subject matter described above is provided by way of illustration only and should not be construed as limiting. Furthermore, the claimed subject matter is not limited to implementations that solve any or all disadvantages noted in any part of this disclosure. Various modifications and changes may be made to the subject matter described herein without following the example embodiments and applications illustrated and described, and without departing from the true spirit and scope of the present invention, which is set forth in the following claims.

Although the subject matter has been described in language specific to structural features and/or methodological acts, it is to be understood that the subject matter defined in the appended claims is not necessarily limited to the specific features or acts described. Rather, the specific features and acts are disclosed as exemplary forms of implementing the claims.

What is claimed is:

1. A smart shopping cart comprising:

a frame having one or more wheels for riding along a support surface and configured to enable the smart shopping cart to nest with a first nested shopping cart at a first end and with a second nested shopping cart at a second end opposite the first end;

a user-facing module including at least a user interface coupled to the frame at a handlebar;

a basket configured for receiving items selected by a user of the smart shopping cart, the basket cantilevered over a first portion of the frame; and a scale module coupled between the frame and the basket at a second portion of the frame, the scale module configured to field replacement and comprising:

a bottom plate coupled to the frame at the second portion of the frame and including a first perimeter wall extending perpendicular to a surface of the bottom plate;

a top plate coupled to a bottom of the basket and including a second perimeter wall extending perpendicular to a surface of the top plate, wherein the first perimeter wall and the second perimeter wall are configured to prevent ingress of material into the scale module;

a plurality of load cells positioned between and connecting the top plate and the bottom plate, wherein the load cells comprise beam load cells coupled to the top plate at a first end and to the bottom plate at a second end, the plurality of load cells configured to communicate with the user-facing module for determining a weight of items added to the basket wherein the plurality of load cells comprise three load cells arranged in a triangular arrangement with:

a first load cell positioned within the scale module adjacent a rear of the basket; and a second load cell and a third load cell positioned within the scale module positioned at a first position along a length of the basket; and wherein the user-facing module is configured to receive signals from the plurality of load cells to determine a two-dimensional location of items placed in the basket based on a change in the center of gravity of the basket in response to an item being added to the basket.

2. The smart shopping cart of claim 1, wherein the plurality of load cells are arranged with a length of each of the plurality of load cells perpendicular to the length of the basket.

3. The smart shopping cart of claim 1, wherein:

the top plate comprises a plurality of hard stops configured to prevent overcompression of the plurality of load cells at a front edge of the top plate; and the scale module comprises an adjustable stop at a back edge of the scale module.

4. A mobile apparatus comprising:

a frame having one or more wheels for riding along a support surface and configured to enable the mobile apparatus to nest with a first nested mobile apparatus at a first end and with a second nested mobile apparatus at a second end opposite the first end;

a user-facing module including at least a user interface coupled to the frame at a handlebar;

a basket configured for receiving items selected by a user of the mobile apparatus, the basket cantilevered over a first portion of the frame; and a scale module coupled between the frame and the basket at a second portion of the frame, the scale module comprising:

a bottom plate coupled to the frame at the second portion of the frame;

a top plate coupled to a bottom of the basket; and a plurality of load cells positioned between and connecting the top plate and the bottom plate, wherein the load cells comprise beam load cells coupled to the top plate at a first end and to the bottom plate at a second end, the plurality of load cells configured to communicate with the user-facing module for determining a weight of items added to the basket, wherein the plurality of load cells comprise three load cells arranged in a triangular arrangement with:

a first load cell positioned within the scale module adjacent a rear of the basket; and a second load cell and a third load cell positioned within the scale module positioned at a first position along a length of the basket; and wherein the user-facing module is configured to receive signals from the plurality of load cells to determine a two-dimensional location of items placed in the basket based on a change in the center of gravity of the basket in response to an item being added to the basket.

5. The mobile apparatus of claim 4, wherein the plurality of load cells are arranged with a length of each of the plurality of load cells perpendicular to the length of the basket.

6. The mobile apparatus of claim 4, wherein:

the first load cell is positioned along a center axis of the basket; and the second load cell and the third load cell are offset to a respective first side and a second side of the center axis.

7. The mobile apparatus of claim 4, wherein:

the bottom plate includes a first perimeter wall extending perpendicular to a surface of the bottom plate; and the top plate includes a second perimeter wall extending perpendicular to a surface of the top plate, wherein the first perimeter wall and the second perimeter wall are configured to prevent ingress of material into the scale module.

8. The mobile apparatus of claim 7, wherein each of the plurality of load cells comprise:

a body having a first end and a second end;

a transducer affixed to a portion of the body between the first end and the second end;

a first mounting interface at the first end configured to couple to the first interface; and a second mounting interface at the second end configured to couple to the second interface.

9. The mobile apparatus of claim 7, further comprising a user-facing module comprising:

a user interface comprising a screen;

a camera device for capturing image data in or around the mobile apparatus;

a scale system for weighing items for a sell-by-weight product; and a product identification module configured to receive product identification information for an item scanned by a user of the mobile apparatus.

10. The mobile apparatus of claim 4, wherein:

the top plate comprises a plurality of hard stops configured to prevent overcompression of the plurality of load cells at a front edge of the top plate; and the scale module comprises an adjustable stop at a back edge of the scale module.

11. The mobile apparatus of claim 4, wherein the plurality of load cells are configured to communicate an analog signal to the user-facing module, the user-facing module comprising a digitization component configured to digitize the analog signal and determine a weight signal for the item added to the basket.

12. A smart shopping cart comprising:

a frame having one or more wheels for riding along a support surface;

a computing device coupled to the frame;

a basket configured for receiving items selected by a user of the smart shopping cart, the basket cantilevered over a first portion of the frame;

a scale module coupled between the frame and the basket at a second portion of the frame, the scale module comprising:

a bottom plate coupled to the frame at the second portion of the frame;

a top plate coupled to a bottom of the basket; and a plurality of load cells positioned between and connecting the top plate and the bottom plate, wherein the load cells comprise beam load cells coupled to the top plate at a first end and to the bottom plate at a second end, the plurality of load cells configured to communicate with a user-facing module for determining a weight of items added to the basket, wherein the plurality of load cells comprise three load cells arranged in a triangular arrangement with:

a first load cell positioned within the scale module adjacent a rear of the basket; and a second load cell and a third load cell positioned within the scale module positioned at a first position along a length of the basket; and the user-facing module including at least a user interface coupled to the frame at a handlebar, wherein the user-facing module is configured to receive signals from the plurality of load cells to determine a two-dimensional location of items placed in the basket based on a change in the center of gravity of the basket in response to an item being added to the basket.

13. The smart shopping cart of claim 12, wherein the user-facing module comprises:

a user interface comprising a screen;

a camera device for capturing image data in or around the smart shopping cart;

a scale system for weighing items for a sell-by-weight product; and a product identification module configured to receive product identification information for an item scanned by a user of the smart shopping cart.

14. The smart shopping cart of claim 13, wherein the computing device is configured to receive signals from the plurality of load cells and the scale system of the user-facing module to determine an identity of the item added to the basket.

15. The smart shopping cart of claim 12, wherein the plurality of load cells are arranged with a length of each of the plurality of load cells perpendicular to the length of the basket.

16. The smart shopping cart of claim 12, wherein:

each of the plurality of load cells comprise:

a body having a first end and a second end;

a transducer affixed to a portion of the body between the first end and the second end;

a first mounting interface at the first end configured to couple to the bottom plate comprising a set of fasteners and floating alignment pins; and a second mounting interface at the second end configured to couple to the top plate.

17. The smart shopping cart of claim 1, wherein:

the first load cell is positioned along a center axis of the basket; and the second load cell and the third load cell are offset to a respective first side and a second side of the center axis.

18. The smart shopping cart of claim 12, wherein:

the first load cell is positioned along a center axis of the basket; and the second load cell and the third load cell are offset to a respective first side and a second side of the center axis.

19. The mobile apparatus of claim 4, wherein:

the top plate comprises a plurality of hard stops configured to prevent overcompression of the plurality of load cells at a front edge of the top plate; and the scale module comprises an adjustable stop at a back edge of the scale module.

20. The smart shopping cart of claim 12, wherein:

the top plate comprises a plurality of hard stops configured to prevent overcompression of the plurality of load cells at a front edge of the top plate; and the scale module comprises an adjustable stop at a back edge of the scale module.

* * * * *